United States Patent
Wang et al.

(10) Patent No.: US 12,168,538 B2
(45) Date of Patent: Dec. 17, 2024

(54) CONTINUOUS UNLOADING AND PACKAGING SYSTEM OF PHARMACEUTICAL ADDITIVE MANUFACTURING

(71) Applicant: Triastek Inc., Nanjing (CN)

(72) Inventors: Peng Wang, Nanjing (CN); Renjie Li, Nanjing (CN); Zhengping Jiang, Nanjing (CN); Feihuang Deng, Nanjing (CN); Haili Liu, Nanjing (CN); Senping Cheng, Nanjing (CN); Xiaoling Li, Dublin, CA (US)

(73) Assignee: TRIASTEK INC., Nanjing (CN)

( * ) Notice: Subject to any disclaimer, the term of this patent is extended or adjusted under 35 U.S.C. 154(b) by 175 days.

(21) Appl. No.: 17/795,466

(22) PCT Filed: Feb. 9, 2021

(86) PCT No.: PCT/CN2021/076280
§ 371 (c)(1),
(2) Date: Jul. 26, 2022

(87) PCT Pub. No.: WO2021/164660
PCT Pub. Date: Aug. 26, 2021

(65) Prior Publication Data
US 2023/0070928 A1    Mar. 9, 2023

(30) Foreign Application Priority Data
Feb. 17, 2020 (WO) ................ PCT/CN2020/075552

(51) Int. Cl.
*B65B 35/18* (2006.01)
*A61J 3/06* (2006.01)
(Continued)

(52) U.S. Cl.
CPC ................ *B65B 35/18* (2013.01); *A61J 3/06* (2013.01); *B29C 64/245* (2017.08);
(Continued)

(58) Field of Classification Search
CPC ......... B65B 35/18; B65B 11/00; B65B 41/02; B65B 57/02; B65B 65/003; B33Y 40/00;
(Continued)

(56) References Cited

U.S. PATENT DOCUMENTS 4,750,318 A * 6/1988 Matsuzawa ............. B65B 61/06
83/882
5,002,717 A    3/1991 Taniguchi
(Continued)

FOREIGN PATENT DOCUMENTS

CN      1872526 A      12/2006
CN      203496288 U    3/2014
(Continued)

OTHER PUBLICATIONS

Applicant Remarks, (Oct. 20, 2021), for U.S. Appl. No. 17/180,565, 6 pages.
(Continued)

*Primary Examiner* — Lucas E. A. Palmer
(74) *Attorney, Agent, or Firm* — Morrison & Foerster LLP

(57) ABSTRACT

A high throughput, efficient, and simplified unloading and packaging systems and methods for large-scale production of pharmaceutical units (104) using additive manufacturing. The systems and methods may unload, inspect, package, and trace pharmaceutical units, produced by an additive manufacturing system (900), that are not damaged or deformed. The unloading and packaging system can include one or more unloading and packaging devices (100). The unloading and packaging device can include a modular configuration
(Continued)

having modules. Individual modules to be arranged in any relative order, at any location, and with any number in the unloading and packaging device. The flexibility of the modular configuration allows one or more modules to be removed or added at any given time due to, e.g., expansion, downsizing, module repair, module upgrades, etc. High throughput can be achieved by operating unloading and packaging devices independently.

18 Claims, 38 Drawing Sheets

(51) Int. Cl.
    *B29C 64/245*       (2017.01)
    *B29C 64/379*       (2017.01)
    *B29C 64/386*       (2017.01)
    *B33Y 40/00*        (2020.01)
    *B33Y 50/00*        (2015.01)
    *B33Y 80/00*        (2015.01)
    *B65B 11/00*        (2006.01)
    *B65B 41/02*        (2006.01)
    *B65B 57/02*        (2006.01)
    *B65B 65/00*        (2006.01)
    *B65C 1/02*         (2006.01)
    *B29L 31/00*        (2006.01)

(52) U.S. Cl.
    CPC .......... *B29C 64/379* (2017.08); *B29C 64/386* (2017.08); *B33Y 40/00* (2014.12); *B33Y 50/00* (2014.12); *B33Y 80/00* (2014.12); *B65B 11/00* (2013.01); *B65B 41/02* (2013.01); *B65B 57/02* (2013.01); *B65B 65/003* (2013.01); *B65C 1/02* (2013.01); *B29L 2031/753* (2013.01)

(58) Field of Classification Search
    CPC ....... B33Y 50/00; B33Y 80/00; B29C 64/379; B29C 64/245; B29C 64/386
    See application file for complete search history.

(56) References Cited

U.S. PATENT DOCUMENTS

| | | | | |
|---|---|---|---|---|
| 5,033,251 A * | 7/1991 | Rodriguez | ............ | B07C 5/3404 |
| | | | | 53/494 |
| 5,121,329 A * | 6/1992 | Crump | ................... | B33Y 30/00 |
| | | | | 228/180.5 |
| 5,192,559 A * | 3/1993 | Hull | ...................... | B29C 64/188 |
| | | | | 425/375 |
| 5,299,907 A * | 4/1994 | Dal Pozzo | ......... | B65G 47/5181 |
| | | | | 198/370.01 |
| 5,303,141 A | 4/1994 | Batchelder | | |
| 5,484,062 A * | 1/1996 | Rich | ......................... | B07C 5/36 |
| | | | | 209/587 |
| 5,529,471 A | 6/1996 | Khoshevis | | |
| 5,672,364 A * | 9/1997 | Kato | ....................... | B30B 11/10 |
| | | | | 425/103 |
| 5,936,861 A | 8/1999 | Jang et al. | | |
| 6,571,702 B2 * | 6/2003 | Wotton | ................ | B41J 11/0022 |
| | | | | 101/232 |
| 6,684,604 B2 * | 2/2004 | Luc | ........................... | B65B 7/01 |
| | | | | 53/244 |
| 6,986,739 B2 | 1/2006 | Warren | | |
| 8,282,380 B2 * | 10/2012 | Pax | ....................... | B33Y 40/00 |
| | | | | 425/375 |
| 8,668,859 B2 * | 3/2014 | Pettis | ..................... | B33Y 40/00 |
| | | | | 264/405 |
| 8,827,684 B1 | 9/2014 | Schumacher et al. | | |
| 8,926,484 B1 | 1/2015 | Comb et al. | | |
| 9,233,491 B2 * | 1/2016 | Stuhl | ..................... | B30B 11/027 |
| 9,233,506 B2 | 1/2016 | Leavitt | | |
| 9,271,897 B2 * | 3/2016 | Costello | ................. | B30B 11/34 |
| 9,297,845 B2 | 3/2016 | Mathur | | |
| 9,445,971 B2 * | 9/2016 | Anderson | ................ | A61J 3/10 |
| 9,610,219 B1 * | 4/2017 | Basso | ........................ | B26F 1/40 |
| 9,610,733 B2 * | 4/2017 | Swanson | ................ | B29C 64/40 |
| 9,944,016 B2 | 4/2018 | Lewicki | | |
| 9,952,237 B2 * | 4/2018 | Fournier | .......... | B01L 3/502761 |
| 9,974,607 B2 | 5/2018 | Stone | | |
| 10,011,073 B2 | 7/2018 | Bheda | | |
| 10,143,626 B2 | 12/2018 | Li | | |
| 10,201,503 B1 * | 2/2019 | Li | .......................... | B29C 64/209 |
| 10,254,499 B1 | 4/2019 | Cohen et al. | | |
| 10,258,575 B2 | 4/2019 | Li | | |
| 10,350,822 B1 | 7/2019 | Deng | | |
| 10,363,220 B2 | 7/2019 | Li | | |
| 10,624,857 B2 | 4/2020 | Li | | |
| 10,973,767 B2 | 4/2021 | Li | | |
| 11,292,193 B2 | 4/2022 | Liu et al. | | |
| 11,364,674 B2 | 6/2022 | Cheng et al. | | |
| 11,383,439 B1 | 7/2022 | Liu | | |
| 11,458,684 B2 | 10/2022 | Liu et al. | | |
| 2004/0175450 A1 * | 9/2004 | Yanagisawa | ........... | B33Y 10/00 |
| | | | | 425/135 |
| 2004/0232601 A1 * | 11/2004 | Kundinger | ............ | B29C 51/261 |
| | | | | 425/308 |
| 2004/0253365 A1 | 12/2004 | Warren et al. | | |
| 2006/0266188 A1 * | 11/2006 | Kim | ......................... | B26D 7/32 |
| | | | | 83/511 |
| 2008/0093763 A1 | 4/2008 | Mancosh et al. | | |
| 2008/0110134 A1 * | 5/2008 | Nitulescu | ................ | B65B 9/045 |
| | | | | 53/235 |
| 2009/0283438 A1 * | 11/2009 | Bourque | .................... | A61J 1/03 |
| | | | | 156/253 |
| 2012/0092724 A1 * | 4/2012 | Pettis | ..................... | B29C 64/386 |
| | | | | 358/1.15 |
| 2012/0096807 A1 * | 4/2012 | Okuma | ..................... | A61J 1/10 |
| | | | | 53/111 R |
| 2012/0105903 A1 * | 5/2012 | Pettis | ..................... | B33Y 50/00 |
| | | | | 358/1.14 |
| 2012/0200596 A1 * | 8/2012 | Gotou | ................ | G01N 21/9508 |
| | | | | 345/625 |
| 2012/0315333 A1 * | 12/2012 | Zhou | ..................... | A61K 9/2095 |
| | | | | 427/2.23 |
| 2014/0116217 A1 | 5/2014 | Hashish | | |
| 2014/0220168 A1 * | 8/2014 | Perez | .................. | B29C 37/0007 |
| | | | | 425/161 |
| 2014/0265040 A1 | 9/2014 | Batchelder | | |
| 2014/0314954 A1 | 10/2014 | Lewis et al. | | |
| 2015/0037527 A1 * | 2/2015 | Jacobs | ...................... | B32B 7/12 |
| | | | | 156/247 |
| 2015/0130101 A1 | 5/2015 | Fiegener | | |
| 2015/0210010 A1 * | 7/2015 | Napadensky | .......... | B33Y 10/00 |
| | | | | 264/401 |
| 2015/0298394 A1 | 10/2015 | Sheinman | | |
| 2015/0321419 A1 | 11/2015 | Linthicum et al. | | |
| 2015/0352787 A1 | 12/2015 | Humbert et al. | | |
| 2016/0038655 A1 | 2/2016 | Weisman et al. | | |
| 2016/0042151 A1 * | 2/2016 | Akdogan | ................ | B65B 57/14 |
| | | | | 700/240 |
| 2016/0074938 A1 | 3/2016 | Kitani et al. | | |
| 2016/0075091 A1 * | 3/2016 | Cable | .................... | B29C 64/245 |
| | | | | 528/272 |
| 2016/0096321 A1 | 4/2016 | Fry et al. | | |
| 2016/0122045 A1 * | 5/2016 | Kames | ..................... | B65B 5/103 |
| | | | | 53/411 |
| 2016/0136887 A1 | 5/2016 | Guillemette et al. | | |
| 2016/0288414 A1 | 10/2016 | Ozbolat et al. | | |
| 2016/0288427 A1 * | 10/2016 | Foley | ..................... | B33Y 10/00 |
| 2016/0303802 A1 * | 10/2016 | Meshorer | ................ | B29C 48/02 |
| 2016/0325498 A1 | 11/2016 | Gelbart | | |
| 2016/0354315 A1 | 12/2016 | Li | | |
| 2016/0367358 A1 * | 12/2016 | Tran | ......................... | A61L 27/54 |
| 2017/0008230 A1 | 1/2017 | Yuyama | | |
| 2017/0015061 A1 | 1/2017 | Lewicki et al. | | |
| 2017/0050375 A1 | 2/2017 | Tyler | | |
| 2017/0120513 A1 | 5/2017 | Brennan | | |
| 2017/0121039 A1 * | 5/2017 | Ciesiun | ..................... | F42B 12/40 |
| 2017/0157844 A1 | 6/2017 | Mandel et al. | | |

(56) References Cited

U.S. PATENT DOCUMENTS

| | | | |
|---|---|---|---|
| 2017/0165920 A1* | 6/2017 | Leavitt | B29C 64/118 |
| 2017/0217088 A1* | 8/2017 | Boyd, IV | B29C 64/209 |
| 2017/0253354 A1* | 9/2017 | Colson | B65B 61/007 |
| 2017/0360714 A1 | 12/2017 | Church | |
| 2018/0001565 A1 | 1/2018 | Hocker | |
| 2018/0011306 A1 | 1/2018 | Babnick et al. | |
| 2018/0029262 A1 | 2/2018 | Fitzpatrick | |
| 2018/0035689 A1 | 2/2018 | Warner et al. | |
| 2018/0049993 A1 | 2/2018 | Blaesi et al. | |
| 2018/0056582 A1 | 3/2018 | Matusik et al. | |
| 2018/0056602 A1 | 3/2018 | Susnjara | |
| 2018/0104911 A1* | 4/2018 | Donaldson | H04N 1/405 |
| 2018/0110679 A1* | 4/2018 | Devens | B65B 61/025 |
| 2018/0116911 A1 | 5/2018 | Li | |
| 2018/0141685 A1* | 5/2018 | Colson | B65B 5/02 |
| 2018/0184702 A1 | 7/2018 | Moh | |
| 2018/0194061 A1 | 7/2018 | Takahashi | |
| 2018/0200955 A1 | 7/2018 | Hoelldorfer et al. | |
| 2018/0235837 A1* | 8/2018 | Klein | B65B 3/003 |
| 2018/0296494 A1* | 10/2018 | Shalev | A61K 31/192 |
| 2018/0311167 A1 | 11/2018 | Li | |
| 2018/0318929 A1* | 11/2018 | Matthews | B23K 26/0876 |
| 2018/0319065 A1 | 11/2018 | Holm et al. | |
| 2018/0319519 A1* | 11/2018 | Stange | A61J 1/035 |
| 2018/0339448 A1* | 11/2018 | Fan | B29C 64/129 |
| 2018/0339455 A1 | 11/2018 | Cohen | |
| 2019/0001574 A1 | 1/2019 | Yackabonis | |
| 2019/0015344 A1* | 1/2019 | Wening | A61K 9/2095 |
| 2019/0022934 A1 | 1/2019 | Kobe et al. | |
| 2019/0047225 A1 | 2/2019 | Luo | |
| 2019/0125681 A1* | 5/2019 | Albed Alhnan | B29C 64/245 |
| 2019/0192383 A1* | 6/2019 | Schiller | B29C 64/209 |
| 2019/0192440 A1 | 6/2019 | Li | |
| 2019/0202126 A1 | 7/2019 | Hutchinson et al. | |
| 2019/0209468 A1 | 7/2019 | Deng | |
| 2019/0209482 A1 | 7/2019 | Li | |
| 2019/0321299 A1 | 10/2019 | Li | |
| 2019/0374471 A1* | 12/2019 | Basit | A61K 9/2027 |
| 2020/0016039 A1* | 1/2020 | Boutin | A61J 7/0069 |
| 2020/0030491 A1 | 1/2020 | Weisman et al. | |
| 2020/0147873 A1 | 5/2020 | Lewis et al. | |
| 2020/0315971 A1 | 10/2020 | Li | |
| 2020/0338009 A1 | 10/2020 | Li | |
| 2020/0394786 A1* | 12/2020 | Yokouchi | G06T 7/97 |
| 2021/0002014 A1* | 1/2021 | Akdogan | B65B 35/34 |
| 2021/0077410 A1 | 3/2021 | Deng et al. | |
| 2021/0078244 A1 | 3/2021 | Deng et al. | |
| 2021/0078257 A1 | 3/2021 | Mcnaney | |
| 2021/0128479 A1 | 5/2021 | Cheng et al. | |
| 2021/0147133 A1* | 5/2021 | Steinweg | B65D 75/327 |
| 2021/0154910 A1 | 5/2021 | Cheng et al. | |
| 2021/0178677 A1 | 6/2021 | Liu et al. | |
| 2021/0196638 A1 | 7/2021 | Deng et al. | |
| 2021/0205226 A1 | 7/2021 | Li | |
| 2021/0237361 A1 | 8/2021 | Sasse et al. | |
| 2022/0118698 A1 | 4/2022 | Deng et al. | |
| 2022/0212404 A1 | 7/2022 | Liu et al. | |
| 2022/0212408 A1 | 7/2022 | Liu et al. | |
| 2022/0339857 A1 | 10/2022 | Cheng et al. | |
| 2023/0048362 A1 | 2/2023 | Liu et al. | |
| 2023/0225978 A1 | 7/2023 | Li et al. | |

FOREIGN PATENT DOCUMENTS

| | | |
|---|---|---|
| CN | 103692653 A | 4/2014 |
| CN | 104260349 A | 1/2015 |
| CN | 104552949 A | 4/2015 |
| CN | 204414597 U | 6/2015 |
| CN | 104742375 A | 7/2015 |
| CN | 105082539 A | 11/2015 |
| CN | 105313332 A | 2/2016 |
| CN | 105365221 A | 3/2016 |
| CN | 105666640 A | 6/2016 |
| CN | 105711094 A | 6/2016 |
| CN | 205343831 U | 6/2016 |
| CN | 105856562 A | 8/2016 |
| CN | 105965888 A | 9/2016 |
| CN | 106079434 A | 11/2016 |
| CN | 106255583 A | 12/2016 |
| CN | 206047081 U | 3/2017 |
| CN | 106622413 A | 5/2017 |
| CN | 106623936 A | 5/2017 |
| CN | 106853683 A | 6/2017 |
| CN | 106926444 A | 7/2017 |
| CN | 107019676 A | 8/2017 |
| CN | 206436522 U | 8/2017 |
| CN | 107718560 A | 2/2018 |
| CN | 107866973 A | 4/2018 |
| CN | 107877863 A | 4/2018 |
| CN | 108215153 A | 6/2018 |
| CN | 108215154 A | 6/2018 |
| CN | 207579101 U | 7/2018 |
| CN | 207669820 U | 7/2018 |
| CN | 108568966 A | 9/2018 |
| CN | 108582765 A | 9/2018 |
| CN | 207874876 U | 9/2018 |
| CN | 207901677 U | 9/2018 |
| CN | 109228325 A | 1/2019 |
| CN | 208768826 U | 4/2019 |
| CN | 109719944 A | 5/2019 |
| CN | 208812559 U | 5/2019 |
| CN | 105690762 A | 6/2019 |
| CN | 109895390 A | 6/2019 |
| CN | 110507637 A | 11/2019 |
| EP | 3626439 A1 | 3/2020 |
| JP | H10305461 A | 11/1998 |
| JP | 201761066 A | 3/2017 |
| JP | 2018027637 A | 2/2018 |
| KR | 20160107769 A | 9/2016 |
| KR | 20190031959 A | 3/2019 |
| WO | 2014039825 A2 | 3/2014 |
| WO | 2015065936 A2 | 5/2015 |
| WO | 2015129733 A1 | 9/2015 |
| WO | 2015131833 A1 | 9/2015 |
| WO | 2015171352 A1 | 11/2015 |
| WO | 2016038356 A1 | 3/2016 |
| WO | 2016097911 A1 | 6/2016 |
| WO | 2016126962 A1 | 8/2016 |
| WO | 2016185215 A1 | 11/2016 |
| WO | 2016192680 A1 | 12/2016 |
| WO | 2017008789 A1 | 1/2017 |
| WO | 2017038984 A1 | 3/2017 |
| WO | 2017113172 A1 | 7/2017 |
| WO | 2017193099 A1 | 11/2017 |
| WO | 2017205443 A1 | 11/2017 |
| WO | 2017206128 A1 | 12/2017 |
| WO | 2018100444 A2 | 6/2018 |
| WO | 2018137686 A1 | 8/2018 |
| WO | 2018210183 A1 | 11/2018 |
| WO | 2019137199 A1 | 7/2019 |
| WO | 2019137200 A1 | 7/2019 |
| WO | 2019137333 A1 | 7/2019 |
| WO | 2021031824 A1 | 2/2021 |
| WO | 2021042865 A1 | 3/2021 |
| WO | 2021164660 A1 | 8/2021 |

OTHER PUBLICATIONS

Cheng et al. WO-2018/210183, English Machine Translation from WIPO website via Google (2018), 27 pages.

Goyanes, A. et al. (2015). "3D Printing of Medicines: Engineering Novel Oral Devices with Unique Design and Drug Release Characteristics," Molecular Pharmaceutics 12(11):4077-4084, 8 pages.

International Preliminary Report on Patentability, issued Nov. 19, 2019, for PCT Application No. PCT/CN2018/086489, filed May 11, 2018, 1 page. English Translation.

International Search Report and Written Opinion, mailed Aug. 27, 2021, for PCT Application No. PCT/CN2021/098797, filed Jun. 8, 2021, 8 pages.

International Search Report and Written Opinion, mailed Mar. 29, 2019, for PCT/CN2019/070634, filed Jan. 7, 2019, 11 pages.

International Search Report and Written Opinion, mailed May 12, 2021, for PCT/CN2021/076280, filed Feb. 9, 2021, 9 pages.

(56) References Cited

OTHER PUBLICATIONS

International Search Report and Written Opinion, mailed Nov. 3, 2020, for PCT/CN2020/105868, filed Jul. 30, 2020, 11 pages.
International Search Report, mailed Jul. 19, 2018, for PCT Application No. PCT/CN2018/086489, filed May 16, 2017, 2 pages. English Translation.
Poh, P.S.P. et al. (Dec. 15, 2016, e-pub. Aug. 1, 2016). "Polylactides in Additive Biomanufacturing," Advanced Drug Delivery Reviews 107:228-246.
Skylar-Scott, M.A. (Nov. 14, 2019, e-pub. Nov. 13, 2019). "Voxelated Soft Matter Via Multimaterial Multinozzle 3D Printing," Nature 575(7782):330-335.
Written Opinion of the International Searching Authority Report, mailed Jul. 19, 2018, for PCT Application No. PCT/CN2018/086489, filed May 11, 2018, 4 pages. English Translation.
Yang, et al. (2018). CN-207579101-U, English Translation from WIP Website, 4 pages.
Zhang, J. et al. (2017, e-pub. Dec. 23, 2016). "Coupling 3D Printing With Hot-Melt Extrusion to Produce Controlled-Release Tablets," International Journal of Pharmaceutics 519:186-197.

\* cited by examiner

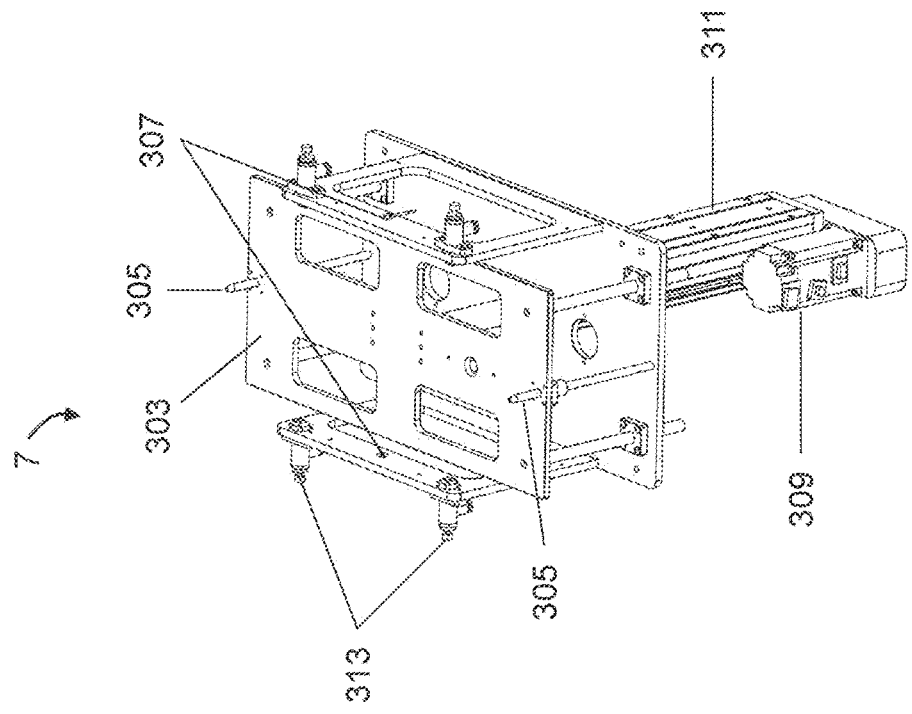
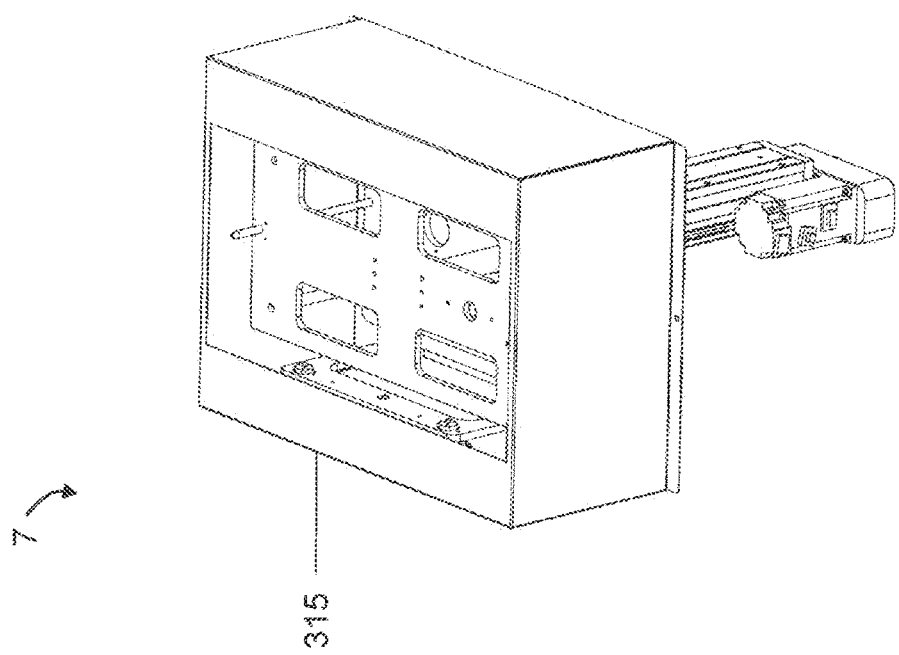
FIG. 3B

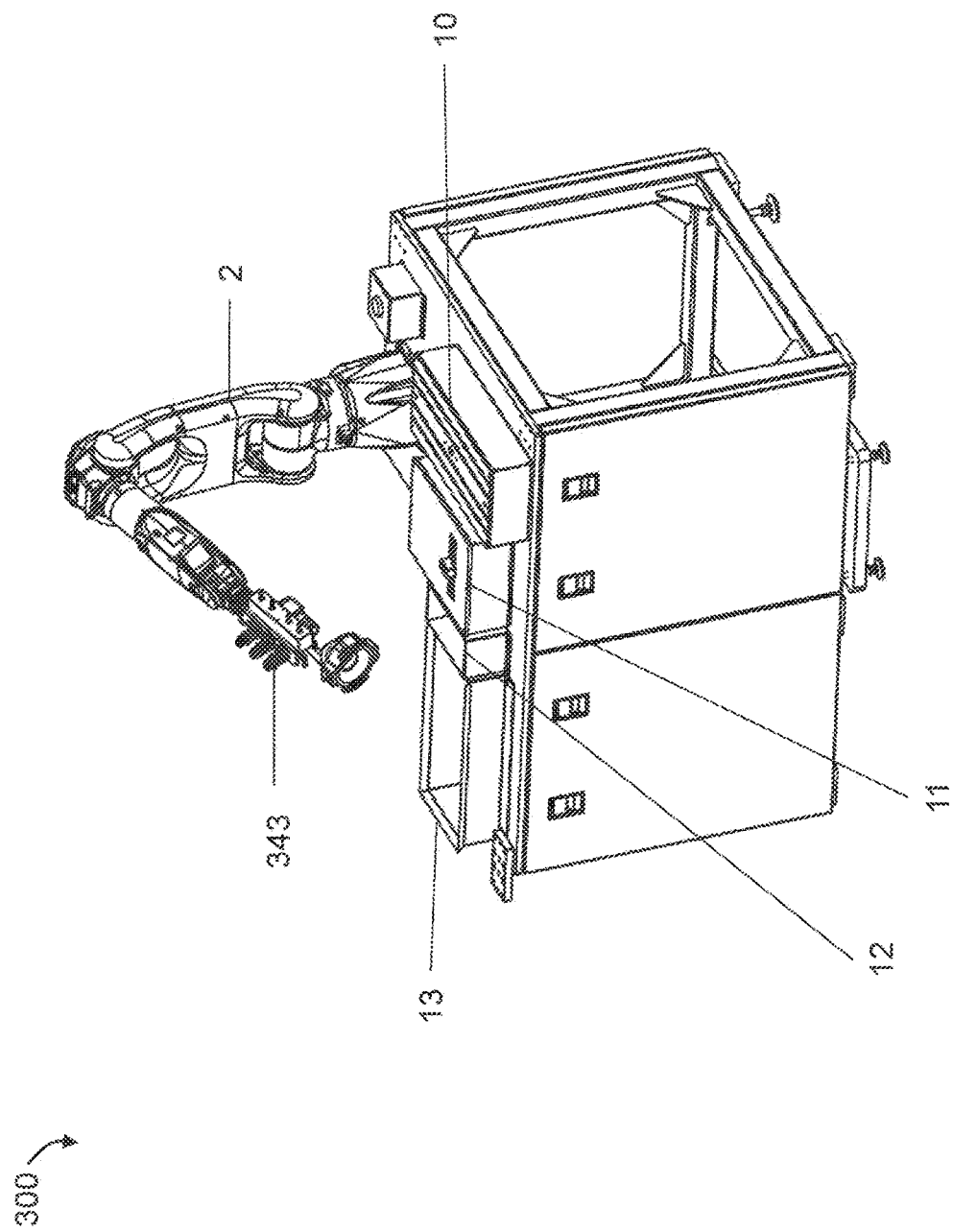

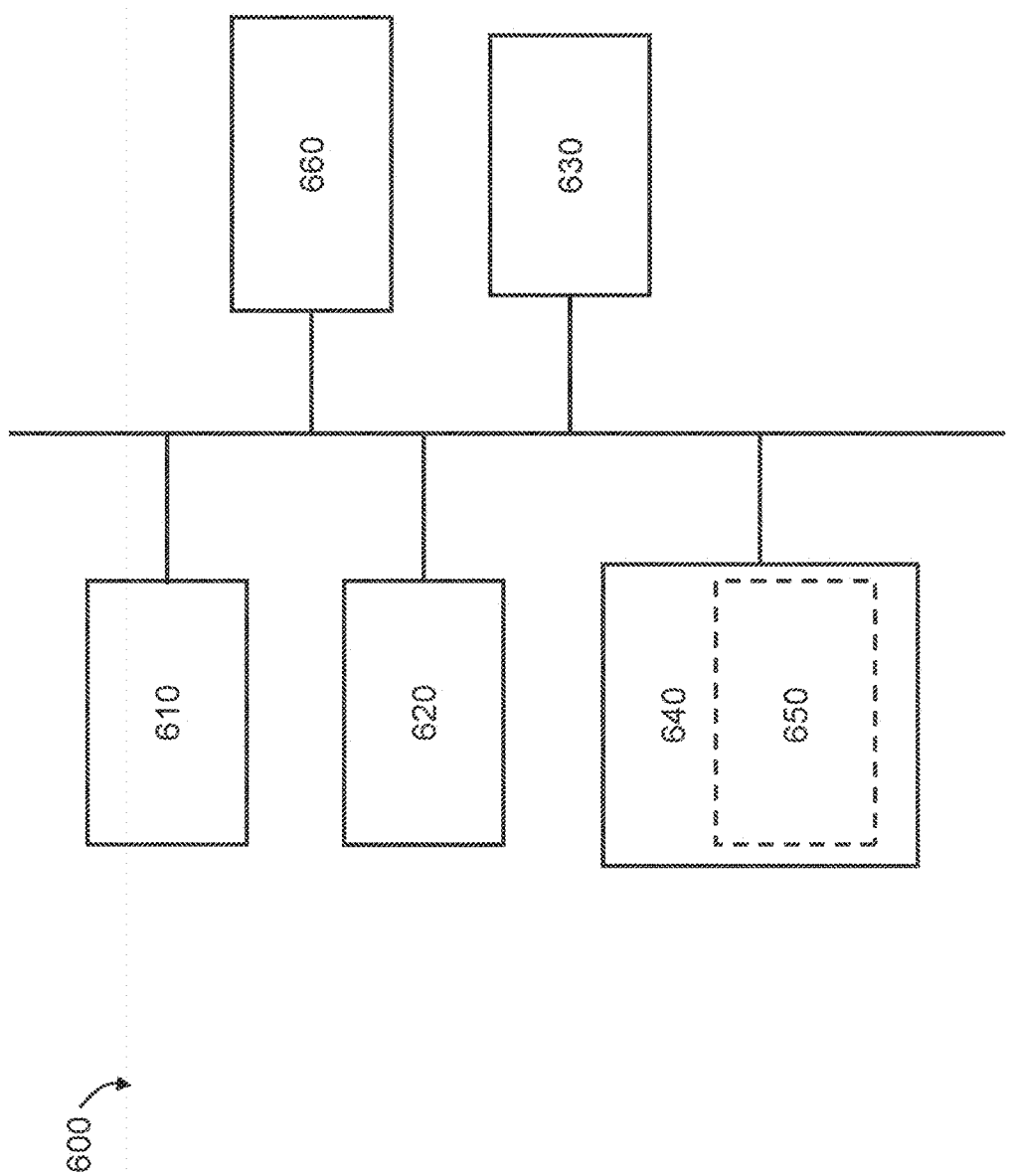

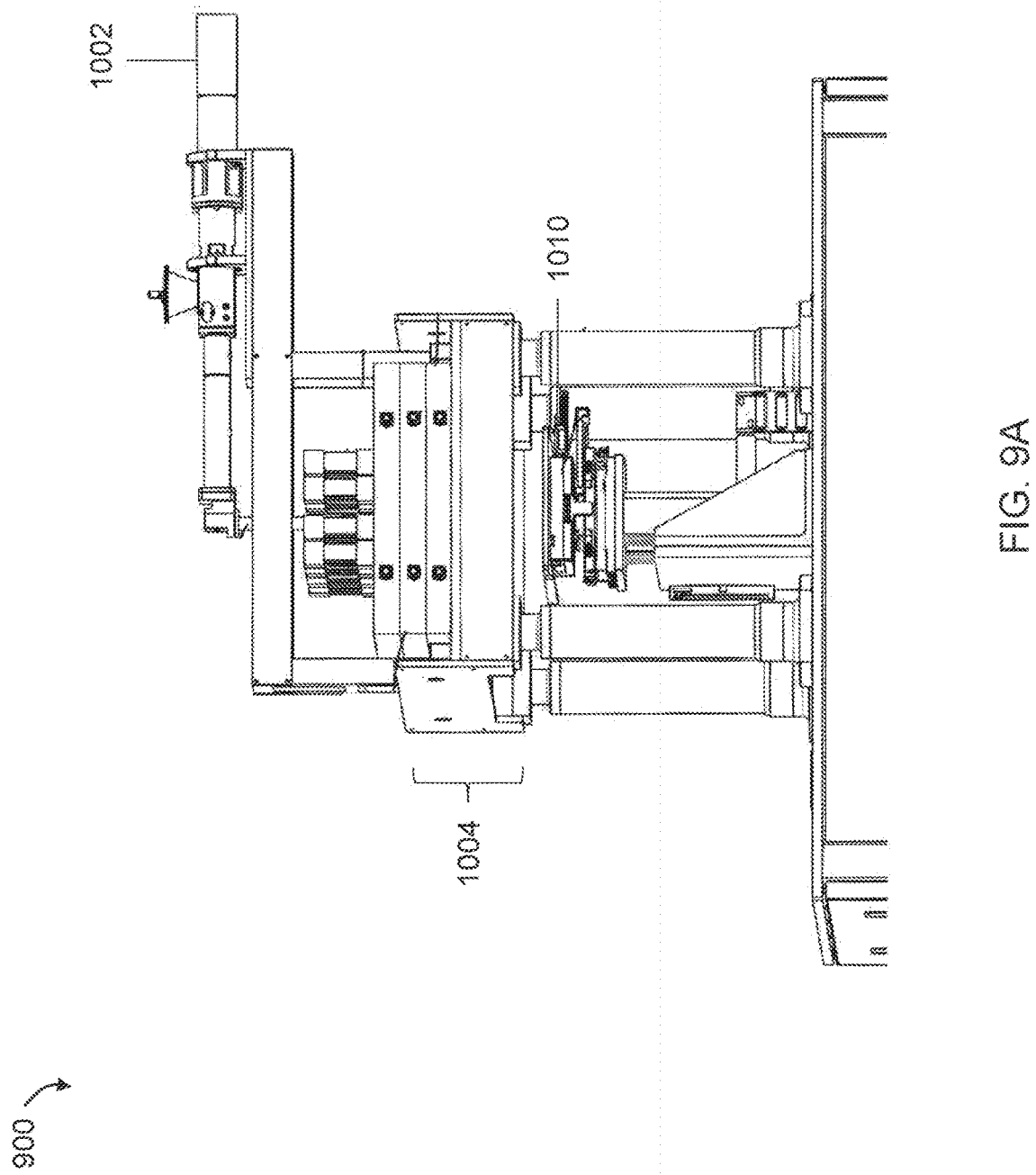

CONTINUOUS UNLOADING AND PACKAGING SYSTEM OF PHARMACEUTICAL ADDITIVE MANUFACTURING

CROSS REFERENCE TO RELATED APPLICATIONS

This application is a national stage application under 35 U.S.C. § 371 of International Application No. PCT/CN2021/076280, filed internationally on Feb. 9, 2021, which claims the benefit of PCT/CN2020/075552, filed internationally on Feb. 17, 2020, the contents of which are incorporated herein by reference in their entirety.

FIELD

The present disclosure relates generally to additive manufacturing technology, and more specifically to continuous additive manufacturing printing, unloading, and packaging systems and corresponding methods for continuous manufacturing of pharmaceutical units (e.g., tablets, caplets, printlets, etc.)

BACKGROUND

Additive manufacturing, also referred to as three-dimensional (3D) printing, is a rapid prototyping technology that may involve one or more processes where material may be joined or solidified to form a 3D object. Materials (e.g., liquid molecules, powder grains, metallic particles, molten polmers, molten plastics, etc.) may be added together, typically layer-by-layer, based on a digital 3D model. The 3D printing system may be operated by a computer system to control one or more parameters to form the shape and size of the desired 3D object. These parameters can include, but are not limited to, the type of material being dispensed, the material flow, movement of one or more printing nozzles, or movement of printing tables, temperature and pressure controls.

Currently, 3D printing technology includes photocuring techniques, powder bonding techniques, and fused deposition modeling (FDM) techniques. In a FDM process, material in the form of a filament is fed through a heated nozzle, which melts and extrudes the material onto a surface plane, referred to herein as a post-printing film. The heated nozzle or the post-printing film can move, while the molten material is dispensed into the desired shape, as instructed by the computer system.

Other additive manufacturing methods, such as melt extrusion deposition (IVIED), utilize non-filamentous materials that are molten and pressurized before being dispensed through a printing nozzle or nozzles. In a IVIED process, an initial material is fed to a processing chamber of a melt extrusion module or screw extrusion system. The initial material is heated and converted into a melt. The melt is extruded from and guided along a discharge outlet of the processing chamber to be extruded from a nozzle of the printing module. The melt is then deposited onto a film on a printing platform.

There are several challenges with adapting techniques, such as FDM and IVIED, for large-scale production of pharmaceutical units (e.g., tablets, caplets, printlets, etc.). One such challenge may be achieving high throughput. For example, a single production batch may undergo multiple processes including a 3D printing process, an unloading process, one or more inspection processes, one or more packaging processes, and a labeling process. The throughput of the production batch may be limited by the process with the slowest throughput and may be limited by handling of the production batch between processes. Systems that run multiple devices operating in parallel may achieve a higher throughput with the same printing quality, but these systems may be expensive to maintain, as well as inefficient and complex to operate.

Another challenge pertains to handling the pharmaceutical units after the 3D printing process is complete. As discussed above, the 3D printing process may involve depositing a molten material on a post-printing film. The initially-deposited molten material may stick to the post-printing film causing the two to be temporarily joined. In order to package the pharmaceutical units in medicine packs (e.g., blister packs) and/or medicine boxes, the pharmaceutical units need to be separated from the post-printing film, and in a manner that does not damage or deform the pharmaceutical units as well as the post-printing film.

Yet another challenge may be with traceability. Using additive manufacturing for forming pharmaceutical units has the advantage of being able to customize the properties (e.g., dosage, composition, shape, materials, structure, etc.) of the pharmaceutical units. With large-scale production, pharmaceutical units from different production batches may be prone to being mixed together, especially when devices are operating in parallel. As a result, precise information about pharmaceutical unit and its associated production process may be unknown or inaccurate. Having customized pharmaceutical units may mean that accurate and precise traceability of the pharmaceutical units is needed in order to differentiate between different production batches.

Thus, there is a need for high throughput, efficient, and simplified unloading and packaging systems and methods for large-scale production of pharmaceutical units using additive manufacturing. There is also a need to ensure the pharmaceutical units are not damaged or deformed during the unloading and packaging process. There is also a need to remove the not good pharmaceutical units from the production system. Furthermore, there is a need for accurate traceability of the pharmaceutical units.

SUMMARY

Described herein are high throughput, efficient, and simplified unloading and packaging systems and methods for large-scale production of pharmaceutical units using additive manufacturing. In some embodiments, the large-scale production of pharmaceutical units may involve one or more continuous manufacturing methods. The disclosed systems and methods may unload, inspect, package, and trace pharmaceutical units, produced by an additive manufacturing system, that are not damaged or deformed. The unloading and packaging system of the disclosure can be configured to receive pharmaceutical units temporarily connected to a post-printing film.

The unloading and packaging system can include one or more unloading and packaging devices. Each unloading and packaging device can include a plurality of modules (e.g., a loading/unloading module, an inspection module, a packaging module, a deformation separation module, or a combination thereof). High throughput can be achieved by operating unloading and packaging devices independently and in parallel. In some embodiments, high throughput can be maximized by including more than one type of module in a given unloading and packaging device, specifically when a given individual module has a lower throughput (than other modules). The unloading and packaging system can include a control module that controls each unloading and packaging device and coordinates the parallel operation of the unloading and packaging devices.

The control module can also control the operation between modules so that the unloading and packaging process is efficient and simplified. Each of the plurality of modules can be capable of automatically transferring the pharmaceutical units to another module in a continuous manner. Additionally, the components and processes within each of the plurality of modules can capable of operating automatically, independently, and continuously. The plurality of modules can utilize robots, which may simplify the unloading and packaging systems and methods, along with providing a high degree of flexibility.

In some embodiments, the unloading and packaging systems and methods may use a loading/unloading robot and an inspection robot that cooperatively operate to separate the pharmaceutical units from the post-printing film received from the additive manufacturing system. This type of separation may involve the loading/unloading robot gently gripping the pharmaceutical units, while the inspection robot gently peels the post-printing film. The cooperative operation between the two robots and the controlled method of separation can ensure that the pharmaceutical units are not damaged or deformed.

In some embodiments, the unloading and packaging systems and methods may use a deformation separation module to separate the pharmaceutical units from the post-printing film received from the additive manufacturing system. This type of separation may involve deforming the post-printing film or a material, such as a smart material, coupled to it. The unloading system does not touch the pharmaceutical units while the post-printing film or smart material is being deformed. Since the pharmaceutical units are not touched, they are not damaged or deformed.

The disclosed unloading and packaging devices and production batches of the unloading and packaging systems and methods may also be compartmentalized. After the pharmaceutical units are separated from the post-printing film, the inspection module may inspect the pharmaceutical units to capture certain information, such as one or more characteristics (e.g., size, shape, color, weight, defects, etc.) of the pharmaceutical units. The characteristics and other related information may be stored and linked to the production batch. The unloading and packaging device transfers the pharmaceutical units to a blister machine, which may then package the pharmaceutical units into blister packs. The unloading and packaging device transfers the pharmaceutical units in the blister packs to a label marking station. The label marking station can label the blister packs with a label that can link it the information captured by the inspection module. The blister packs can be packaged into a medicine box, and the label marking station can label the medicine box.

The pharmaceutical units of a single production batch may be transferred between modules without leaving the unloading and packaging device. The continuous transfer of a single production batch between modules of a given device can ensure that pharmaceutical units from different production batches do not get mixed together. Additionally, the linking of information of both the pharmaceutical units and the production processes to the packaged blister packs and medicine boxes can ensure traceability and that its information is precise and accurate.

An exemplary continuous manufacturing system for unloading and packaging pharmaceutical units from an additive manufacturing system comprises: a loading/unloading module for receiving the pharmaceutical units from the additive manufacturing system, wherein the pharmaceutical units are deposited on a post-printing film when received from the additive manufacturing system; an inspection module for inspecting the pharmaceutical units; and a control module for controlling the loading/unloading module and the inspection module, the control causing the loading/unloading module and the inspection module to separate the pharmaceutical units from the post-printing film.

In some embodiments, the loading/unloading module comprises: a loading/unloading robot suction cup module capable of being attached to or detached from a loading/unloading robot, using an automatic tool changer.

In some embodiments, the loading/unloading robot suction cup module comprises loading/unloading robot suction cups for picking up the post-printing film using suction.

In some embodiments, the loading/unloading robot suction cups are for holding a new film using suction.

In some embodiments, the loading/unloading module comprises: a loading/unloading robot gripper tool module capable of being attached to or detached from a loading/unloading robot, using an automatic tool changer.

In some embodiments, the loading/unloading robot gripper tool module comprises loading/unloading robot gripper tools for gripping the pharmaceutical units.

In some embodiments, the loading/unloading module comprises: a film stack for holding one or more new films.

In some embodiments, the loading/unloading module comprises: a sensor for sensing a height of the one or more new films in the film stack, and a linear actuator for adjusting the height of the one or more new films in the film stack.

In some embodiments, the loading/unloading module comprises: a buffer station for receiving the pharmaceutical units deposited on the post-printing film from the additive manufacturing system.

In some embodiments, the inspection module comprises: an inspection robot module attached to an inspection robot.

In some embodiments, the inspection robot module comprises inspection robot suction cups for holding a set of the pharmaceutical units using suction.

In some embodiments, the inspection robot module comprises inspection robot gripper tools for gripping the post-printing film.

In some embodiments, the inspection robot module comprises an inspection robot camera tool for capturing one or more images of a set of the pharmaceutical units.

In some embodiments, the inspection module comprises: an unloading position for receiving the pharmaceutical units deposited on the post-printing film from the loading/unloading module.

In some embodiments, the unloading position comprises a plurality of geometrical features, wherein the pharmaceutical units are configured to be located in the geometrical features.

In some embodiments, the inspection module comprises: a weighing station including one or more weight scales for weighing a set of the pharmaceutical units, wherein the one or more weight scales include one or more pits for holding the set of the pharmaceutical units.

In some embodiments, a spacing between adjacent inspection robot suction cups of the inspection module is equal to a spacing between adjacent pits of the one or more weight scales.

In some embodiments, the inspection module comprises: a tablet box for holding disqualified pharmaceutical units.

In some embodiments, the inspection module comprises: a film recycle box for holding the post-printing film after being separated from the pharmaceutical units.

In some embodiments, the system further comprises: a packaging module for labeling, packaging, or both.

In some embodiments, the packaging module comprises a blister machine for packaging qualified pharmaceutical units into a blister pack.

In some embodiments, the packaging module comprises a blister pack position for receiving the blister pack after the qualified pharmaceutical units are sealed into the blister pack.

In some embodiments, the packaging module comprises a packaging robot module attached to a packaging robot.

In some embodiments, the packaging robot module comprises packaging robot suction cups for holding a blister pack, a medicine box, or both using suction.

In some embodiments, the packaging robot module comprises: a pressing block for pressing a flap of a medicine box; and a glue dispenser for dispensing glue on a medicine box.

In some embodiments, the packaging module comprises a label marking station for labeling a blister pack, a medicine box, or both.

In some embodiments, the packaging module comprises a boxing position for assembling a medicine box, wherein the boxing position is for holding the medicine box while one or more blister packs are placed in the medicine box.

In some embodiments, the packaging module comprises a stack position for holding a medicine box after being sealed.

In some embodiments, the packaging module comprises a box storage for holding a medicine box before being assembled.

In some embodiments, the control module is configured to control operation of the loading/unloading module, the inspection module, a packaging module, or a combination thereof.

An exemplary continuous manufacturing system for unloading and packaging pharmaceutical units from an additive manufacturing system comprises: a loading/unloading module for receiving the pharmaceutical units from the additive manufacturing system, wherein the pharmaceutical units are deposited on a post-printing film when received from the additive manufacturing system; an inspection module for inspecting the pharmaceutical units; and a deformation separation module for separating the pharmaceutical units from the post-printing film.

In some embodiments, the deformation separation module is a film deformation separation module, the film deformation separation module comprises: a guide slot and an unloading plate for deforming the post-printing film, the deformation of the post-printing film causing the separation of the pharmaceutical units from the post-printing film.

In some embodiments, the film deformation separation module comprises: a plurality of drive friction wheels and a plurality of driven friction wheels configured to move the post-printing film towards the guide slot.

In some embodiments, the film deformation separation module comprises: an electric actuator for moving the post-printing film towards the guide slot; and one or more pneumatic actuators for pressing down on the post-printing film.

In some embodiments, the unloading plate includes a plurality of slots configured to receive the pharmaceutical units after being separated from the post-printing film.

In some embodiments, the guide slot can be configured to receive the post-printing film after being separated from the pharmaceutical units.

In some embodiments, the deformation separation module is a smart material deformation separation module, the smart material deformation separation module comprises: a smart material configured to be deformed and coupled to the post-printing film, the deformation of the smart material causing the post-printing film to be deformed, wherein the deformation of the post-printing film causes the separation of the pharmaceutical units from the post-printing film.

In some embodiments, the smart material is a piezoelectric material.

In some embodiments, the deformation of the smart material includes stretching the smart material or bending at ends of the smart material.

In some embodiments, the smart material deformation separation module comprises circuitry configured to apply one or more signals to the smart material, wherein the one or more signals cause the deformation of the smart material.

In some embodiments, the control module is configured to control operation of the loading/unloading module, the inspection module, a packaging module, a deformation separation module, or a combination thereof.

In some embodiments, the additive manufacturing system comprises: a material supply module for receiving a set of printing materials; a flow distribution module comprising a flow distribution plate, wherein the material supply module is configured to transport a single flow corresponding to the set of printing materials to the flow distribution plate, wherein the flow distribution plate comprises a plurality of channels for dividing the single flow into a plurality of flows; a plurality of nozzles; and one or more additive manufacturing controllers for controlling the plurality of nozzles to dispense the plurality of flows based on a plurality of nozzle-specific parameters.

In some embodiments, the additive manufacturing system comprises: a first printing station including a first printing platform and a first plurality of nozzles; a second printing station including a second printing platform and a second plurality of nozzles; a film transport mechanism, wherein the system is configured to: while the post-printing film is positioned on the first printing platform, determine whether printing of a first portion of each pharmaceutical unit is complete at the first printing station; in accordance with the determination that the printing of the first portion is complete at the first printing station, identify the second printing station; transport the post-printing film from the first printing platform to the second printing platform via the film transport mechanism; and cause printing of a second portion of each pharmaceutical unit at the second printing station.

In some embodiments, the loading/unloading module is a first loading/unloading module, the inspection module is a first inspection module, the first loading/unloading module and the first inspection module are included in a first unloading and packaging device, the system further comprising: a second unloading and packaging device including a second loading/unloading module and a second inspection module.

In some embodiments, the control module is configured to control operation of the first unloading and packaging device, the second unloading and packaging device, or both.

An exemplary method for continuous unloading and packaging of pharmaceutical units from an additive manufacturing system comprises: unloading, using a loading/unloading module, first pharmaceutical units and a post-printing film, wherein the first pharmaceutical units are deposited on the post-printing film when received from the additive manufacturing system, wherein the loading/unloading module includes a loading/unloading robot, the loading/ unloading robot capable of being attached to and detached from a loading/unloading robot suction cup module and a loading/unloading robot gripper tool module; separating, using the loading/unloading module and an inspection module, the first pharmaceutical units from the post-printing film.

In some embodiments, the inspection module includes inspection robot gripper tools, inspection robot suction cups, and an inspection robot camera tool, the method further comprising: inspecting, using the inspection module, the first pharmaceutical units after being separated from the post-printing film; and determining whether the first pharmaceutical units qualify to result in qualified pharmaceutical units.

In some embodiments, the method further comprises packaging, using a packaging module, the qualified pharmaceutical units in blister packs and a medicine box, wherein the packaging module includes a blister machine, a pressing block, and a glue dispenser.

In some embodiments, the unloading the first pharmaceutical units comprises picking up, using the loading/unloading robot suction cup module, the post-printing film at a film transport mechanism.

In some embodiments, the unloading the first pharmaceutical units comprises automatically transporting, using the loading/unloading robot suction cup module, the post-printing film to a buffer station.

In some embodiments, the method further comprises picking up, using the loading/unloading robot suction cup module, a new film from a film stack, and transporting it to a film transport mechanism.

In some embodiments, the method further comprises printing, using the printing station, second pharmaceutical units on the new film.

In some embodiments, the method further comprises replacing the loading/unloading suction cup module with the loading/unloading robot gripper tool module after the first pharmaceutical units and post-printing film have been unloaded and before being separated.

In some embodiments, the separating the first pharmaceutical units from the post-printing film comprises gripping, using the loading/unloading robot gripper tool module, the first pharmaceutical units.

In some embodiments, the separating the first pharmaceutical units from the post-printing film comprises peeling, using the inspection robot gripper tools, the post-printing film while the loading/unloading robot gripper tool module grips the pharmaceutical units.

In some embodiments, the method further comprises placing, using a loading/unloading robot gripper tool module, the pharmaceutical units at an unloading position after the first pharmaceutical units have been separated from the post-printing film.

In some embodiments, the method further comprises automatically transporting, using the inspection robot gripper tools, the post-printing film to a film recycle box after the first pharmaceutical units have been separated from the post-printing film.

In some embodiments, the inspecting the first pharmaceutical units comprises capturing, using the inspection robot camera tool, a plurality of images of the first pharmaceutical units.

In some embodiments, the inspecting the first pharmaceutical units comprises measuring, using a weighing station, weights of the first pharmaceutical units.

In some embodiments, the determining whether the first pharmaceutical units qualify comprises using the captured images and the measured weights of the first pharmaceutical units.

In some embodiments, the method further comprises automatically transporting, using the inspection robot suction cups, disqualified pharmaceutical units to a tablet box.

In some embodiments, the method further comprises automatically transporting, using the inspection robot suction cups, the qualified pharmaceutical units to the blister machine.

In some embodiments, the packaging the qualified pharmaceutical units comprises placing and sealing the qualified pharmaceutical units in a blister pack.

In some embodiments, the packaging the qualified pharmaceutical units comprises automatically transporting the blister pack to a label marking station.

In some embodiments, the packaging the qualified pharmaceutical units comprises labeling, using the label marking station, the blister pack with a QR code.

In some embodiments, the packaging the qualified pharmaceutical units comprises automatically transporting the blister pack into a medicine box.

In some embodiments, the packaging the qualified pharmaceutical units comprises packing, using the pressing block and the glue dispenser, the medicine box.

BRIEF DESCRIPTION OF THE DRAWINGS

FIG. 3B illustrates plan views of an exemplary film stack with (left) and without (right) a fixture, according to some embodiments of the disclosure.

FIG. 4A illustrates a plan view of an exemplary inspection module, according to some embodiments of the disclosure.

FIG. 4I illustrates a flowchart of an exemplary operation of automatically transporting disqualified pharmaceutical units to the tablet box, according to some embodiments.

FIG. 6 illustrates a block diagram of an exemplary control module, in accordance with some embodiments of the disclosure.

FIG. 9A illustrates a view of an exemplary additive manufacturing system, according to some embodiments of the disclosure.

DETAILED DESCRIPTION

Figure 1:
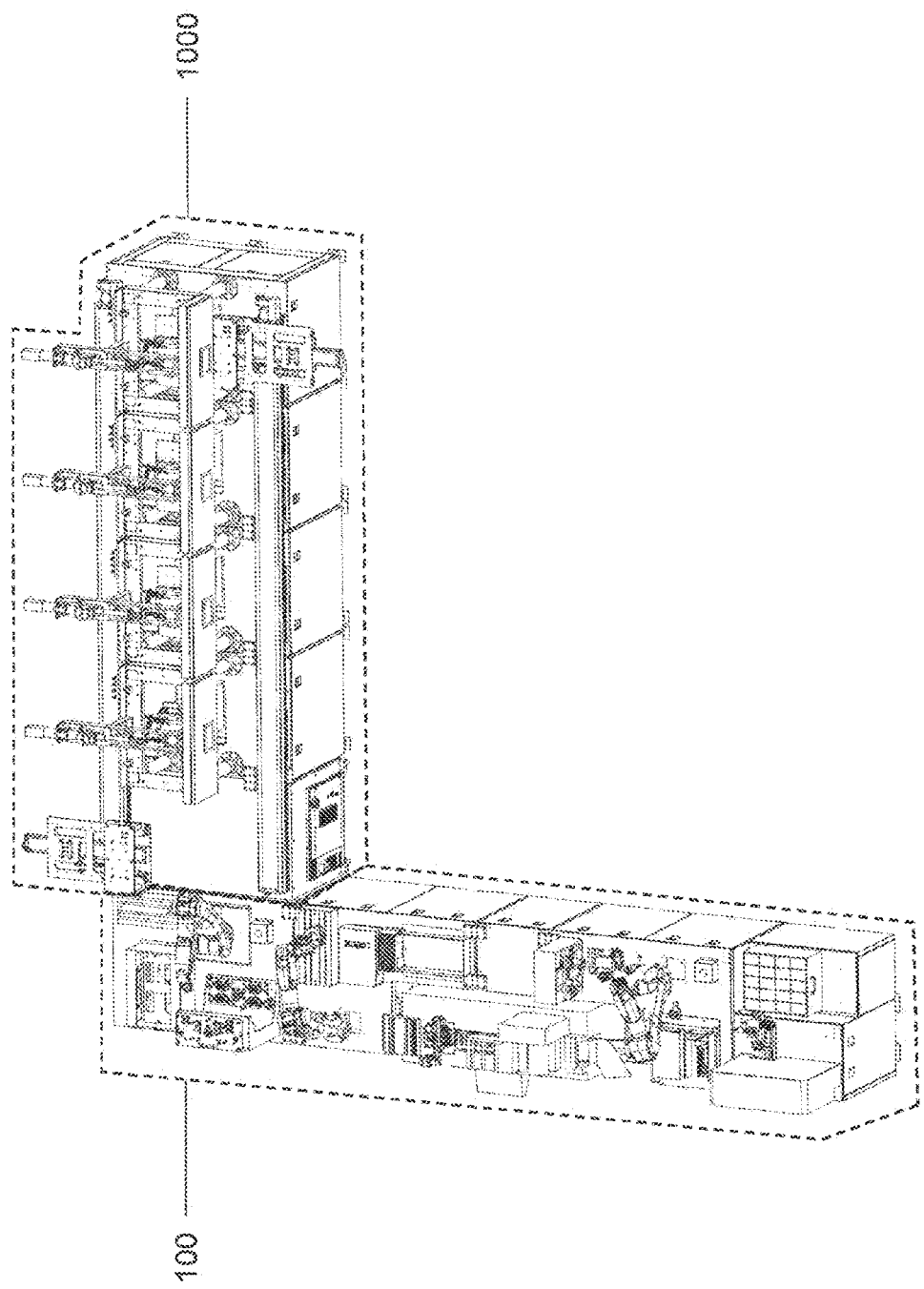
FIG. 1 illustrates a plan view of an exemplary continuous additive manufacturing printing, unloading, and packaging system, according to some embodiments.

Described herein are high throughput, efficient, and simplified unloading and packaging systems and methods for large-scale production of pharmaceutical units using additive manufacturing. The disclosed systems and methods may unload, package, and trace pharmaceutical units, produced by an additive manufacturing system, that are not damaged or deformed. The unloading and packaging system of the disclosure can be configured to receive pharmaceutical units temporarily connected to a post-printing film.

The unloading and packaging system can include one or more unloading and packaging devices. Each unloading and packaging device can include a plurality of modules (e.g., a loading/unloading module, an inspection module, a packaging module, a deformation separation module, or a combination thereof). High throughput can be achieved by operating unloading and packaging devices independently and in parallel. In some embodiments, high throughput can be maximized by including more than one type of module in a given unloading and packaging device, specifically when a given individual module has a lower throughput (than other modules). The unloading and packaging system can include a control module that controls each unloading and packaging device and coordinates the parallel operation of the unloading and packaging devices.

The control module can also control the operation between modules so that the unloading and packaging process is efficient and simplified. Each of the plurality of modules can be capable of automatically transferring the pharmaceutical units to another module in a continuous manner. Additionally, the components and processes within each of the plurality of modules can capable of operating automatically, independently, and continuously. The plurality of modules can utilize robots, which may simplify the unloading and packaging systems and methods, along with providing a high degree of flexibility.

In some embodiments, the unloading and packaging systems and methods may use a loading/unloading robot and an inspection robot that cooperatively operate to separate the pharmaceutical units from the post-printing film received from the additive manufacturing system. This type of separation may involve the loading/unloading robot gently gripping the pharmaceutical units, while the inspection robot gently peels the post-printing film. The cooperative operation between the two robots and the controlled method of separation can ensure that the pharmaceutical units are not damaged or deformed.

In some embodiments, the unloading and packaging systems and methods may use a deformation separation module to separate the pharmaceutical units from the post-printing film received from the additive manufacturing system. This type of separation may involve deforming the post-printing film or a material, such as a smart material, coupled to it. The unloading and packaging system does not touch the pharmaceutical units while the post-printing film or smart material is being deformed. Since the pharmaceutical units are not touched, they are not damaged or deformed.

The disclosed unloading and packaging devices and production batches of the unloading and packaging systems and methods may also be compartmentalized. After the pharmaceutical units are separated from the post-printing film, the inspection module may inspect the pharmaceutical units to capture certain information, such as one or more characteristics (e.g., size, shape, color, weight, defects, etc.) of the pharmaceutical units. The characteristics and other related information may be stored and linked to the production batch. The unloading and packaging device transfers the pharmaceutical units to a blister machine, which may then package the pharmaceutical units into blister packs. The unloading and packaging device transfers the pharmaceutical units in the blister packs to a label marking station. The label marking station can label the blister packs with a label that can link it the information captured by the inspection module. The blister packs can be packaged into a medicine box, and the label marking station can label the medicine box.

The pharmaceutical units of a single production batch may be transferred between modules without leaving the unloading and packaging device. The continuous transfer of a single production batch between modules of a given device can ensure that pharmaceutical units from different production batches do not get mixed together. Additionally, the linking of information of both the pharmaceutical units and the production processes to the packaged blister packs and medicine boxes can ensure traceability and that its information is precise and accurate.

The following description is presented to enable a person of ordinary skill in the art to make and use the various embodiments. Descriptions of specific devices, techniques, and applications are provided only as examples. These examples are being provided solely to add context and aid in the understanding of the described examples. It will thus be apparent to one skilled in the art that the described examples may be practiced without some or all of the specific details. Other applications are possible, such that the following examples should not be taken as limiting. Various modifications in the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

In the following description of examples, reference is made to the accompanying drawings in which it is shown by way of illustration specific examples that can be practiced. It is to be understood that other examples can be used and structural changes can be made without departing from the scope of the various examples.

Although the following description uses terms "first," "second," etc. to describe various elements, these elements should not be limited by the terms. These terms are only used to distinguish one element from another. For example, a first inspection module could be termed a second inspection module, and similarly, a second inspection module could be termed a first inspection module, without departing from the scope of the various described embodiments. The first inspection module and the second inspection module are both inspection modules, but they are not the same inspection module.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used throughout this disclosure, a reference number without an alpha character following the reference number can refer to one or more of the corresponding reference, the group of all references, or some of the references. For example, "104" can refer to any one of the pharmaceutical units (e.g., pharmaceutical units 104A or pharmaceutical units 104H), can refer to all of the pharmaceutical units (e.g., pharmaceutical units 104A-104H), or can refer to some of the pharmaceutical units (e.g., pharmaceutical units 104A).

FIG. 1 illustrates a plan view of an exemplary continuous additive manufacturing printing, unloading, and packaging system, according to some embodiments. The continuous additive manufacturing printing, unloading, and packaging system can include an unloading and packaging device 100 and a multi-station printing station 1000. The unloading and packaging device 100 and the multi-station printing station 1000 are discussed below.

Overview of an Exemplary Unloading and Packaging Device

Figure 2A:
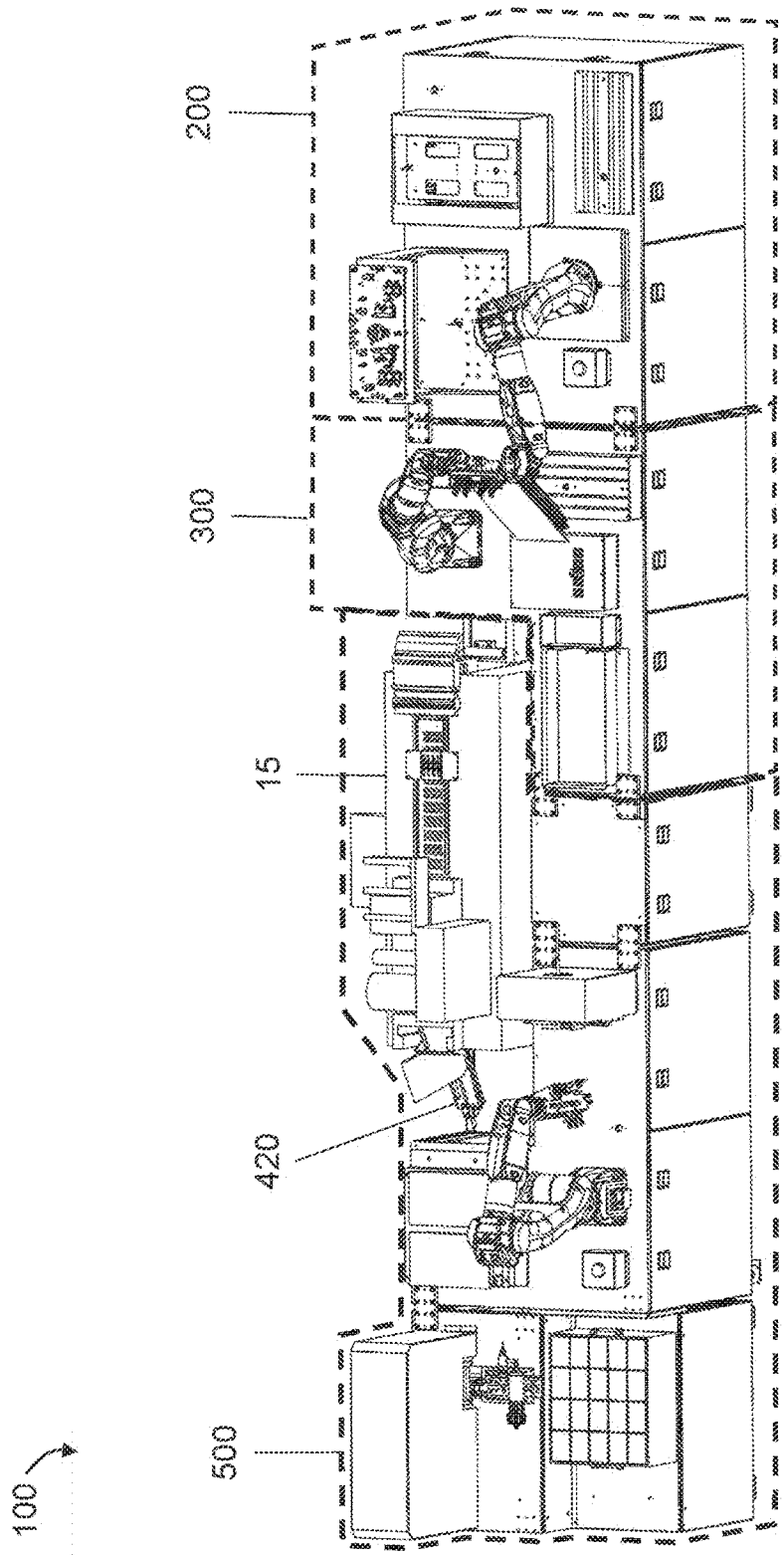
FIG. 2A illustrates a plan view of an exemplary unloading and packaging device, according to some embodiments of the disclosure.

FIG. 2A illustrates a plan view of an exemplary unloading and packaging device, according to some embodiments of the disclosure.

The unloading and packaging device 100 may be for loading and unloading pharmaceutical units from an additive manufacturing system. The unloading and packaging device 100 can include a modular configuration having a plurality of modules. In some embodiments, each module can have a robot as its core component. The modular configuration and plurality of modules can allow individual modules to be arranged in any relative order, at any location, and with any number in the unloading and packaging device 100. The flexibility of the modular configuration allows one or more modules to be removed or added at any given time due to, e.g., expansion, downsizing, module repair, module upgrades, etc.

The plurality of modules can include, but are not limited to, a loading/unloading module 200, an inspection module 300, a packaging module 500, and a control module (e.g., control module 600 of FIG. 6). In some embodiments, the unloading and packaging device 100 may include a deformation separation module (e.g., a film deformation separation module 700 of FIG. 7A or a smart material deformation separation module 800 of FIG. 8A; both discussed below). The unloading and packaging device 100 may be utilize the modules to perform one or more functionalities.

The additive manufacturing system may include a multi-station printing station 1000 may located at any location relative to the unloading system and packaging device 100 as long as the unloading and packaging device 100 has the capability of receiving pharmaceutical units (e.g., pharmaceutical units 104 of FIG. 2C, discussed below) from the additive manufacturing system. As one non-limiting example, the additive manufacturing system may be located proximate to the loading/unloading module 200, as shown in FIG. 1. The additive manufacturing system is discussed in more detail below.

The loading/unloading module 200 may be configured to transport the pharmaceutical units 104 from one module to another. For example, the unloading module 200 may be configured to receive the pharmaceutical units 104 from the additive manufacturing system. In some embodiments, the pharmaceutical units 104 may be deposited on a post-printing film (e.g., post-printing film 103 of FIG. 2C, discussed below) when received from the additive manufacturing system. The loading/unloading module 200 may be configured to automatically transport the pharmaceutical units 104 to the inspection module 300.

As used throughout this disclosure, a "post-printing film" refers to a layer that has been exposed to the 3D printing process and supports the pharmaceutical units 104 during the 3D printing process. In some embodiments, during the 3D printing process, the pharmaceutical units 104 may be located between one or more printing nozzles of the additive manufacturing system and the post-printing film 103. As used throughout this disclosure, a "new film" refers to a film that has not been exposed to the 3D printing process.

In some embodiments, the loading/unloading module 200 may be configured to help separate the pharmaceutical units 104 from the post-printing film 103. The loading/unloading module 200 may cooperatively operate (e.g., coordinate) with the inspection module 300 to separate the pharmaceutical units 104 from the post-printing film 103. In some embodiments, the cooperative operation may include a control module that controls and coordinates the loading/unloading module 200 and the inspection module 300 working together to separate the pharmaceutical units 104 from the post-printing film 103.

The inspection module 300 may be configured to inspect the pharmaceutical units 104. The inspection process may be used to determine which pharmaceutical units 104 are considered qualified and which ones are considered disqualified (also referred to as not qualified). Qualified pharmaceutical units 104 may be pharmaceutical units that have one or more characteristics that meet one or more criteria. Exemplary criteria can include, but are not limited to, having a color within a pre-defined range of colors, having a size within a pre-defined range of sizes, having a shape within a pre-defined range of sizes, having a weight within a pre-defined range of weights, having a number of defects within a pre-defined range of numbers. As used throughout this disclosure, a range can include one or multiple values. In some embodiments, the measured characteristics of the pharmaceutical units 104 can be compared to different standards of different tablets.

In some embodiments, the inspection module 300 may be configured to transport qualified pharmaceutical units 104 to the blister machine 15 of the packaging module 500. In some embodiments, the inspection module 300 may automatically transport qualified pharmaceutical units 104 to the blister machine 15. The inspection module 300 may also be configured to automatically transport disqualified pharmaceutical units 104 to a tablet box (e.g., tablet box 12 of FIG. 4A, discussed below). The tablet box 12 may be included in the inspection module 300, for example, so the automatically transportation may occur within the inspection module 300.

Additionally or alternatively, the inspection module 300 may be configured to help separate the post-printing film 103 from the pharmaceutical units 104. The inspection module 300 may cooperatively operate with the loading/unloading module 200 to separate the post-printing film 103 from the pharmaceutical units 104. In some embodiments, the cooperative operation may include a control module that controls and coordinates the inspection module 300 and the loading/unloading module 200 working together to separate the post-printing film 103 from the pharmaceutical units 104.

The packaging module 500 may include several components, some for labeling and some for assembling. The packaging module 500 may include a blister machine 15. The blister machine 15 may be configured to package and seal qualified pharmaceutical units 104 in a blister pack. In some embodiments, the qualified pharmaceutical units 104 may be received from the inspection module 300. The blister machine 15 may be configured to transport the sealed blister pack to the blister pack position 420, as discussed in more detail below.

In some embodiments, the packaging module 500 may be configured to label a blister pack. In some embodiments, the packaging module 500 may be configured to label a medicine box. Additionally or alternatively, the packaging module 500 may be configured to assemble a medicine box and package blister pack(s) into the medicine box.

The unloading and packaging device 100 may also include a control module (e.g., control module 600 of FIG. 6). The control module can include one or more computer systems. The computer system(s) may be used to control the operation of one or more unloading and packaging devices 100. The computer system(s) may also be used to control the operation of one or more modules of an unloading and packaging device 100. In some embodiments, the computer system(s) may be used to control the operation of one or more printing stations 1000. As discussed in more detail below, the control module may cause (e.g., by sending control signals) the loading/unloading module 200 to automatically transport pharmaceutical units 104 deposited on a post-printing film 103 to the inspection module 300, for example. As another example, the control module may receive and process one or more signals from one or more sensors, such as a proximity sensor coupled to a film stack (e.g., film stack 7 of FIG. 3B, discussed below).

In some embodiments, the computer system(s) may be equipped with one or more transceivers for wireless or wired communication with one or more remote systems, such as a server or remote administrator system. The computer systems, remote systems, or both may store information such as date of manufacture, production batch number, inspection characteristics of the pharmaceutical information, production batch conditions, labels, manufacturing information, and the like.

To increase the throughput of the unloading and packaging device 100, multiple modules of the unloading and packaging device 100 may be configured to operate at the same time. For example, the loading/unloading module 200 may be configured to operate at the same time as the inspection module 300. In some embodiments, the loading/unloading module 200 may be configured to operate at the same time as the blister machine 15. In some embodiments, the inspection module 300 may be configured to operate at the same time as the blister machine 15. In some embodiments, the packaging module 500 may be configured to operate at the same time as the loading/unloading module 200. In some embodiments, the packaging module 500 may be configured to operate at the same time as the inspection module 300. In some embodiments, the packaging module 500 may be configured to operate at the same time as the blister machine 15.

Embodiments of the disclosure apply to large-scale production of pharmaceutical units. With large-scale production, an unloading and packaging device 100 may manufacture a large number of pharmaceutical units 104 in multiple production batches. In some embodiments, the multiple modules may be configured to process different production batches at the same time. For example, the loading/unloading module 200 may be processing a first production batch, while the inspection module 300 is processing a second production batch. In some embodiments, the loading/unloading module 200 may be processing a first production batch, while the blister machine 15 is processing a second production batch or a third production batch. In some embodiments, the inspection module 300 may be processing a first production batch, while the blister machine is processing a second production batch or a third production batch. In some embodiments, the packaging module 500 may be processing a first production batch, while the loading/unloading module 200 is processing a second production batch or a third production batch. In some embodiments, the packaging module 500 may be processing a first production batch, while the inspection module 300 is processing a second production batch or a third production batch. In some embodiments, the packaging module 500 may be processing a first production batch, while the blister machine 15 is processing a second production batch or a third production batch.

As used throughout this disclosure, the term "same time" refers to multiple operations that may occur simultaneously, at least in part. For example, loading/unloading module 200 may start processing a second production batch, followed by the inspection module 300 starting to process a first production batch, followed by the loading/unloading module 200 completing the processing of the second production batch. In such an instance, at least part of the processing of the first production batch by the inspection module 300 occurs simultaneously with at least part of the processing of the second production batch by the loading/unloading module 200, and thus, multiple modules are operating at the same time.

Although the figure shows one loading/unloading module 200, one inspection module 300, and one packaging module 500, embodiments of the disclosure are not limited to one of each module and may include more than one module of a given type of module. Additionally, embodiments of the disclosure are not limited the same number of each module included in a given unloading and packaging device 100, and may include configurations having more than one of a given type of module. For example, if the inspection module 300 has a slower throughput than the loading/unloading module 200, the unloading and packaging device 100 can include two inspection modules 300 (e.g., a first inspection module 300 and a second inspection module 300) and one loading/unloading module 200. The loading/unloading module 200 may alternate delivery of pharmaceutical units 104 between the first inspection module 300 and the second inspection module 300. In such instance, the throughput of the overall unloading and packaging device 100 may not be limited by the throughput of a single inspection module 300.

The components and functionality of each module will be discussed in more detail below.

Exemplary Operation of an Unloading and Packaging Device

Figure 2B:
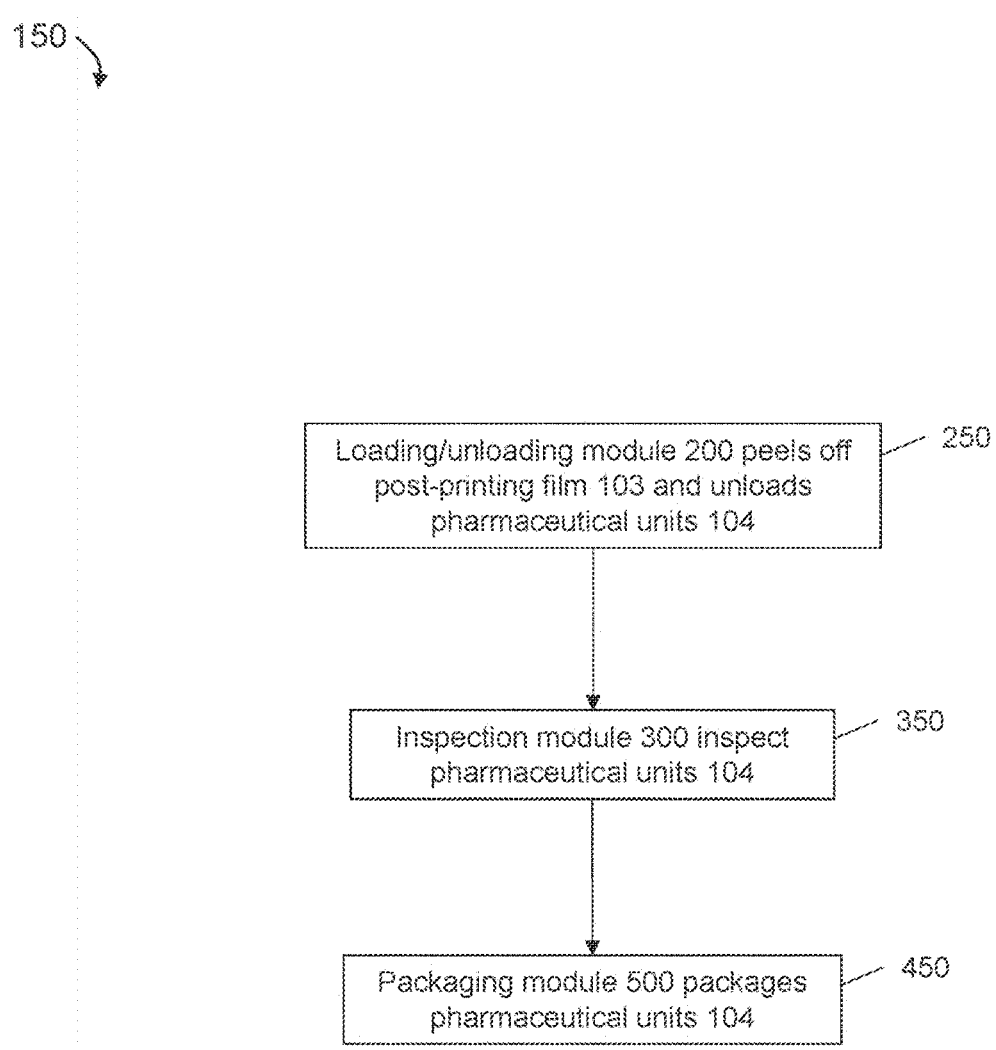
FIG. 2B illustrates a flowchart of an exemplary operation of an unloading and packaging device, according to some embodiments of the disclosure.

FIG. 2B illustrates a flowchart of an exemplary operation of an unloading and packaging device, according to some embodiments of the disclosure. Process 150 discusses the overall, high-level operation of an unloading and packaging device 100. Details of how each module operates are provided below.

Process 150 may include process 250, process 350, and process 450. A high-level overview of each process is provided with further details given below. Process 250 may include the loading/unloading module 200 unloading the pharmaceutical units 104. The unloading and packaging device 100 may receive pharmaceutical units 104 from an additive manufacturing system. For example, the additive manufacturing system may place the pharmaceutical units 104 at a buffer station (e.g., buffer station 8 of FIG. 3A, discussed below) of the loading/unloading module 200.

Figure 2C:
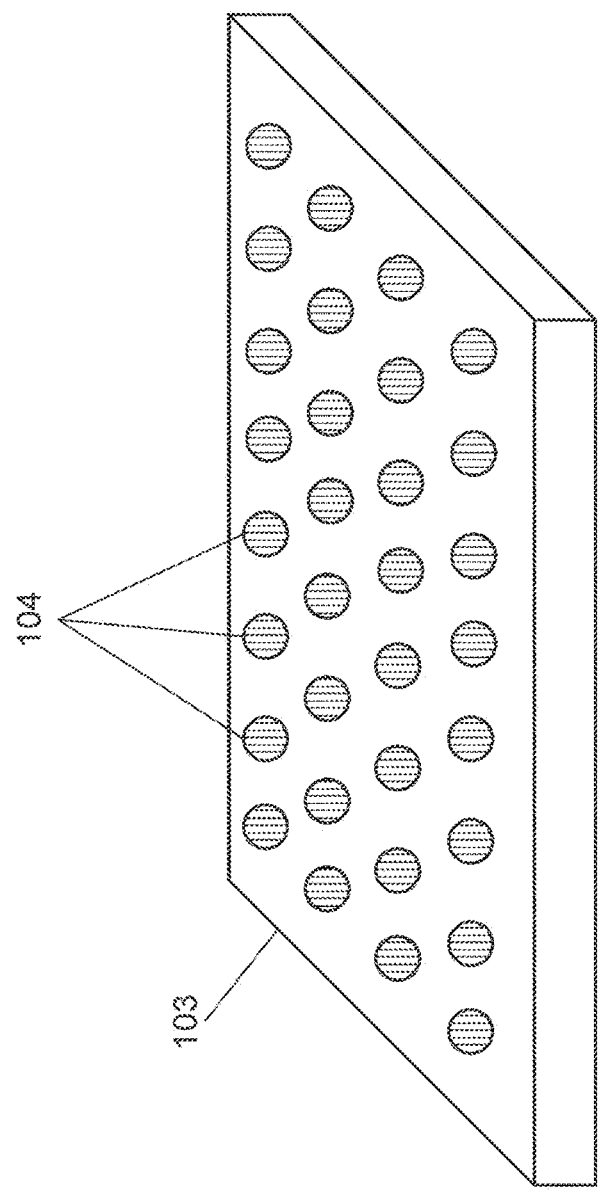
FIG. 2C illustrates a plan view of exemplary pharmaceutical units temporarily connected to a post-printing film, according to some embodiments of the disclosure.

In some embodiments, as shown in FIG. 2C, the pharmaceutical units 104 received from the additive manufacturing system may be deposited on a post-printing film 103. The post-printing film 103 may be any type of material capable of being exposed to the 3D printing process. One skilled in the art would understand that a material capable of being exposed to the 3D printing process would be one that, when exposed, would not cause a detrimental effect, such as outgassing of an absorbable substance, to the pharmaceutical units 104. In some embodiments, the post-printing film 103 may be any type of material capable of withstanding separation from the pharmaceutical units 104. One skilled in the art would understand that a material capable of withstanding separation from the pharmaceutical units 104 would be one that would not break or crack from the separation process disclosed herein and would not cause damage to the pharmaceutical units 104 or a leave a residual substance on them.

In some embodiments, the number of pharmaceutical units 104 in a single production batch may be greater than or equal to 32. In some embodiments, the post-printing film 103 may be a material capable of holding the number of pharmaceutical units 104 in a single production batch.

Exemplary materials for the post-printing film 103 may include, but are not limited to, a polyvinyl chloride (PVC) film, low-density polyethylene (LDPE), high-density polyethylene (HDPE), polyethylene terephthalate (PET), polypropylene (PP), polyvinylidene chloride (PVDC), polycarbonate (PC), polyamide (PA), polychlorotrifluoroethylene (PCTFE), and hydroxypropyl cellulose (HPC).

Referring back to FIG. 2B, in process 250, the loading/unloading module 200 may automatically transport the post-printing film 103 with pharmaceutical units 104 temporarily connected to it to the inspection module 300. In some embodiments, the loading/unloading module 200 may place the post-printing film 103 and pharmaceutical units 104 at a buffer station (e.g., buffer station 8 of FIG. 3A, discussed below) of the loading/unloading module 200.

Alternatively, in some embodiments, the loading/unloading module 200 may automatically transport the post-printing film 103 with pharmaceutical units 104 temporarily connected to it to a deformation module (e.g., a film deformation separation module 700 or a smart material deformation separation module 800).

Process 250 may also include the loading/unloading module 200 automatically transporting a new film to the additive manufacturing system. The loading/unloading module 200 may place the new film at the buffer station 8 to be picked up by the additive manufacturing system. A new film may be one that has not been exposed to the additive manufacturing system, and as a result, has not had any printing materials deposited on it.

Additionally, in process 250, the pharmaceutical units 104 may be separated from the post-printing film 103. In some embodiments, the inspection module 300 may receive the post-printing film 103 with pharmaceutical units 104 temporarily connected to it. The loading/unloading module 200 and the inspection module 300 may cooperatively operate to separate the pharmaceutical units 104 from the post-printing film 103.

Alternatively, the film deformation module 700 may receive the post-printing film 103 with pharmaceutical units 104 temporarily connected to it and may separate the pharmaceutical units 104 by deforming the post-printing film 103.

As another option, the smart material deformation module 800 may receive the post-printing film 103 with pharmaceutical units 104 temporarily connected to it and may separate the pharmaceutical units 104 by deforming a material (e.g., a smart material) coupled to the post-printing film 103.

In process 350, the inspection module 300 may be configured to inspect one or more characteristics of the pharmaceutical units 104. The characteristic(s) may include, but is not limited to, color, size, weight, and number of defects. In some embodiments, the characteristics can determine whether there is any medicine in a given pharmaceutical unit 104, whether there is a problem with the color quality of a given pharmaceutical unit 104, and what is the diameter of a given pharmaceutical unit 104. In some embodiments, the characteristic(s) may be determined by capturing one or more images, determining the weights, or both. In some embodiments, other types of measurements may be taken to determine the characteristics of the pharmaceutical units 104. For example, the inspection module 300 may be configured to inspect a pharmaceutical unit 104 based on height. As another example, the inspection module 300 may be configured to inspect a pharmaceutical unit 104 based on its shape. Additive manufacturing may produce pharmaceutical units 104 that can have any shape such as a cylindrical shape or a rectangular shape with rounded corners.

The characteristics may be used to determine whether a given pharmaceutical unit 104 qualifies or does not qualify.

As part of process 350, if a pharmaceutical unit 104 qualifies, then the inspection module 300 may automatically transport the qualified pharmaceutical units 104 to the blister machine 15. The inspection module 300 may automatically transport one or multiple qualified pharmaceutical units 104 at the same time to the blister machine 15.

Also as part of process 350, if a pharmaceutical unit 104 does not qualify, then the inspection module 300 may dispose of the disqualified pharmaceutical units 104 by automatically transporting them to a tablet box (e.g., tablet box 12 of FIG. 4A, discussed below). The inspection module 300 may automatically transport one or multiple disqualified pharmaceutical units 104 at the same time to the tablet box 12. In some embodiments, the pharmaceutical units 104 in the tablet box 12 may be reused or recycled.

In process 450, the blister machine 15 may package and seal the qualified pharmaceutical units 104 in a blister pack. In some embodiments, the blister pack may include a plurality of pits to encase the qualified pharmaceutical units 104 when packaged into the blister pack. In some embodiments, each pit can encase one pharmaceutical unit 104. The sealed blister pack may be output from the blister machine 15 at the blister pack position 420.

Process 450 also includes the packaging module 500 automatically transporting the sealed blister pack from the blister pack position 420 to the packaging module 500. The packaging module 500 may label the blister pack using a label marking station (e.g., label marking station 14 of FIG. 5A, discussed below). Exemplary labels may include, but are not limited to, a bar code, a QR code, or alphanumeric characters (including letters).

Then, the packaging module 500 may automatically transport the labeled blister pack to a boxing position (e.g., boxing position 18 of FIG. 5A, discussed below).

Process 450 may include the packaging module 500 assembling a medicine box. The packaging module 500 may include a box storage (e.g., box storage 17 of FIG. 5A, discussed below) that holds one or more flattened medicine boxes. The packaging module 500 can automatically transport a flattened medicine box from the box storage 17 to the boxing position 18.

Then, the packaging module 500 can assemble the medicine box. Assembling the medicine box can include unflattening the medicine box, along with folding and sealing the flaps of one end (e.g., the bottom end) of the medicine box.

One or more blister packs can be placed in the medicine box. In some embodiments, multiple blister packs can be placed in one medicine box. Once the targeted number of blister packs are placed in a medicine box, the packaging module 500 can seal the medicine box. Sealing the medicine box can include folding and sealing the flaps of the other end (e.g., the top end) of the medicine box, as discussed in more detail below.

As part of process 450, the packaging module 500 can automatically transport the sealed medicine box to the label marking station 14. The label marking station 14 can label the medicine box. The packaging module 500 may then automatically transport the labeled medicine box can be to a stack position (e.g., stack position 16 of FIG. 5A, discussed below).

Although FIG. 2B illustrates one sequence of the steps discussed above, examples of the disclosure are not limited to the illustrated sequence and can include any sequence. In some embodiments, the sequence may not be pre-defined, and steps may instead be performed based on one or more conditions, such as whether a robot is available and not performing a step (e.g., to increase throughput).

Exemplary Loading/Unloading Module

Figure 3A:
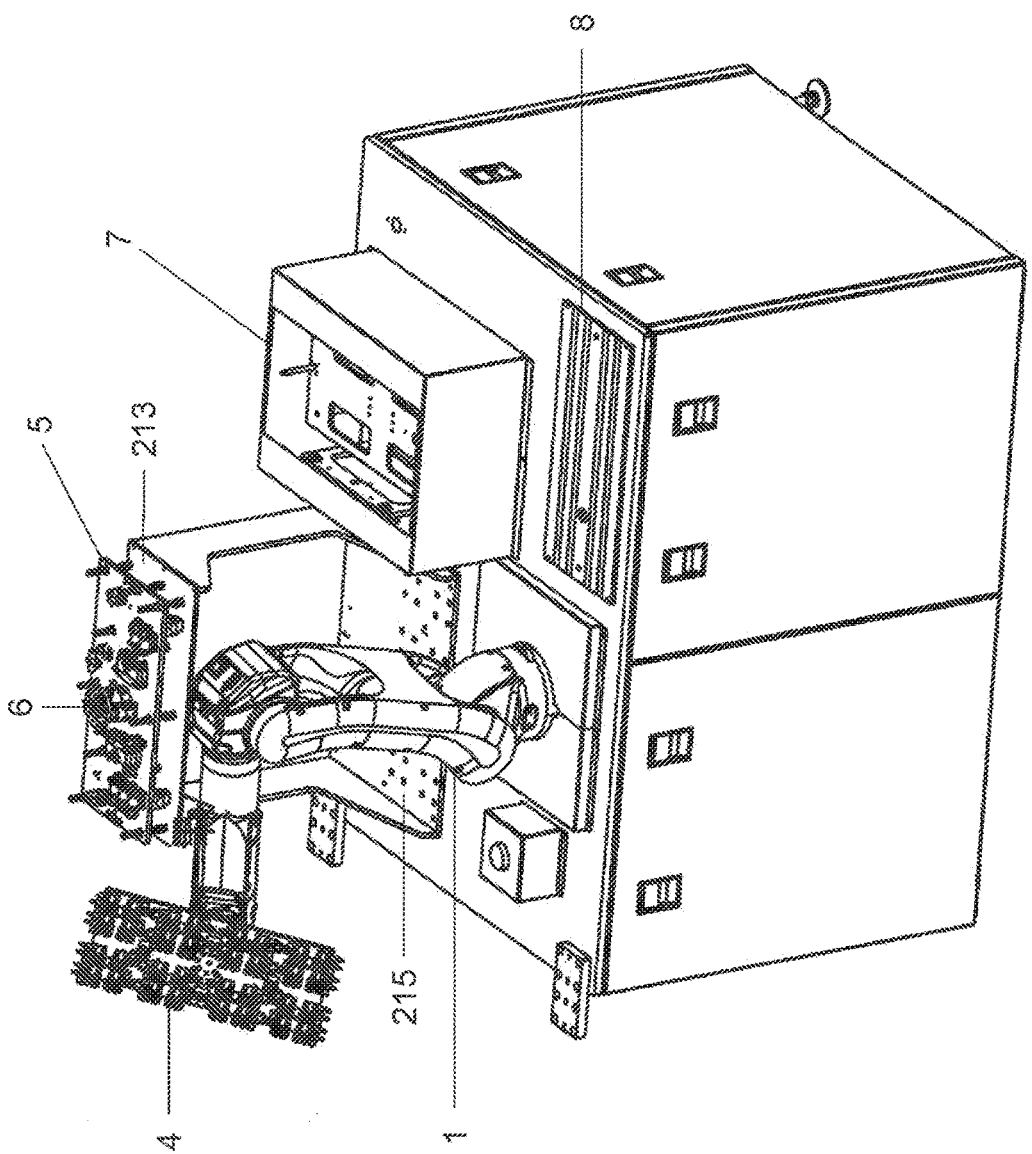
FIG. 3A illustrates a plan view of an exemplary loading/unloading module, according to some embodiments of the disclosure.

FIG. 3A illustrates a plan view of an exemplary loading/unloading module, according to some embodiments of the disclosure.

The loading/unloading module 200 may be for receiving the pharmaceutical units 104 from the additive manufacturing system, wherein the pharmaceutical units 104 are deposited on a post-printing film 103 when received from the additive manufacturing system. The loading/unloading module 200 may include a loading/unloading robot 1, an automatic tool changer 6, a buffer station 8, a film stack 7, a loading/unloading robot suction cup module 5, and a loading/unloading robot gripper tool module 4.

The loading/unloading robot 1 can be a mechanical arm that includes multiple beams and one or more connecting joints. The loading/unloading robot 1 can be capable of moving along multiple (e.g., six) degrees of freedom. In some embodiments, the connecting joint(s) may be located between the beams, and the loading/unloading robot 1 may have two ends. A first end can attach to a tabletop-like surface (as shown in the figure) and a second end can be capable of having a module attached to it. For example, the loading/unloading robot suction cup module 5 or the loading/unloading robot gripper tool module 4 can be capable of being attached to, or detached from the second end of the loading/unloading robot 1 using the automatic tool changer 6.

In some embodiments, the automatic tool changer 6 may be a quick-connection mechanism. The automatic tool changer 6 may be located on the back of the loading/unloading robot suction cup module 5, and an automatic tool changer 6 may be located on the back of the loading/unloading robot gripper tool module 4, a storage location 213, and a storage location 215.

The loading/unloading robot 1 can be configured to automatically transport a post-printing film 103 or a new film, as discussed in more detail below. In some embodiments, the loading/unloading robot 1 can move at a speed of 30-450 cm per minute. In some embodiments, the loading/unloading robot 1 can have a repeated positioning accuracy of ±0.03 mm.

The loading/unloading robot 1 may be configured to receive one or more control signals from a computer system (e.g., one or more computer systems of the control module 600 of FIG. 6). The control signals may be used to control the movement of the loading/unloading robot 1. In some embodiments, the control signals may be used to control the movement of the loading/unloading robot suction cup module 5 and the movement of the loading/unloading robot gripper tool module 4.

The buffer station 8 may be for receiving pharmaceutical units 104 deposited on a post-printing film 103 from the additive manufacturing system. In some embodiments, the buffer station 8 may be for receiving a new film from the film stack 7, where the new film is to be transported to the additive manufacturing system. The buffer station 8 may be a dedicated area located in the loading/unloading module 200. The buffer station 8 may be located where the second end of the loading/unloading robot 1 and/or a film transport mechanism of the additive manufacturing system may be able to reach the buffer station 8.

In some embodiments, the buffer station 8 may include a surface for which objects, such as a post-printing film 103 or a new film, may be placed. In some embodiments, the buffer station 8 may have physical characteristics (e.g., size, shape, etc.) determined based on the physical characteristics of a post-printing film 103, a new film, or both. For example, the surface of the buffer station 8 may include a flat surface for a post-printing or new film to rest on. In some embodiments, a post-printing or new film may have a curved surface, and the surface of the buffer station 8 may have a similarly curved surface.

In some embodiments, the buffer station 8 may have a sensor coupled to it to determine whether an object, such as a post-printing film 103 or a new film, is located at the buffer station 8. In some embodiments, the sensor may be a proximity sensor. The sensor can indicate to and/or trigger the loading/unloading robot 1 to perform certain steps, such as transporting a post-printing film 103 or transporting a new film. In this manner, the loading/unloading robot 1 may be operate continuously to increase the throughput of the loading/unloading module 200.

The film stack 7 may be for holding one or more new films. FIG. 3B illustrates plan views of an exemplary film stack with (left) and without (right) a fixture, according to some embodiments of the disclosure. In some embodiments, the new film(s) may be temporarily stored in the film stack 7 until ready to be used by an additive manufacturing system. In some embodiments, each new film may be stacked on a base plate 303 between the guide posts 305 along different z-heights within the film stack 7. The film stack 7 may include an enclosure 315 that surrounds edges of the stack of new films in the film stack 7.

In some embodiments, one or more sensors 307 and a linear actuator (e.g., a motor 309 and a conversion mechanism 311) may be coupled to the film stack 7. The sensors 307 may be for sensing the height of base plate 313, which the new films in the film stack 7 may rest on. In some embodiments, the sensors 307 may be photoelectric sensors that determine the height of the new film in the film stack 7 using signal transmission and reception.

The linear actuator can be for adjusting the height of the new films in the film stack 7. The motor 309 may drive the conversion mechanism 311 to move the base plate 303 up and down along the z-direction. The sensors 307 and the linear actuator can be configured to ensure that the top surface of the top-most new film in the film stack 7 is at a pre-determined height. For example, when the loading/unloading robot 1 removes the top-most (first) new film from the film stack 7, the top surface of the next (second) new film may be at a lower z-height. The sensors 307 can sense this change in height, and the linear actuator can adjust (e.g., raise) the height of the new films to ensure that the top surface of the second new film is at the pre-determined height. In this manner, the loading/unloading robot 1 may not need to adjust the z-height each time to pick up a new film, thereby increasing the throughput of the loading/unloading module 100.

In some embodiments, the film stack 7 may also include a plurality of wind-knives 313. In some embodiments, new films in the film stack may stick together due to electrostatic attraction. The wind-knives 313 may be configured to blow air between the new films in the film stack 7. In this manner, the loading/unloading robot suction cups (e.g., loading/unloading robot suction cups 102, discussed below) can be prevented from picking up multiple new films at a given time from the film stack 7.

Figure 3C:
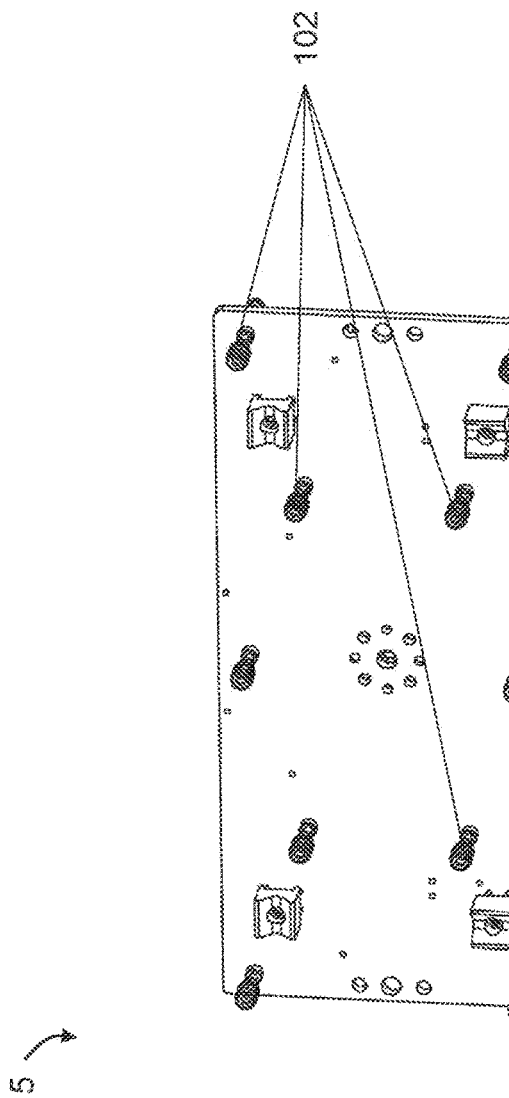
FIG. 3C illustrates a side-view of an exemplary loading/unloading robot suction cup module, according to some embodiments of the disclosure.

Another component of the loading/unloading module 100 can be the loading/unloading robot suction cup module 5. The loading/unloading robot suction cup module 5 can be capable of being attached to or detached from the loading/unloading robot 1. FIG. 3C illustrates a side-view of an exemplary loading/unloading robot suction cup module 5, according to some embodiments of the disclosure.

The loading/unloading robot suction cup module 5 can be configured to pick up a post-printing film 103 using suction. The loading/unloading robot suction cup module 5 can include loading/unloading robot suction cups 102 located at the front of the loading/unloading robot suction cup module 5. The loading/unloading robot suction cup module 5 can be for picking up a post-printing film 103 via suction by creating a plurality of negative pressure pathways. In some embodiments, the loading/unloading robot suction cups 102 can be for holding a new film using suction. In some embodiments, a loading/unloading robot suction cup 102 can have a diameter of 16 mm and a buffer distance of 10 mm.

Although the figure shows 10 loading/unloading robot suction cups 102, embodiments of the disclosure can include any number of loading/unloading robot suction cups 102, such as 6, 8, 12, 14, 16, 18, 20, etc. In some embodiments, the number of loading/unloading robot suction cups 102 can be based on the size of the post-printing film 103. Additionally or alternatively, the relative arrangement of the loading/unloading robot suction cups 102 can be based on the shape of the post-printing film 103 and/or the locations of the pharmaceutical units 104 when deposited on the post-printing film 103.

Figure 3D:
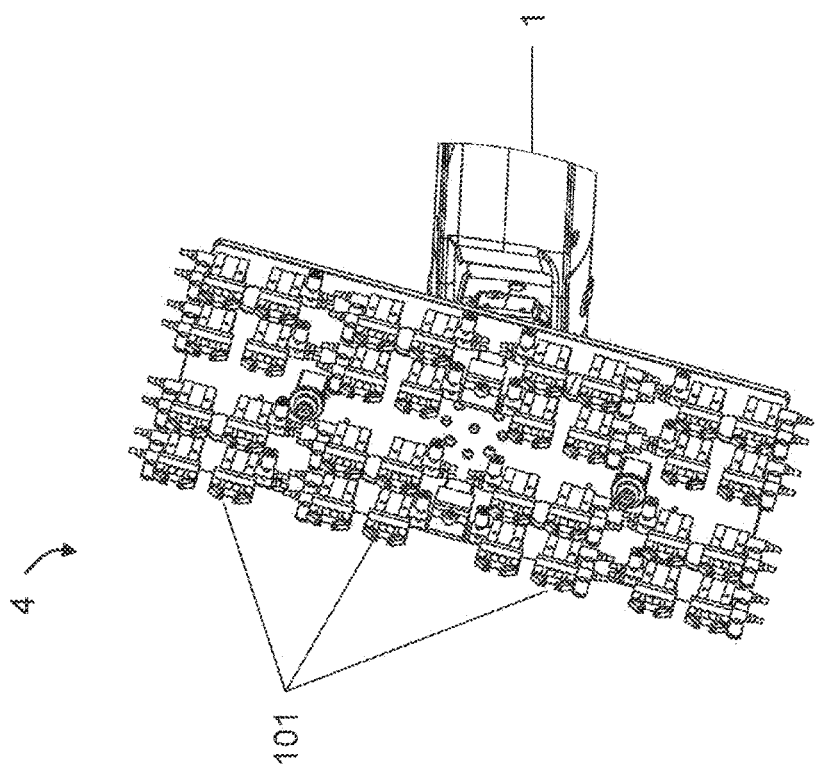
FIG. 3D illustrates a side-view of an exemplary loading/unloading robot gripper tool module, according to some embodiments of the disclosure.

Other modules can be attached to or detached from the loading/unloading robot 1. FIG. 3D illustrates a side-view of an exemplary loading/unloading robot gripper tool module, according to some embodiments of the disclosure.

The loading/unloading robot gripper tool module 4 can be capable of being attached to or detached from the loading/unloading robot 1 and can be configured to grip the pharmaceutical units 104. The loading/unloading robot gripper tool module 4 can include loading/unloading robot gripper tools 101 for gripping the pharmaceutical units 104. The loading/unloading robot gripper tools 101 can be located at the front of the loading/unloading gripper tool module 4. In some embodiments, each of the loading/unloading robot gripper tools 101 can be configured to grip one pharmaceutical unit 104. A loading/unloading robot gripper tool 101 may grip a pharmaceutical unit 104 by using claws to make contact and surround sides of the pharmaceutical unit 104.

In some embodiments, a loading/unloading gripper tool 101 can have a holding force between 7-30 Newton. In some embodiments, a loading/unloading gripper tool 101 can have a holding force between 9-15 Newton. In some embodiments, the claws of a loading/unloading gripper tool 101 can have a stroke of 4 mm.

In some embodiments, the number of the loading/unloading robot gripper tools 101 can be equal to or greater than 32. Although the figure illustrates 32 loading/unloading robot gripper tools 101, embodiments of the disclosure can include any number of loading/unloading robot gripper tools 101 such as 4, 8, 12, 16, etc. In some embodiments, the number of the loading/unloading robot gripper tools 101 can be equal to the number of pharmaceutical units 104 in a single production batch.

Exemplary Operation of a Loading/Unloading Module

Figure 3E:
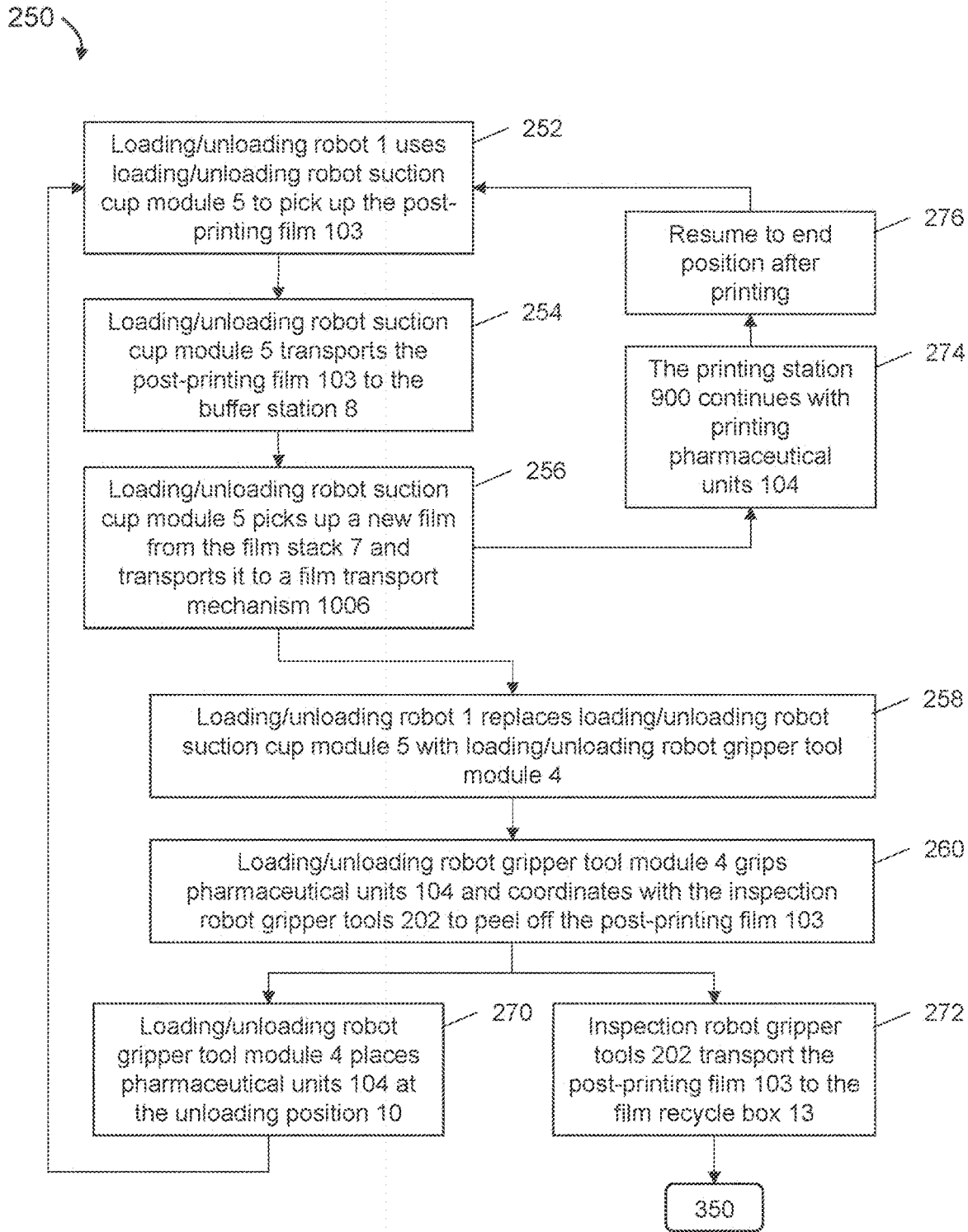
FIG. 3E illustrates a flowchart of an exemplary operation of a loading/unloading module, according to some embodiments of the disclosure.

FIG. 3E illustrates a flowchart of an exemplary operation of a loading/unloading module, according to some embodiments of the disclosure. The loading/unloading module 200 can be configured to perform various operations, such as automatically transporting post-printing films 103, automatically transporting new films, and automatically separating pharmaceutical units 104 from post-printing films 103. Each operation for the loading/unloading module 200 will be discussed below. The operation of the inspection module 300 for step 272 and the operation of the printing station 900 for step 274 and step 276 will be discussed in later sections.

Before the loading/unloading module 200 unloads the pharmaceutical units in process 250, the loading/unloading robot suction cup module 5 may attach to the loading/unloading robot 1. In some embodiments, the loading/unloading robot suction cup module 5 may attach to the loading/unloading robot 1 using an automatic tool changer 6.

In some embodiments, the loading/unloading robot suction cup module 5 may already be attached to the loading/unloading robot 1 (e.g., before step 252 begins). In such instances, the loading/unloading robot suction cup module 5 may not need to be reattached to the loading/unloading robot 1.

In instances where the loading/unloading robot suction cup module 5 is not attached to the loading/unloading robot 1 before step 252 begins, the loading/unloading robot 1 may need to detach from the loading/unloading robot gripper tool module 4, if attached to it at the time. Detaching from the loading/unloading robot gripper tool module 4 may include moving the loading/unloading robot 1 to the storage location 215 and using the automatic tool changer 6 to place the loading/unloading robot gripper tool module 4 at the storage location 215. In some embodiments, the loading/unloading robot suction cup module 5 may be stored at the storage location 213, and the loading/unloading robot 1 may have to move to the storage location 213 in order to attach to the loading/unloading robot suction cup module 5.

Exemplary Transportation of Post-Printing Films

The loading/unloading robot 1 may use the loading/unloading robot suction cup module 5 to automatically transport the pharmaceutical units 104 and the post-printing film 103 from the loading/unloading module 200 to the inspection module 300. This process may begin with step 252 of process 250, where the loading/unloading robot 1 may use the loading/unloading robot suction cup module 5 to pick up and hold (during movement) the post-printing film 103 via suction. In some embodiments, the post-printing film 103 may be located at the film transport mechanism 1006, so the loading/unloading robot suction cup module 5 may pick up and hold the post-printing film 103 at the film transport mechanism 1006.

In some embodiments, the loading/unloading robot suction cups 102 may create negative pressure pathways at multiple locations of the post-printing film 103, allowing the loading/unloading robot suction cup module 5 and the loading/unloading robot 1 to temporarily hold the post-printing film 103. In some embodiments, the pharmaceutical units 104 may be disposed on a side of the post-printing film 103, and the loading/unloading robot suction cups 102 may contact the same side of the post-printing film 103. In some embodiments, the loading/unloading robot suction cups 102 may create negative pressure pathways at locations where the pharmaceutical units 104 are not deposited on the post-printing film 103.

In some embodiments, the pharmaceutical units 104 may be temporarily connected to the post-printing film 103. As a result, step 252 may result in the loading/unloading robot suction cup module 5 picking up both the post-printing film 103 and the pharmaceutical units 104.

The loading/unloading robot suction cup module 5 may, in step 254, transport the post-printing film 103 from the film transport mechanism (e.g., film transport mechanism 1006 of FIG. 9B, discussed below) to the buffer station 8. Since the loading/unloading robot suction cups 102 may be holding the post-printing film 103 and the pharmaceutical units 104 at the time of step 254, the post-printing film 103 and the pharmaceutical units 104 may also be transported to the buffer station 8.

In some embodiments, transporting the post-printing film 103 in step 254 may include moving the loading/unloading robot suction cup module 5 from the film transport mechanism 1006 to the buffer station 8. One skilled in the art would understand that moving a module attached to a robot may include moving both the module and the robot. For example, moving the loading/unloading robot suction cup module 5 from the film transport mechanism 1006 to the buffer station 8 may include moving the loading/unloading robot 1 along the z-plane; moving the loading/unloading robot 1 along the x-plane, y-plane, or both; and moving (e.g., rotating) the loading/unloading robot suction cup module 5.

In some embodiments, transporting the post-printing film 103 in step 254 may include releasing suction of the post-printing film 103 at the buffer station 8. Releasing suction may include removing the negative pressure created at the loading/unloading robot suction cups 102. In some embodiments, releasing suction may cause the loading/unloading robot suction cups 102 to stop holding the post-printing film 103, and the post-printing film 103 may then be placed at the buffer station 8.

In some embodiments, one or more conditions may have to be met before a step is performed. Exemplary conditions may include, but are not limited to, the loading/unloading robot 1 being available and not performing another step and the loading/unloading robot suction cup module 5 being available and not performing another step. As another exemplary condition, in some embodiments, the buffer station 8 may need to sense the absence of a post-printing film 103, pharmaceutical units 104, or both at the unloading position 10 before performing step 254. In some embodiments, when an exemplary condition is not met, the control module may cause a delay in a step from being performed.

In some embodiments, the sequences of events may be pre-programmed into software, which may be executed by the loading/unloading robot 1.

Exemplary Transportation of New Films

In some embodiments, the loading/unloading module 200 may be configured to provide a new film to the additive manufacturing device. To provide a new film, the loading/unloading robot suction cup module 5 may automatically transport a new film from the film stack 7 to the buffer station 8. In some embodiments, a film transport mechanism can pick up the new film from the buffer station 8 and transport it to the additive manufacturing device.

In step 256, the loading/unloading robot suction cups 102 of the loading/unloading robot suction cup module 5 may be used to pick up and hold (during movement) the new film from the film stack 7 via suction. In some embodiments, the loading/unloading robot suction cups 102 may create negative pressure pathways at multiple locations of the new film, allowing the loading/unloading robot suction cup module 5 and the loading/unloading robot 1 to temporarily hold the new film.

The loading/unloading robot suction cup module 5 may also transport the new film from the film stack 7 to the film transport mechanism 1006. In some embodiments, transporting the new film in step 256 may include moving the loading/unloading robot suction cup module 5 from the film stack 7 to the film transport mechanism 1006. Moving a module attached to a robot may include moving both the module and the robot. For example, moving the loading/unloading robot suction cup module 5 from the film stack 7 to the film transport mechanism 1006 may include moving the loading/unloading robot 1 along the z-plane; moving the loading/unloading robot 1 along the x-plane, y-plane, or both; and moving (e.g., rotating) the loading/unloading robot suction cup module 5.

In some embodiments, transporting the new film in step 256 may include releasing suction of the new film at the film transport mechanism 1006. Releasing suction may include removing the negative pressure created at the loading/unloading robot suction cups 102. In some embodiments, releasing suction may cause the loading/unloading robot suction cups 102 to stop holding the new film, and the new film may then be placed at the film transport mechanism 1006.

In some embodiments, one or more conditions may have to be met before a step is performed. Exemplary conditions may include, but are not limited to, the loading/unloading robot 1 being available and not performing another step, and the loading/unloading robot suction cup module 5 being available and not performing another step. As another exemplary condition, in some embodiments, the buffer station 8 may need to sense the absence of a post-printing film 103 and the absence of a new film at the buffer station 8 before performing step 254. As another exemplary condition, in some embodiments, the unloading position 10 may need to sense the presence of a new film at the film stack 7 before performing step 256. As yet another exemplary condition, in some embodiments, the sensors 307 coupled to the film stack 7 may need to have completed any adjustments in the z-height of the one or more new films located at the film stack 7 before performing step 256. In some embodiments, when an exemplary condition is not met, the control module may cause a delay in a step from being performed.

In some embodiments, the sequences of events may be pre-programmed into software, which may be executed by the loading/unloading robot 1.

Exemplary Separation of Pharmaceutical Units From Post-Printing Film

In addition to automatically transporting a post-printing film 103 and automatically transporting a new film, the loading/unloading module 200 may be configured to help separate the pharmaceutical units 104 from the post-printing film 103. In some embodiments, the loading/unloading module 200 may use the loading/unloading robot gripper tool module 4 for separating the pharmaceutical units 104 from the post-printing film 103.

In some instances, the loading/unloading robot 1 may need to replace the loading/unloading robot suction cup module 5 with the loading/unloading robot gripper tool module 4 (step 258 of process 250). Replacing the loading/unloading robot suction cup module 5 with the loading/unloading robot gripper tool module 4 may include detaching from the loading/unloading robot suction cup module 5, and attaching to the loading/unloading robot gripper tool module 4.

Detaching from the loading/unloading robot suction cup module 5 may include moving the loading/unloading robot 1 to the storage location 213 and using the automatic tool changer 6 to place the loading/unloading robot suction cup module 5 at the storage location 213. In some embodiments, the loading/unloading robot gripper tool module 4 may be stored at the storage location 215, and the loading/unloading robot 1 may have to move to the storage location 215 in order to attach to the loading/unloading robot gripper tool module 4.

In step 260, the loading/unloading robot 1 of the loading/unloading robot module 200 may coordinate with the inspection robot (e.g., inspection robot 2, discussed below) of the inspection module 300 to separate the pharmaceutical units 104 from the post-printing film 103. For step 260, the loading/unloading robot 1 may use the loading/unloading robot gripper tool module 4 to grip the pharmaceutical units 104, and the inspection robot 2 may grip the post-printing film 103.

Figure 3F:
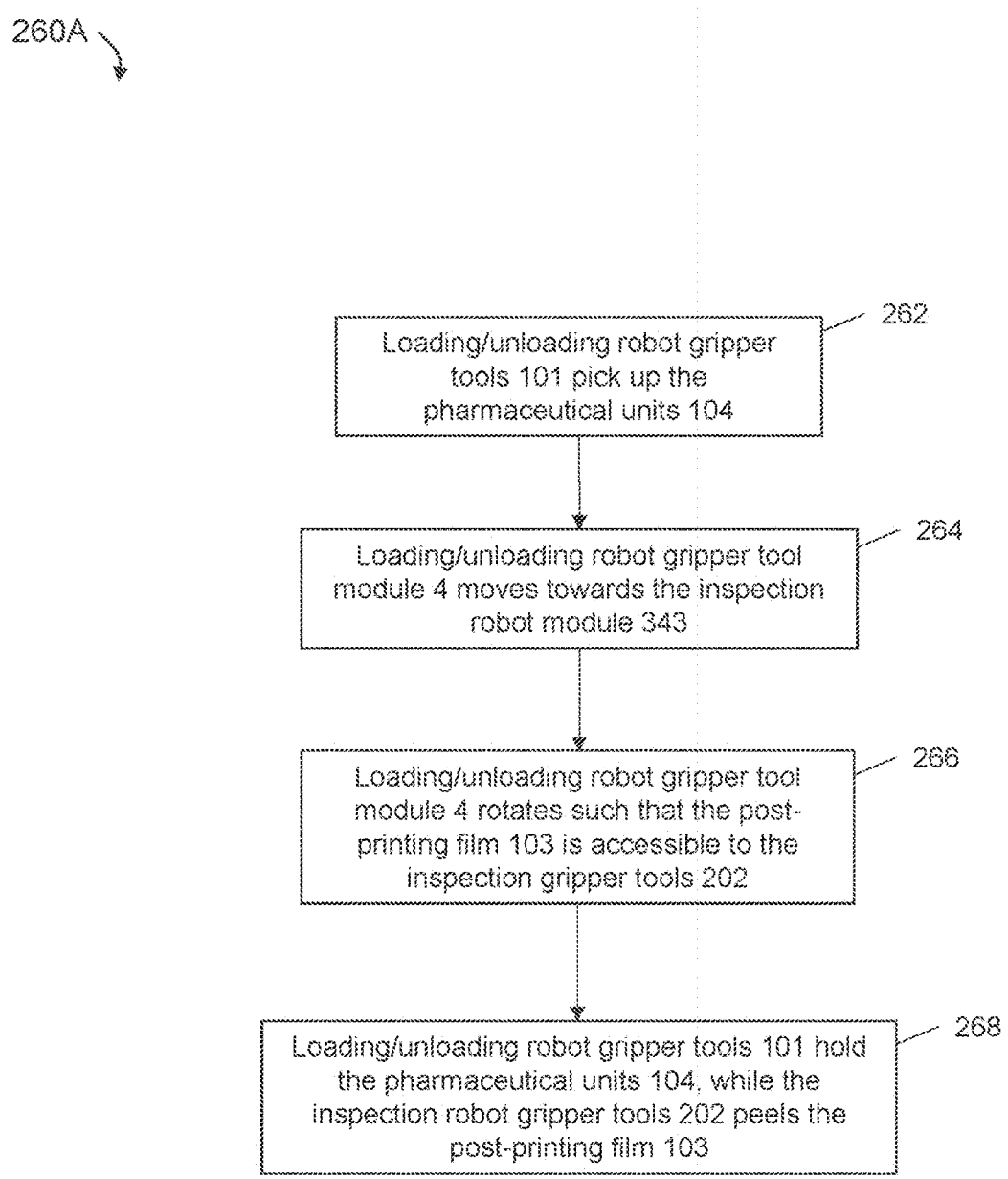
FIG. 3F illustrates a flowchart of an exemplary operation of a loading/unloading module coordinating with an inspection module to separate pharmaceutical units from a post-printing film, according to some embodiments of the disclosure.

FIG. 3F illustrates a flowchart of an exemplary operation of a loading/unloading module coordinating with an inspection module to separate pharmaceutical units from a post-printing film, according to some embodiments of the disclosure.

Process 260A may be a process showing the steps to separate the pharmaceutical units 104 from the post-printing film 103, as taken by the loading/unloading robot 1. Process 260B, discussed below, may be a process showing the steps to separate the post-printing film 103 from the pharmaceutical units 104, as taken by the inspection robot (e.g., inspection robot 2 of FIG. 4A, discussed below). In some embodiments, the loading/unloading module 200 may coordinate with the inspection module 300 to separate the pharmaceutical units 104 from the film 103. In some embodiments, process 260A may occur at the same time as process 260B.

Process 260A may begin with step 262, where the loading/unloading robot gripper tools 101 may pick up the pharmaceutical units 104 at the unloading position 10. In some embodiments, each of the loading/unloading robot gripper tools 101 can be configured to grip one pharmaceutical unit 104. In some embodiments, the loading/unloading robot gripper tools 101 may include claws, which close to grip the pharmaceutical units 104 and open to release the pharmaceutical units 104. When closing, the claws may come closer to surround sides of a pharmaceutical unit 104. When opening (i.e., releasing the pharmaceutical units 104), the claws may separate such that they no longer surround the sides of the pharmaceutical unit 104.

In step 264, the loading/unloading robot gripper tool module 4 may move toward the inspection robot module (e.g., inspection robot module 343 of FIG. 4A, discussed below). In some embodiments, the loading/unloading robot gripper tool module 4 may move from the buffer station 8 to the unloading station 10. Since the loading/unloading robot gripper tool module 4 may be holding the pharmaceutical units 104 at the time of step 264, the pharmaceutical units 104 may also move toward the inspection robot module 343. Additionally, since the post-printing film 103 may be temporarily connected to the pharmaceutical units 104 at the time of step 264, the post-printing film 103 may also move toward the inspection robot module 343.

One skilled in the art would understand that moving a module attached to a robot may include moving both the module and the robot. For example, moving the loading/unloading robot gripper tool module 4 toward the inspection robot module 343 from the unloading position 10 may include moving the loading/unloading robot 1 along the x-plane, y-plane, z-plane, or both. In some embodiments, the loading/unloading robot gripper tool module 4 may be rotated in step 266 such that the post-printing film 103 is accessible to the inspection robot gripper tools (e.g., inspection robot gripper tools 202 of FIG. 4B, discussed below) of the inspection robot module 343.

In step 268, the loading/unloading robot gripper tool module 4 and the loading/unloading robot gripper tools 101 may hold the pharmaceutical units 104. During this step, in some embodiments, the loading/unloading robot gripper tool module 4 may be oriented with the loading/unloading robot gripper tools 101 extending along the x-plane, similar to what is shown in FIG. 3D. The loading/unloading robot gripper tools 101 may be holding the pharmaceutical units 104 in air, for example, while the inspection robot gripper tools 202 of the inspection robot module 343) peel the post-printing film 103 (e.g., step 284 of FIG. 4C, discussed below).

In some embodiments, the loading/unloading robot gripper tools 101 may hold the pharmaceutical units 104, while the inspection robot module 343 moves towards the loading/unloading robot gripper tool module 4 (e.g., step 280 of FIG. 4C, discussed below). In some embodiments, the loading/unloading robot gripper tools 101 may hold the pharmaceutical units 104, while the inspection robot gripper tools 202 grip the post-printing film 103 (e.g., step 282 of FIG. 4C, discussed below).

After step 268 is complete, the pharmaceutical units 104 may be separated from the post-printing film 103. At this time, in some embodiments, the loading/unloading robot gripper tools 101 may be holding the pharmaceutical units 104 without being temporarily connected to the post-printing film 103.

Referring back to FIG. 3E, the loading/unloading robot gripper tools 101 of the loading/unloading robot gripper tool module 4 may place the pharmaceutical units 104 down by first moving the loading/unloading robot gripper tool module 4 to the unloading position 10 (step 270). Moving a module attached to a robot may include moving both the module and the robot. For example, moving the loading/unloading gripper tool module 4 to the unloading position 10 may include lowering the loading/unloading robot 1 along the z-plane; moving the loading/unloading robot 1 along the x-plane, y-plane, or both; and moving (e.g., rotating) the loading/unloading robot gripper tool module 4.

Step 270 may also include the loading/unloading robot gripper tools 101 releasing the grip of the pharmaceutical units 104 at the unloading position 10. As discussed above, in some embodiments, releasing the grip may include separating the claws of a loading/unloading robot gripper tool 101 such that the separation between the claws is greater than the diameter of a pharmaceutical unit 104.

Exemplary Inspection Module

FIG. 4A illustrates a plan view of an exemplary inspection module, according to some embodiments of the disclosure. The inspection module 300 may be for inspecting the pharmaceutical units 104. The inspection module 300 may include an inspection robot 2, an unloading position 10, a weighing station 11, a tablet box 12, a film recycle box 13, and an inspection robot module 343.

The inspection robot 2 can be a mechanical arm that includes multiple beams and one or more connecting joints. The inspection robot 2 can be capable of moving along multiple (e.g., six) degrees of freedom. In some embodiments, the connecting joint(s) may be located between the beams, and the inspection robot 2 may have two ends. A first end can attach to a tabletop-like surface (as shown in the figure), and a second end can be capable of having a module attached to it. For example, an inspection robot module 343 can be capable of being attached to, or detached from, the second end of the inspection robot 2.

The inspection robot 2 may be configured to receive one or more control signals from a computer system (e.g., one or more computer systems of a control module 600 of FIG. 6). The control signals may be used to control the movement of the inspection robot 2. In some embodiments, the control signals may be used to control the movement of the inspection robot module 343.

The unloading position 10 may be for receiving pharmaceutical units 104. In some embodiments, the unloading position 10 may be for receiving the pharmaceutical units 104 from the loading/unloading module 200, where the pharmaceutical units 104 may be temporarily connected to a post-printing film 103 when received. In some embodiments, the unloading position 10 may be for receiving the pharmaceutical units 104 from the loading/unloading module 200, where the pharmaceutical units 104 may have been separated from the post-printing film 103 (e.g., step 158, discussed above). In some embodiments, the pharmaceutical units 104 at the unloading position 10 may be for holding the pharmaceutical units 104, while an inspection robot camera tool (discussed below) captures one or more images of the pharmaceutical units 104. In some embodiments, the pharmaceutical units 104 at the unloading position 10 may be for holding at least some of the pharmaceutical units 104 in a production batch before being transported and weighed at the weighing station 11.

In some embodiments, the unloading position 10 may be a dedicated area located in the inspection module 300. In some embodiments, the unloading position 10 may located where the second end of the loading/unloading robot 1 and the second end of the inspection robot 2 may be able to reach the unloading position 10.

In some embodiments, the unloading position 10 may have physical characteristics (e.g., size, shape, etc.) determined based on the physical characteristics of the pharmaceutical units 104 and a production batch. For example, the unloading position 10 may include a plurality of geometrical features (e.g., geometrical features 106 of FIG. 4F). The geometrical features may be pits, for example. While at the unloading position 10, the pharmaceutical units 104 may be located in the plurality of geometrical features 106. The physical characteristics, such as size and shape, of the plurality of geometrical features 106 can be based on the physical characteristics, such as size and shape, of the pharmaceutical units 104. In some embodiments, each pharmaceutical unit 104 can be located in one geometrical feature 106.

In some embodiments, the number of the plurality of geometrical features 106 can be greater than or equal to 32. Embodiments of the disclosure can include any number of geometrical features 106, such as 10, 12, 24, 40, etc. In some embodiments, the number of geometrical features 106 can be equal to the number of pharmaceutical units 104 in a single production batch.

In some embodiments, the unloading position 10 may have a sensor coupled to it to determine whether an object, such as a post-printing film 103 or pharmaceutical units 104, is located at the unloading position 10. In some embodiments, the sensor may determine the type of object at the unloading position 10 based on physical characteristics such as size, shape, weight, amount of surface contact with a stage of the unloading position 10, or the like. In some embodiments, the sensor may be a proximity sensor. The sensor can indicate to and/or trigger the inspection robot 2 to perform certain steps, such as separating the pharmaceutical units 104 from the post-printing film 103 or inspecting the pharmaceutical units 104. In this manner, the inspection robot 2 may be continuously operating, thereby increasing the throughput of the inspection module 300.

The weighing station 11 may include one or more weight scales for measuring the weight of the pharmaceutical units 104 located at the weighing station 11. In some embodiments, the weighing resolution of a weight scale can be 0.1 mg.

In some embodiments, the number of weight scales can greater than or equal to four. In some embodiments, each weight scale may be configured to measure the weight of one pharmaceutical unit 104 at a given time. In some embodiments, the number of weight scales can be equal to the number of inspection robot suction cups (e.g., inspection robot suction cups 201 of FIG. 4B, discussed below), the number of geometrical features 106 of the unloading position 10 located in a row, or both.

In some embodiments, the physical characteristics (e.g., size, shape, etc.) of the weight scales of the weighing station 11 may be determined based on the physical characteristics of the pharmaceutical units 104. In some embodiments, the one or more weight scales can include one or more pits for holding the pharmaceutical units 104 whose weight is being measured at a given time. In some embodiments, the pharmaceutical units 104 being held by the pits can be a set of the pharmaceutical units 104 of a production batch. A pit may prevent a pharmaceutical unit 104 from moving before, during, and after a weight measurement, for example. In some embodiments, the weighing station 11 may be located proximate to the unloading position 10. For example, the weighing station 11 may be located adjacent to the unloading position 10.

The tablet box 12 may be for holding disqualified pharmaceutical units 104. In some embodiments, the tablet box 12 may be used to temporarily hold disqualified pharmaceutical units 104 until reused or recycled. In some embodiments, the tablet box 12 may be located proximate to the weighing station 11. For example, the tablet box 12 may be located adjacent to the weighing station 11.

The film recycle box 13 may be for holding one or more post-printing films 103 after being separated from the pharmaceutical units 104. In some embodiments, each post-printing film 103 may be stacked along different z-heights within the film recycle box 13. In some embodiments, the film recycle box 13 may be located proximate to the weighing station 11. For example, the film recycle box 13 may be located adjacent to the weighing station 11 (not shown). In some embodiments, the film recycle box 13 may be located at the bottom of the film deformation separation module 700 (not shown). In some embodiments, the film recycle box 13 can be a metal box.

Figure 4B:
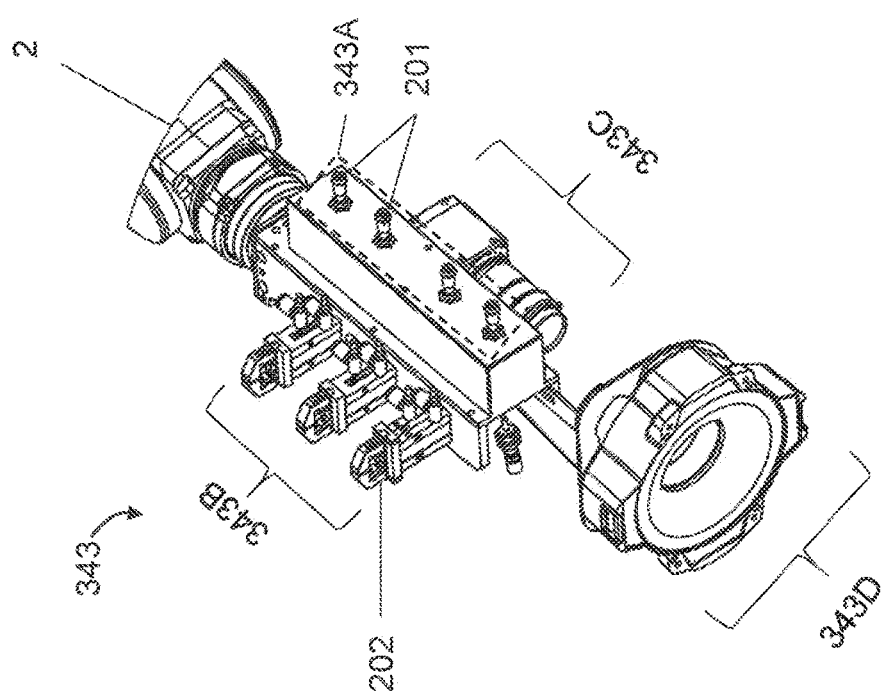
FIG. 4B illustrates a plan view of an exemplary inspection robot module, according to some embodiments of the disclosure.
Figure 4C:
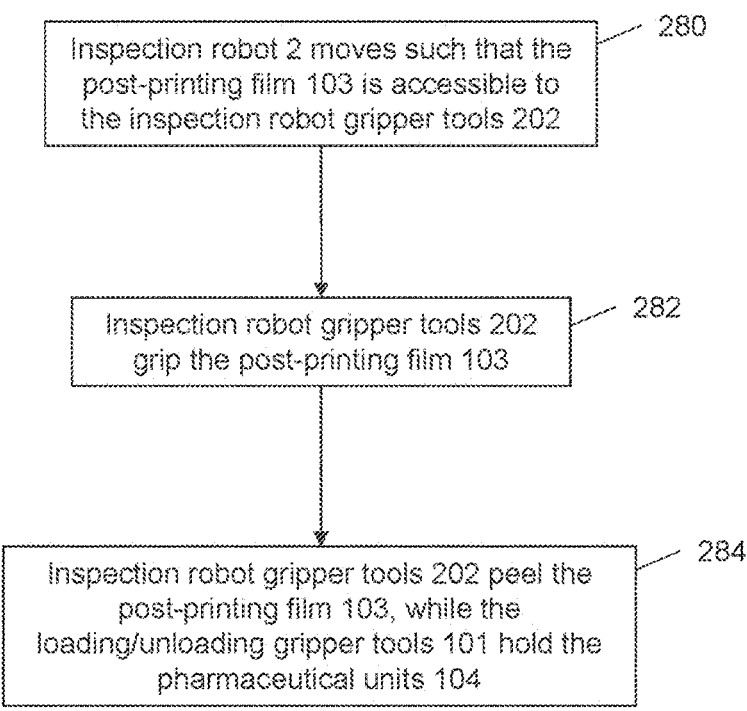
FIG. 4C illustrates a flowchart of an exemplary operation of an inspection module separating a post-printing film from pharmaceutical units, according to some embodiments of the disclosure.

FIG. 4B illustrates a plan view of an exemplary inspection robot module, according to some embodiments of the disclosure. The inspection robot module 343 can be attached to the inspection robot 2. In some embodiments, the inspection robot module 343 can include inspection robot suction cups 201 for picking up pharmaceutical units 104 via suction by creating a plurality of negative pressure pathways. In some embodiments, the inspection robot suction cups 201 can be located on a side 343A of the inspection robot module 343, as shown in the figure.

In some embodiments, the inspection robot suction cups 201 can be capable of being independently operated. Independent operation means that each inspection robot suction cup 201 can be independently controlled, such that creating suction with one inspection robot suction cup 201 may not affect the other inspection robot suction cups 201. For example, at a given time, a first inspection robot suction cup 201 may use suction, while a second inspection robot suction cup 201 may not.

In some embodiments, the number of inspection robot suction cups 201 can be equal to or greater than four. Although the figure shows four inspection robot suction cups 201, embodiments of the disclosure can include any number of inspection robot suction cups 201, such as 2, 3, 5, 6, etc. In some embodiments, the number of inspection robot suction cups 201 can be equal to the number of weight scales of the weighing station 11, the number of geometrical features of the unloading position 10 located in a row, or both.

In some embodiments, the spacing between adjacent inspection robot suction cups 201 can be equal to the spacing between adjacent pits of the weight scales (of the weighing station 11). In some embodiments, the spacing between adjacent inspection robot suction cups 201 can be equal to the spacing between adjacent geometrical features 106 of the unloading position 10. In some embodiments, the spacing between adjacent inspection robot suction cups 201 can be equal to the spacing between adjacent pits in a blister pack. In some embodiments, the spacing between adjacent inspection robot suction cups 201 can be equal to the spacing between adjacent slots (e.g., slots 910 of FIG. 7A) in the film deformation separation module 700.

Figure 4D:
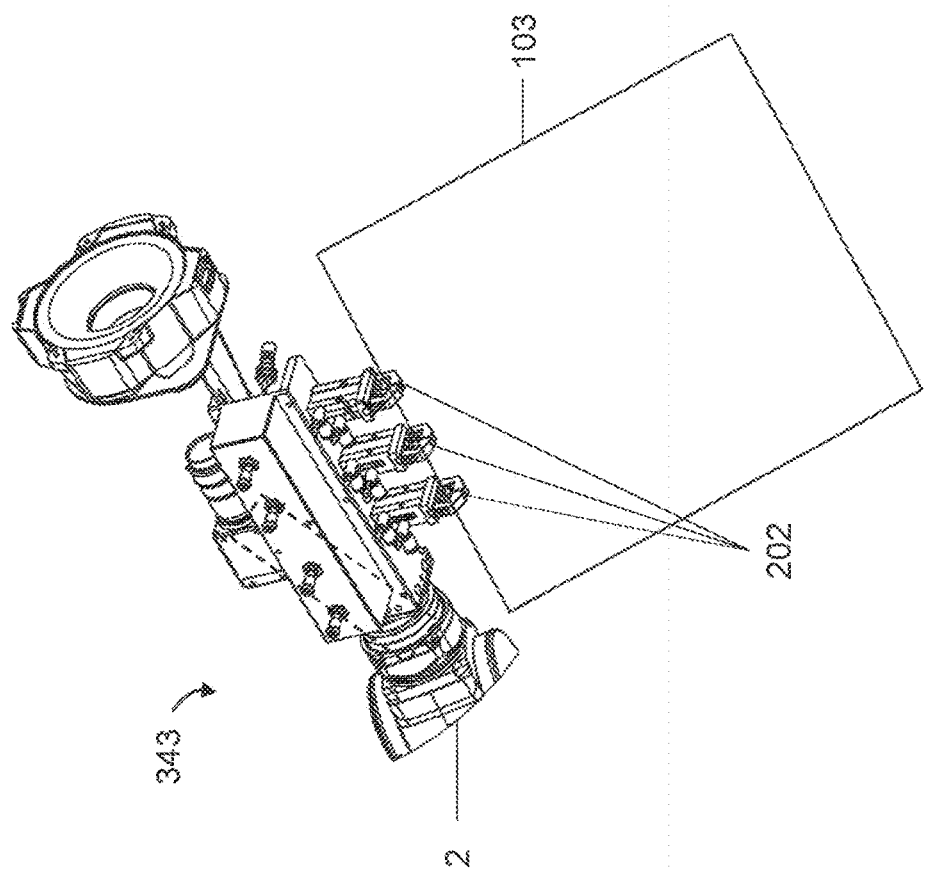
FIG. 4D illustrates a plan view of exemplary inspection robot gripper tools gripping a post-printing film, according to some embodiments of the disclosure.

In some embodiments, the inspection robot module 343 can include inspection robot gripper tools 202 for gripping a post-printing film 103. The inspection robot gripper tools 202 may grip an end of the post-printing film 103 by gripping multiple locations of the post-printing film 103. In some embodiments, the inspection robot gripper tools 202 may grip the post-printing film 103 by having its claws come closer to surround sides of the post-printing film 103 (e.g., as shown in FIG. 4D). The inspection robot gripper tools 202 may also release its grip of the post-printing film 103 by having its claws separate and no longer surround sides of the post-printing film 103. In some embodiments, the inspection robot gripper tools 202 may be pneumatic.

In some embodiments, the characteristics, components, and/or functionality of an inspection robot gripper tool 202 may be the same characteristics, components, and/or functionality of a loading/unloading robot gripper tool 101 (of the loading/unloading module 200). In some embodiments, the inspection robot gripper tools 202 may be configured to have a smaller separation between its claws when closed than the loading/unloading robot gripper tools 101.

In some embodiments, the inspection robot gripper tools 202 can be located on a side 343B of the inspection robot module 343, as shown in FIG. 4B. Although the figure illustrates three inspection robot gripper tools 202, embodiments of the disclosure can include any number of inspection robot gripper tools 202 such as 1, 2, 4, 8, 12, 16, etc. In some embodiments, the number of inspection robot gripper tools 202 can be based on the size of the post-printing film 103. For example, the number of inspection robot gripper tools 202 can be increased when a greater pull force is needed, such as for larger post-printing films 103.

In some embodiments, the inspection robot module 343 can include an inspection robot camera tool for capturing one or more images of the pharmaceutical units 104 in a production batch. In some embodiments, the inspection robot camera tool may be configured to capture image(s) of the pharmaceutical unit(s) 104 while located at the unloading position 10. In some embodiments, the inspection robot camera tool can be configured to capture multiple images for a single production batch. The inspection robot camera tool can serially capture multiple images by capturing a set of the pharmaceutical units 104 in each image. In some embodiments, the number of pharmaceutical units 104 in one image captured by the inspection robot camera tool may be equal to the number of weight scales of the weighing station 11, the number of geometrical features of the unloading position 10 located in a row, the number of inspection robot suction cups 201, or a combination thereof.

Figure 4E:
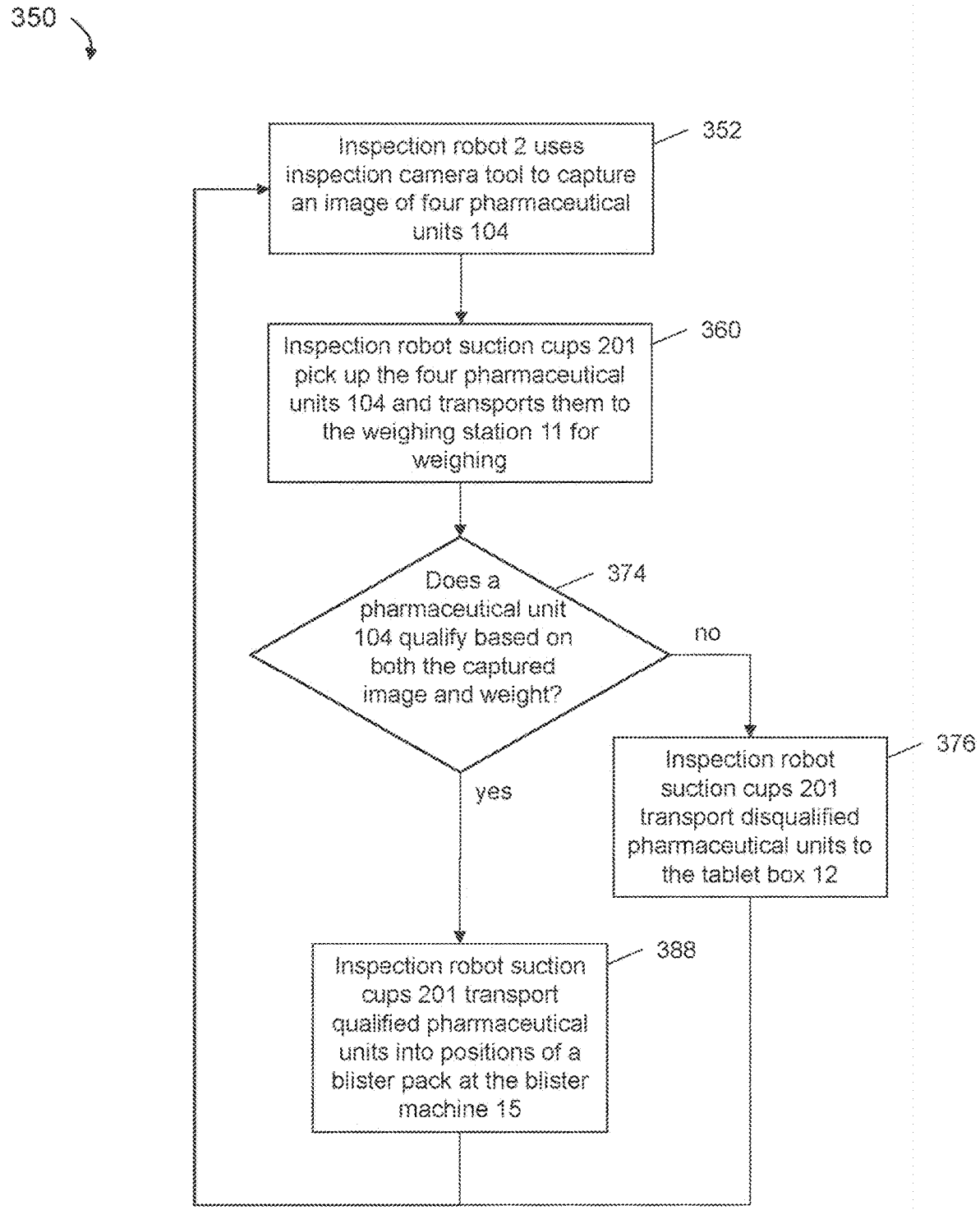
FIG. 4E illustrates a flowchart of an exemplary operation of an inspection module inspecting the pharmaceutical units and automatically transporting the pharmaceutical units, according to some embodiments of the disclosure.
Figure 4F:
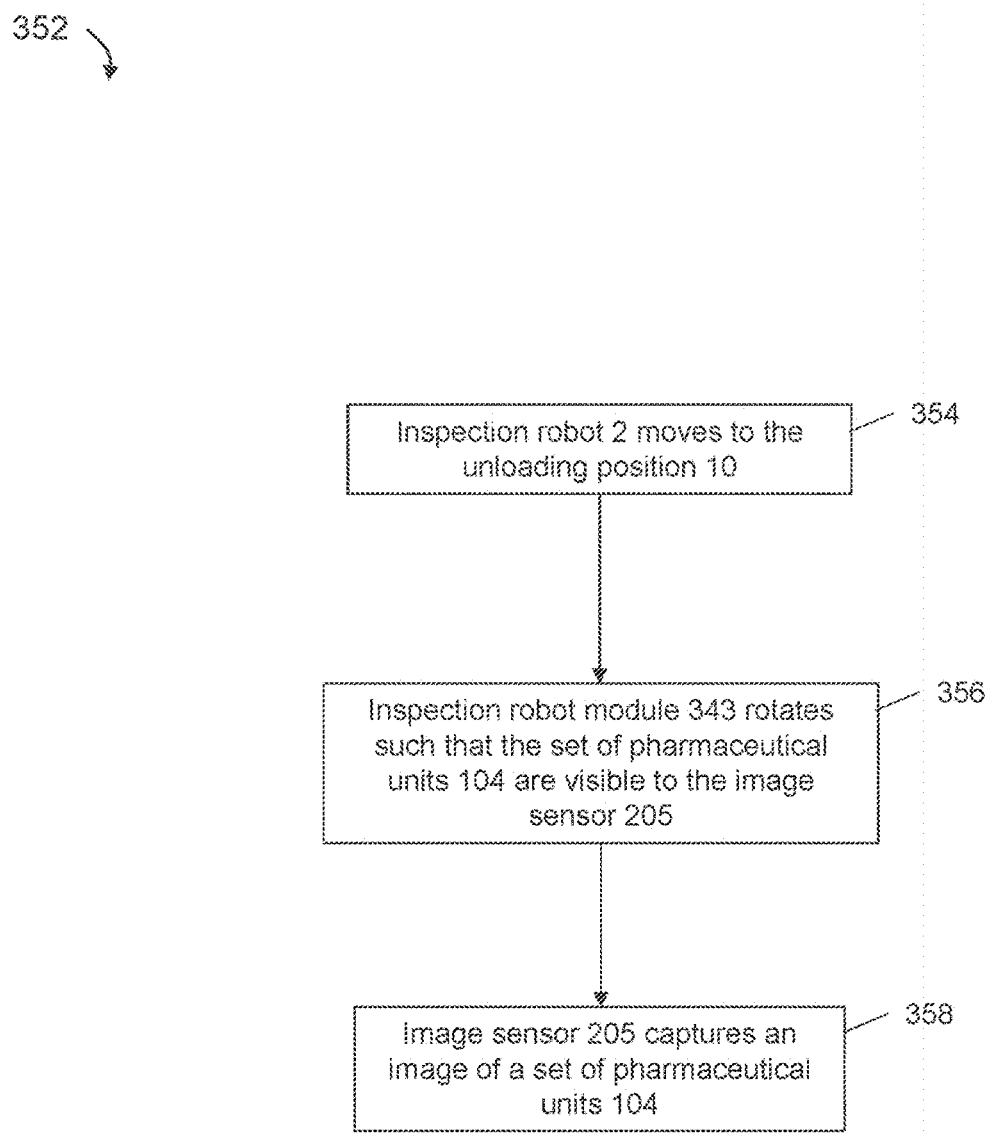
FIG. 4F illustrates a flowchart of an exemplary operation of an inspection camera tool capturing an image of a set of pharmaceutical units, according to some embodiments of the disclosure.
Figure 4G:
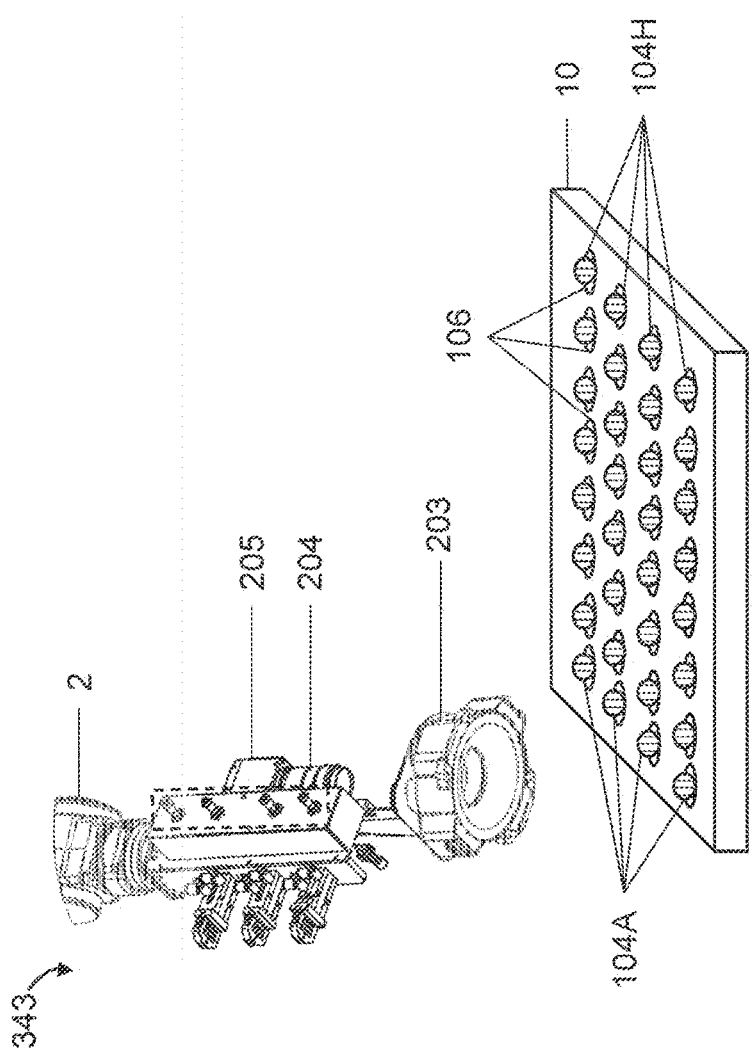
FIG. 4G illustrates a plan view of an exemplary inspection robot camera tool capturing an image of a set of pharmaceutical units, according to some embodiments of the disclosure.

The inspection robot camera tool can include multiple components, such as a camera lens 203 (shown in FIG. 4G), a multispectral light 204 (shown in FIG. 4G), and an image sensor 205 (shown in FIG. 4G). The camera lens 203 may be located closer to the pharmaceutical units 104 than the multispectral light 204 and the image sensor 205. The camera lens 203 may be configured to magnify and/or focus on the pharmaceutical units 104, while the image sensor 205 captures the image(s). In some embodiments, the multispectral light 204 may be configured to illuminate the pharmaceutical units 104, while the image sensor 205 captures the image(s). In some embodiments, the image sensor 205 may be a CCD image sensor. In some embodiments, the image sensor 205 can be an industrial vision sensor.

Exemplary Operation of an Inspection Module

The inspection module 300 can be configured to perform various operations, such as automatically separating post-printing films 103 from pharmaceutical units 104, automatically inspecting pharmaceutical units 104 by capturing images, automatically inspecting pharmaceutical units 104 by measuring weight, and automatically transporting qualified pharmaceutical units 104 or disqualified pharmaceutical units 104 to the blister machine 15 or the tablet box 12, respectively. Each operation will be discussed in turn below.

Exemplary Separation of a Post-Printing Film from Pharmaceutical Units

As discussed above, the inspection module 300 may cooperatively operate with the loading/unloading module 200 to separate the pharmaceutical units 104 from a post-printing film 103. FIG. 4C illustrates a flowchart of an exemplary operation of an inspection module 300 separating a post-printing film 103 from pharmaceutical units 104, according to some embodiments of the disclosure.

Process 260B may be a process showing the steps to separate the post-printing film 103 from the pharmaceutical units 104, as taken by the inspection robot 2. Process 260A, discussed above, may be a process showing the steps to separate the pharmaceutical units 104 from the post-printing film 103, as taken by the loading/unloading robot 1. In some embodiments, process 260B may occur at the same time as process 260A.

Process 260B may begin with step 280, where the inspection robot 2 may move toward the loading/unloading robot gripper tool module 4. Before and/or during step 352, the loading/unloading robot gripper tool module 4 and its loading/unloading robot gripper tools 101 may be gripping the pharmaceutical units 104 with the loading/unloading robot gripper tools 101 extending along the x-plane (see, e.g., FIG. 3D). In some embodiments, step 280 (moving the inspection robot module 343) may occur at the same time as step 268 (the pharmaceutical units 140 being held by the loading/unloading robot gripper tool module 4).

One skilled in the art would understand that moving a module attached to a robot may include moving both the module and the robot. For example, moving the inspection robot module 343 toward the loading/unloading robot gripper tool module 4 may include moving or lower the inspection robot 2 along the z-plane, moving the inspection robot 2 along the x-plane and/or y-plane, rotating the inspection robot module 343, or a combination thereof.

In step 282, the inspection robot gripper tools 202 may grip the post-printing film 103. In some embodiments, the inspection robot gripper tools 202 may grip one end (e.g., the top end) of the post-printing film 103, as shown in FIG. 4D. In some embodiments, the inspection robot gripper tools 202 may be claws, which close to grip the post-printing film 103 and open to release the film 103. When closing, the claws may come closer to surround sides of the film 103. When opening (i.e., releasing the post-printing film 103), the claws may separate such that they no longer surround the sides of the post-printing film 103.

In step 284, the inspection robot gripper tools 202, the inspection robot module 343, and the inspection robot 2 may peel the post-printing film 103. The peeling can include a pull force that begins at the top end (i.e., closest to the inspection robot module 343) of the post-printing film 103 and propagates through to the bottom end of the post-printing film 103 (i.e., furthest from the inspection robot module 343). In some embodiments, the peeling can occur by moving the top end being gripped by the inspection robot gripper tools 202 along a y-plane and a z-plane. In some embodiments, the pulling may occur, while the pharmaceutical units 104 are being held by the loading/unloading gripper tools 101 (e.g., step 280).

After step 284 is complete, the post-printing film 103 may be separated from the pharmaceutical units 104. The inspection robot gripper tools 202 may hold the post-printing film 103 without the pharmaceutical units 104 temporarily connected to them.

Referring to FIG. 3E, in step 272, the inspection robot gripper tools 202 may dispose of the post-printing film 103 by transporting it to the film recycle box 13. Transporting the post-printing film 103 to the film recycle box 13 may include moving the inspection robot module 343 to the film recycle box 13 (e.g., by moving the inspection robot 2 along the x-plane, y-plane, z-plane, or any combination thereof; and moving (e.g., rotating) the inspection robot module 343).

In some embodiments, transporting the separated post-printing film 103 may include releasing grip of the post-printing film 103 at the film recycle box 13. Releasing grip may include separating the claws of the inspection robot gripper tools 202 such that the separation between the claws is greater than the thickness of the post-printing film 103.

After the inspection robot gripper tools 202 disposes of the separated post-printing film 103, the inspection module 300 may proceed to inspecting the pharmaceutical units 104 in process 350.

Exemplary Inspection of Pharmaceutical Units by Capturing Images

After the pharmaceutical units 104 are separated from the post-printing film 103, the pharmaceutical units 104 may be ready for inspection. The inspection module 300 may be configured to inspect one or more characteristics of the pharmaceutical units 104. One exemplary type of characterization can include capturing one or more images of the pharmaceutical units 104 using an inspection camera tool.

FIG. 4E illustrates a flowchart of an exemplary operation of an inspection module inspecting the pharmaceutical units and automatically transporting the pharmaceutical units, according to some embodiments of the disclosure. The inspection process may begin with inspecting the pharmaceutical units 104 based on images captured using the inspection camera tool in process 350.

In step 352 of process 350, the inspection robot 2 may use the inspection camera tool to capture an image of a set of pharmaceutical units 104. The details of process 352 are shown in the flowchart of FIG. 4F.

In step 354 of process 352, the inspection robot 2 may move to the unloading position 10, where the pharmaceutical units 104 may be located. Moving a module attached to a robot may include moving both the module and the robot. For example, moving the inspection robot module 343 to the unloading position 10 may include moving the inspection robot 2 along the x-plane, y-plane, z-plane, or a combination thereof. The inspection robot module 343 may also rotate in step 356 such that the pharmaceutical units 104 being imaged are visible to (e.g., in the line of view) the image sensor 205, as shown in FIG. 4G.

In step 358, the image sensor 205 may capture an image of a set of pharmaceutical units 104. In some embodiments, the inspection robot camera tool can be configured to capture multiple images for a single production batch. The inspection robot camera tool can serially capture multiple images by capturing a set of the pharmaceutical units 104 in each image. Process 352 may be repeated for each set of the pharmaceutical units 104. In some embodiments, the images of the pharmaceutical units 104 for a production batch may be captured one-by-one. For example, as shown in FIG. 4G, the inspection camera tool may capture a first image of a first set of the pharmaceutical units 104A. Later on (e.g., at a second execution of process 352), the inspection camera tool may capture a second image of a second set of the pharmaceutical units 104H.

The inspection robot module 343 may be positioned at different x-positions for different images. For example, the x-position of the inspection robot module 343 for capturing the first image of the first set of the pharmaceutical units 104A may be different from the x-position of the inspection robot module 343 for capturing the second image of the second set of the pharmaceutical units 104H.

In some embodiments, a set of pharmaceutical units 104 can include less than all pharmaceutical units 104 in a production batch. For example, the number of pharmaceutical units 104 in a set of pharmaceutical units 104 can be equal to the number of inspection robot suction cups, the number of geometrical features in a row of the unloading position 10, the number of weight scales at the weighing station 11, and the like. In some embodiments, a set of pharmaceutical units 104 can include four pharmaceutical units 104.

In some embodiments, the inspection robot camera tool may capture some (e.g., all) of the multiple images for a single production batch before determining whether the pharmaceutical units 104 are qualified and before transporting the pharmaceutical units 104 to the blister machine 15 or the tablet box 12. In some embodiments, the image sensor 205 of the inspection robot camera tool or the control module may perform image data processing using the images to determine whether the pharmaceutical units 104 qualify. In some embodiments, the image information may be communicated to the control module for processing, storage, linking to the pharmaceutical unit 104, or a combination thereof.

Exemplary Inspection of Pharmaceutical Units by Measuring Weight

Another exemplary type of characterization can include measuring the weight of the pharmaceutical units 104 using the weighing station 11, such as in process 360 of FIG. 4E.

Figure 4H:
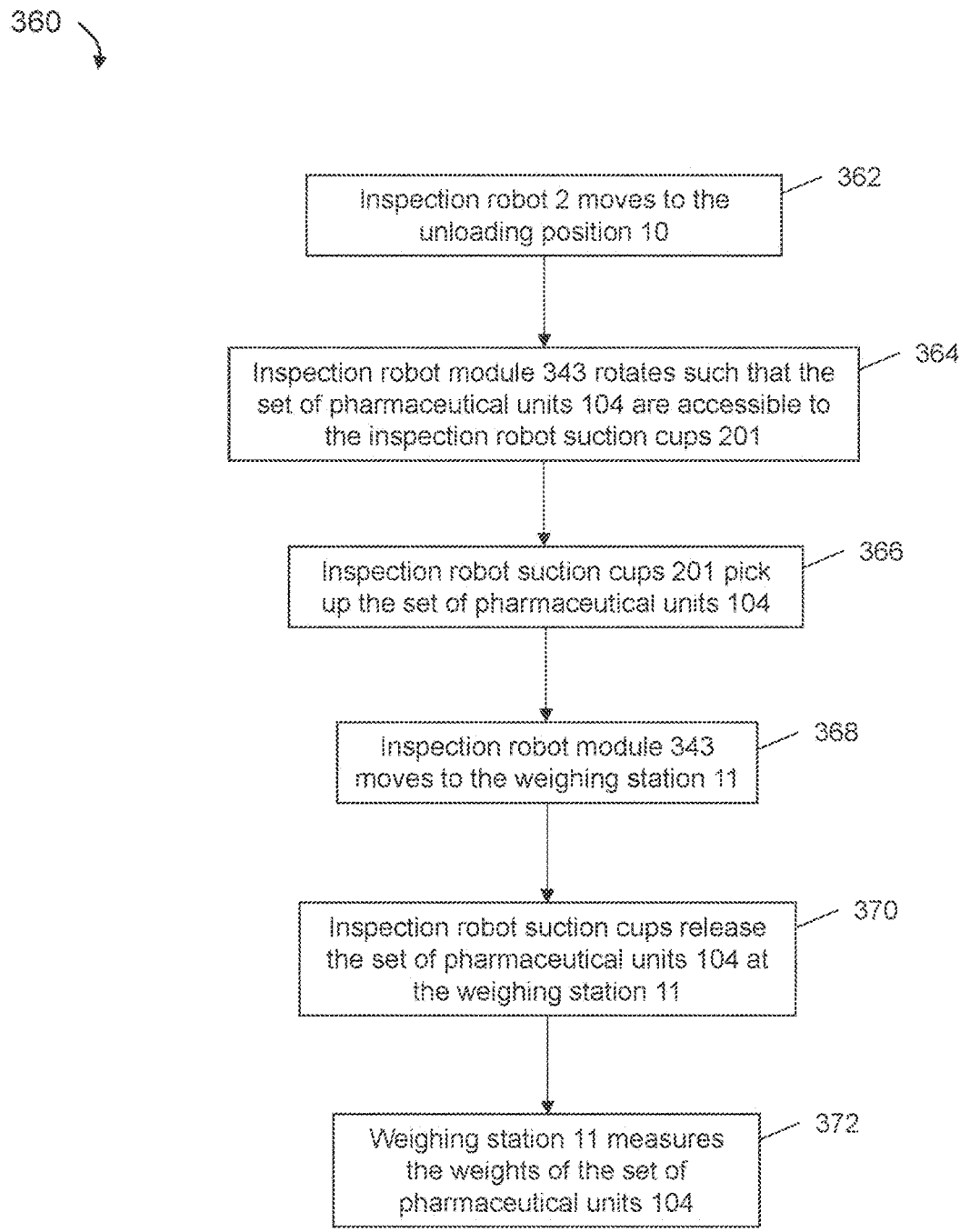
FIG. 4H illustrates a flowchart of an exemplary operation of a weighing station measuring weights of a set of pharmaceutical units, according to some embodiments of the disclosure.
Figure 41:
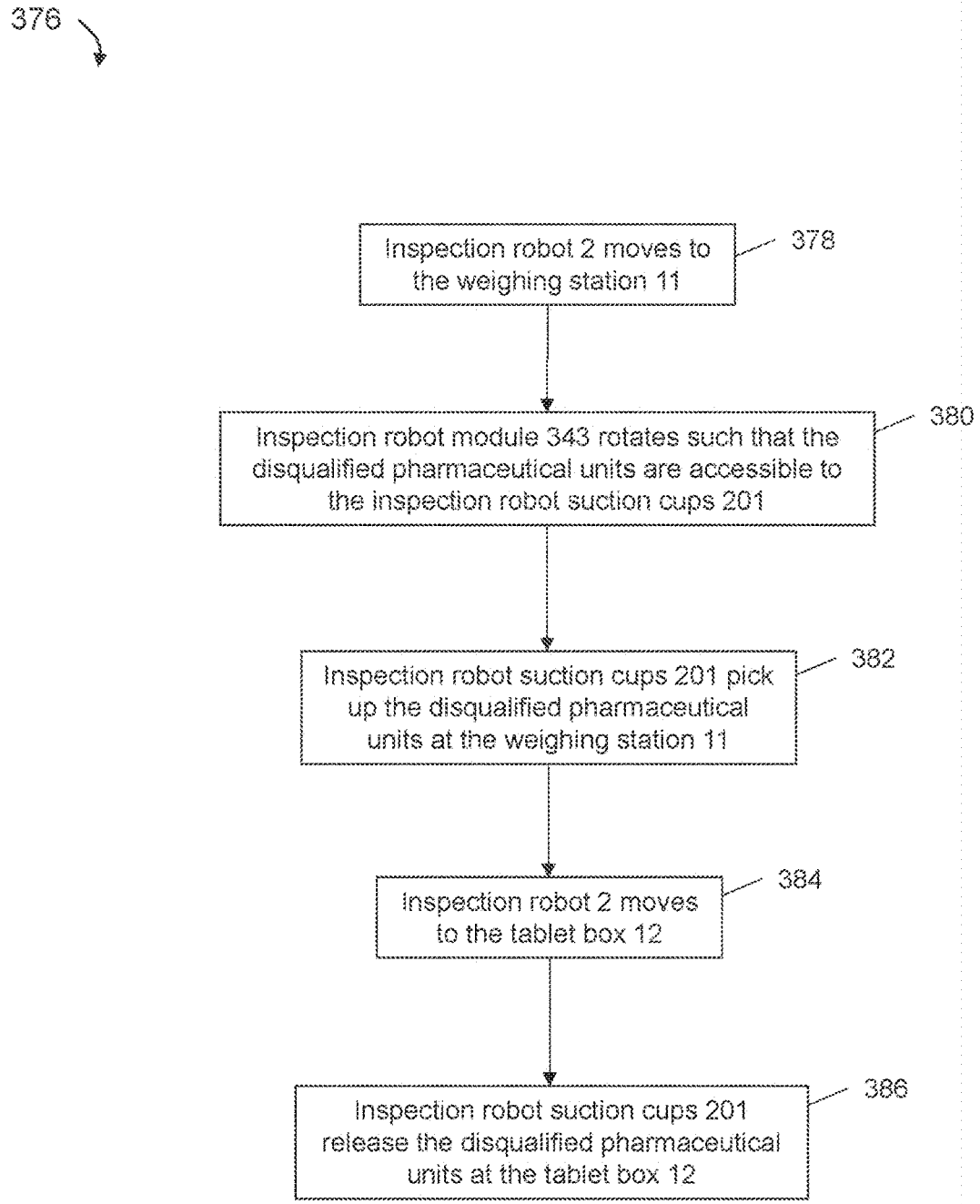

In process 360, in some embodiments, the inspection module 300 may transport a set of pharmaceutical units 104 to the weighing station 11 so that the weighing station can measure the weights of the set of pharmaceutical units 104. The details of process 360 are shown in the flowchart of FIG. 4H.

In step 362 of process 360, the inspection robot 2 may move to the unloading position 10. Moving a module attached to a robot may include moving both the module and the robot. For example, moving the inspection robot module 343 to the unloading position 10 may include moving the inspection robot 2 along the x-plane, y-plane, z-plane, or a combination thereof.

The inspection robot module 343 may rotate in step 364 such that the pharmaceutical units 104 are accessible to the inspection robot suction cups 201. In some embodiments, rotating the inspection robot module 343 for step 364 may be such that side 343A is facing the unloading position 10.

In step 366, the inspection robot suction cups 201 may be used to pick up a set of the pharmaceutical units 104 of a production batch. In some embodiments, the inspection robot suction cups 201 may create negative pressure pathways to create a suction of the set of the pharmaceutical units 104. In some embodiments, each inspection robot suction cup 201 can be configured to pick up one pharmaceutical unit 104.

In some embodiments, a set of pharmaceutical units 104 can include less than all pharmaceutical units 104 in a single production batch. For example, the number of pharmaceutical units 104 in a set of pharmaceutical units 104 can be equal to the number of inspection robot suction cups, the number of geometrical features in a row of the unloading position 10, the number of weight scales 11 at the weighing station, and the like. In some embodiments, a set of pharmaceutical units 104 can be equal to four pharmaceutical units 104.

The inspection robot module 343 may move to the weighing station 11 in step 368. This step may include moving the inspection robot module 343 and/or inspection robot 2 to the weighing station 11 by, e.g., moving the inspection robot 2 along the x-plane, y-plane, z-plane, or a combination thereof. Since the inspection robot suction cups 201 may be holding a set of the pharmaceutical units 104 during step 368, the set of the pharmaceutical units 104 may be moved to the weighing station 11.

In step 370, the inspection robot suction cups 201 may release suction of the set of the pharmaceutical units 104, placing them at the weighing station 11. Releasing suction may include removing the negative pressure created at the inspection robot suction cups 201. In some embodiments, releasing suction may cause the inspection robot suction cups 201 to stop holding the set of the pharmaceutical units 104, which may then be placed at the weighing station 11.

The weighing station 11 can measure the weight of the pharmaceutical units 104 (step 372). The weight of the pharmaceutical units 104 can be used to determine the characteristics of the pharmaceutical units 104 for purposes of determining whether or not they qualify. In some embodiments, the weighing station 11 may take individual measurements from each of the weight scales to determine the weight of the respective pharmaceutical unit 104. In some embodiments, the weighing station may take a single measurement from all of the weight scales to determine the weight of the respective set of pharmaceutical units 104. For example, when the weighing station 11 includes four weight scales, the single measurement may represent the weight of four pharmaceutical units 104.

In some embodiments, the weight information may be communicated to the control module for processing, storage, linking to the pharmaceutical unit 104, or a combination thereof.

The inspection module 300 may be configured to measure the weight of the pharmaceutical units 104 using multiple measurements. The weighing station 11 can serially take the multiple weight measurements by measuring a set of pharmaceutical units 104 for each measurement. Each set can include at least some, but not all, of the pharmaceutical units 104. Process 360 may be repeated for each set of the pharmaceutical units. In some embodiments, the weights of the pharmaceutical units 104 for a production batch may be captured one-by-one. For example, the weighing station 11 can measure a first set of pharmaceutical units 104A in a first measurement, and then later (e.g., at a second execution of process 360), can measure a second set of pharmaceutical units 104H in a second measurement.

The inspection robot module 343 may be configured to move to a different x-position to pick up a different row of pharmaceutical units 104 for each weight measurement. For example, in step 362, the x-position of the inspection robot module 343 for picking up the first set of pharmaceutical units 104A may be different from the x-position of the inspection robot module 343 for picking up the second set of pharmaceutical units 104H.

Exemplary Handling of Qualified and Disqualified Pharmaceutical Units

After the inspection camera tool captures images of the pharmaceutical units 104 (in step 352) and the weighing station measures the weights of the pharmaceutical units 104 (in step 360), the control module may determine whether a pharmaceutical unit qualifies (step 374 of process 350, shown in FIG. 4E).

If a pharmaceutical unit does not qualify, then in process 376 of FIG. 4E, the inspection module 300 may dispose of the disqualified pharmaceutical units 104 by automatically transporting them to a tablet box 12. FIG. 4I illustrates a flowchart of an exemplary operation of automatically transporting disqualified pharmaceutical units to the tablet box, according to some embodiments.

Starting with step 378, the inspection robot module 2 may move to the weighing station 11. Moving the inspection robot 2 to the weighing station 11 may include moving along the x-plane, y-plane, z-plane, or a combination thereof. In step 380, the inspection robot module 343 may rotate such that the set of pharmaceutical units 104 at the weighing station 11 are accessible to the inspection robot suction cups 201. In some embodiments, rotating the inspection robot module 343 for step 380 may be such that side 343A, where the inspection robot suction cups 201 may be located, is facing the pits of the weight scales at the weighing station 11.

In step 382, the inspection robot suction cups 201 may pick up the set of pharmaceutical units 104 at the weighing station 11. In some embodiments, the inspection robot suction cups 201 may create negative pressure pathways to create suction of the set of pharmaceutical units 104 at the weighing station 11. In some embodiments, each inspection robot suction cup 201 can be configured to pick up one pharmaceutical unit 104.

In some embodiments, only the inspection robot suction cups 201 that correspond to the locations of the disqualified pharmaceutical units 104 at the weighing station 11 may be used for pick up. For example, if the disqualified pharmaceutical units 104 are located at the second and third weight scales at the weighing station 11, then only the second and third inspection robot suction cups 201 may be used to pick up the corresponding qualified pharmaceutical units 104. In such instance, the first and fourth inspection robot suction cups 201 may not create negative pressure pathways and may not pick up the first and fourth pharmaceutical units 104. In some embodiments, the pharmaceutical units 104 that have not been picked up may be considered qualified pharmaceutical units 104 and may be handled accordingly, as discussed below.

In step 384, the inspection robot 2 may move to the tablet box 12. This step may include moving the inspection robot module 343 and/or inspection robot 2 to the tablet box 12 by, e.g., moving the inspection robot 2 along the x-plane, y-plane, z-plane, or a combination thereof. Since the inspection robot suction cups 201 may be holding disqualified pharmaceutical units 104 from the weighing station 11, the same set of the pharmaceutical units 104 may be moved to the tablet box 12.

In step 386, the inspection robot suction cups 201 may release suction of the disqualified pharmaceutical units 104, placing them at the tablet box 12. Releasing suction may include removing the negative pressure created at the inspection robot suction cups 201. In some embodiments, releasing suction may cause the inspection robot suction cups 201 to stop holding the disqualified pharmaceutical units 104.

In some embodiments, only the inspection robot suction cups 201 that are holding disqualified pharmaceutical units may release suction at the tablet box 12. For example, the inspection module 300 may transport disqualified pharmaceutical units to the tablet box 12 before transporting qualified pharmaceutical units to the blister machine 15. In some embodiments, the inspection robot suction cups 201 may be holding both qualified and disqualified pharmaceutical units 104, and only those inspection robot suction cups 201 holding disqualified pharmaceutical units may release suction to place them at the tablet box 12. In some embodiments, the pharmaceutical units 104 that have not been released may be considered qualified pharmaceutical units and may be handled accordingly, as discussed below.

Figure 4J:
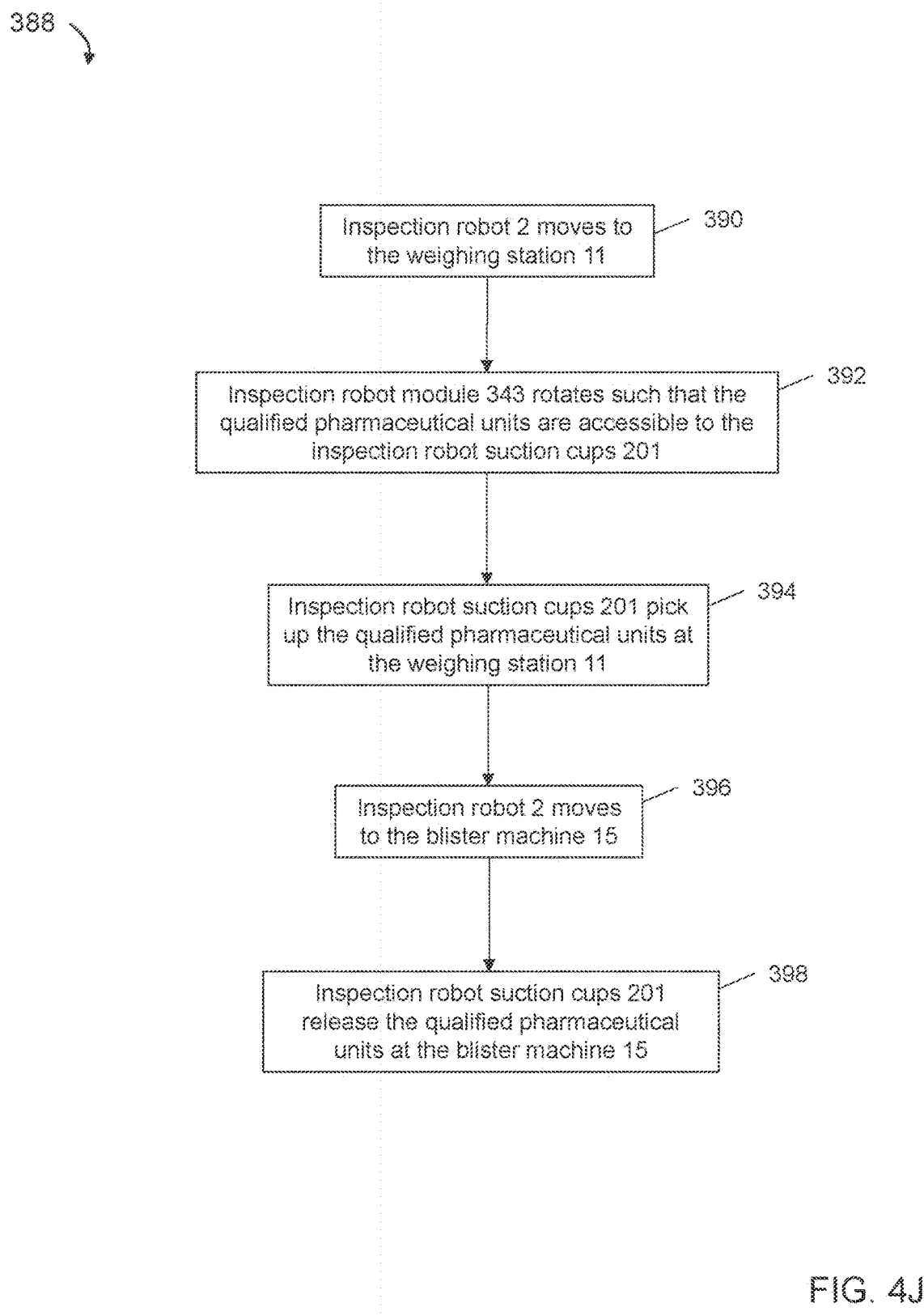
FIG. 4J illustrates a flowchart of an exemplary operation of automatically transporting qualified pharmaceutical units to the blister machine, according to some embodiments.

If a pharmaceutical unit qualifies, then in process 388 of FIG. 4E, the inspection module 300 may automatically transport the qualified pharmaceutical units 104 to the blister machine 15. FIG. 4J illustrates a flowchart of an exemplary operation of automatically transporting qualified pharmaceutical units to the blister machine, according to some embodiments.

Starting with step 390, the inspection robot 2 may move to the weighing station 11. Moving the inspection robot 2 to the weighing station 11 may include moving along the x-plane, y-plane, z-plane, or a combination thereof. In step 392, the inspection robot module 343 may rotate such that the set of pharmaceutical units 104 at the weighing station 11 are accessible to the inspection robot suction cups 201. In some embodiments, rotating the inspection robot module 343 for step 392 may be such that side 343A, where the inspection robot suction cups 201 may be located, is facing the pits of the weight scales at the weighing station 11.

In step 394, the inspection robot suction cups 201 may pick up the set of pharmaceutical units 104 at the weighing station 11. In some embodiments, the inspection robot suction cups 201 may create negative pressure pathways to create suction of the set of pharmaceutical units 104 at the weighing station 11. In some embodiments, each inspection robot suction cup 201 can be configured to pick up one pharmaceutical unit 104.

In some embodiments, only the inspection robot suction cups 201 that correspond to the locations of the qualified pharmaceutical units 104 at the weighing station 11 may be used for pick up. For example, if the qualified pharmaceutical units 104 are located at the first and fourth weight scales at the weighing station 11, then only the first and fourth inspection robot suction cups 201 may be used to pick up the corresponding qualified pharmaceutical units 104. In such instance, the second and third inspection robot suction cups 201 may not create negative pressure pathways and may not pick up the second and third pharmaceutical units 104. In some embodiments, the pharmaceutical units 104 that have not been picked up may be considered disqualified pharmaceutical units 104 and may be handled accordingly, as discussed above.

In step 396, the inspection robot 2 may move to the blister machine 15. This step may include moving the inspection robot module 343 and/or inspection robot 2 to the blister machine 15 by, e.g., moving the inspection robot 2 along the x-plane, y-plane, z-plane, or a combination thereof. Since the inspection robot suction cups 201 may be holding qualified pharmaceutical units 104 from the weighing station 11, the same set of the pharmaceutical units 104 may be moved to the blister machine 15.

In step 398, the inspection robot suction cups 201 may release suction of the qualified pharmaceutical units 104, placing them at the blister machine 15. Releasing suction may include removing the negative pressure created at the inspection robot suction cups 201. In some embodiments, releasing suction may cause the inspection robot suction cups 201 to stop holding the qualified pharmaceutical units 104.

In some embodiments, only the inspection robot suction cups 201 that are holding qualified pharmaceutical units may release suction at the blister machine 15. For example, the inspection module 300 may transport qualified pharmaceutical units to the blister machine 15 before transporting disqualified pharmaceutical units to the tablet box 12. In some embodiments, the inspection robot suction cups 201 may be holding both qualified and disqualified pharmaceutical units 104, and only those inspection robot suction cups 201 holding qualified pharmaceutical units may release suction to place them at the blister machine 15. In some embodiments, the pharmaceutical units 104 that have not been released may be considered disqualified pharmaceutical units and may be handled accordingly, as discussed above.

In some embodiments, not all pharmaceutical units 104 of a set of pharmaceutical units 104 located at the weighing station 11 row may qualify. The disqualified pharmaceutical units 104 may be transported to a different location (e.g., the tablet box 12) than the qualified pharmaceutical units 104. In some embodiments, the inspection robot suction cups 201 may pick up all of the set of the pharmaceutical units 104 at the weighing station 11 (e.g., at process 376), regardless of whether the pharmaceutical units 104 are qualified or disqualified. The inspection robot suction cups 201 may then automatically transport the pharmaceutical units 104 to and release the disqualified ones at the tablet box 12 (e.g., at step 386). The inspection robot suction cups 201 may automatically transport the pharmaceutical units 104 to and release the qualified ones at the blister machine 15 (e.g., at step 398). In such instance, step 390, step 392, and step 394 may be omitted, for example.

In some embodiments, the inspection unit 300 may measure and transport a set of pharmaceutical units 104 before proceeding to measure and transport another set of pharmaceutical units. For example, the inspection unit 300 may capture a first image and first weights of a first set of pharmaceutical units (e.g., pharmaceutical units 104A) and automatically transport the first set of pharmaceutical units 104A to the blister machine 15 or tablet box 17, before capturing a second image and second weights of a second set of pharmaceutical units (e.g., pharmaceutical units 104H) and automatically transporting the second set. In this manner, as shown in FIG. 4E, step 352, step 360, step 374, step 376, and step 388 may be repeated for each set of the pharmaceutical units 104.

Exemplary Packaging Module

In some embodiments, the packaging module 500 can include a blister machine 15, as illustrated in FIG. 2A. The blister machine 15 may be configured to package qualified pharmaceutical units 104 in a blister pack. In some embodiments, the blister pack may include a sheet having a plurality of geometrical features, such as pits. The plurality of geometrical features may be configured to hold one or more pharmaceutical units 104.

In some embodiments, the geometrical features of a blister pack may be recesses formed in the sheet. The sheet having geometrical features may include any type of material configured to hold and protect the pharmaceutical units 104. Exemplary materials can include, but are not limited to, plastic, aluminum, and the like.

The blister pack may be configured to protect the pharmaceutical units 104, using a protection layer, from external factors such as humidity, contamination, fluctuations in temperature, ultraviolet light rays, etc. An exemplary protection layer can include aluminum. In some embodiments, the protection layer may be a flat, non-rigid sheet capable of being punctured, peeled, or both.

The blister machine 15 may be configured to hold the blister pack while being filled with qualified pharmaceutical units 104. The blister machine 15 may also be configured to seal a filled blister pack. In some embodiments, the blister machine 15 may seal a blister pack using a cold aluminum sealing process.

After the blister machine 15 has finished sealing a blister pack, the blister pack position 420 may receive the blister pack. The blister pack may remain at the blister pack position 420 until it is automatically transported to the packaging module 500.

Exemplary Operation of a Blister Machine

In some embodiments, the blister machine 15 may operate by using a cold aluminum stamping process to form geometrical features, such as pits, in a strip of aluminum material. The pits can be formed by punching out the pits in the aluminum strip.

Figure 5A:
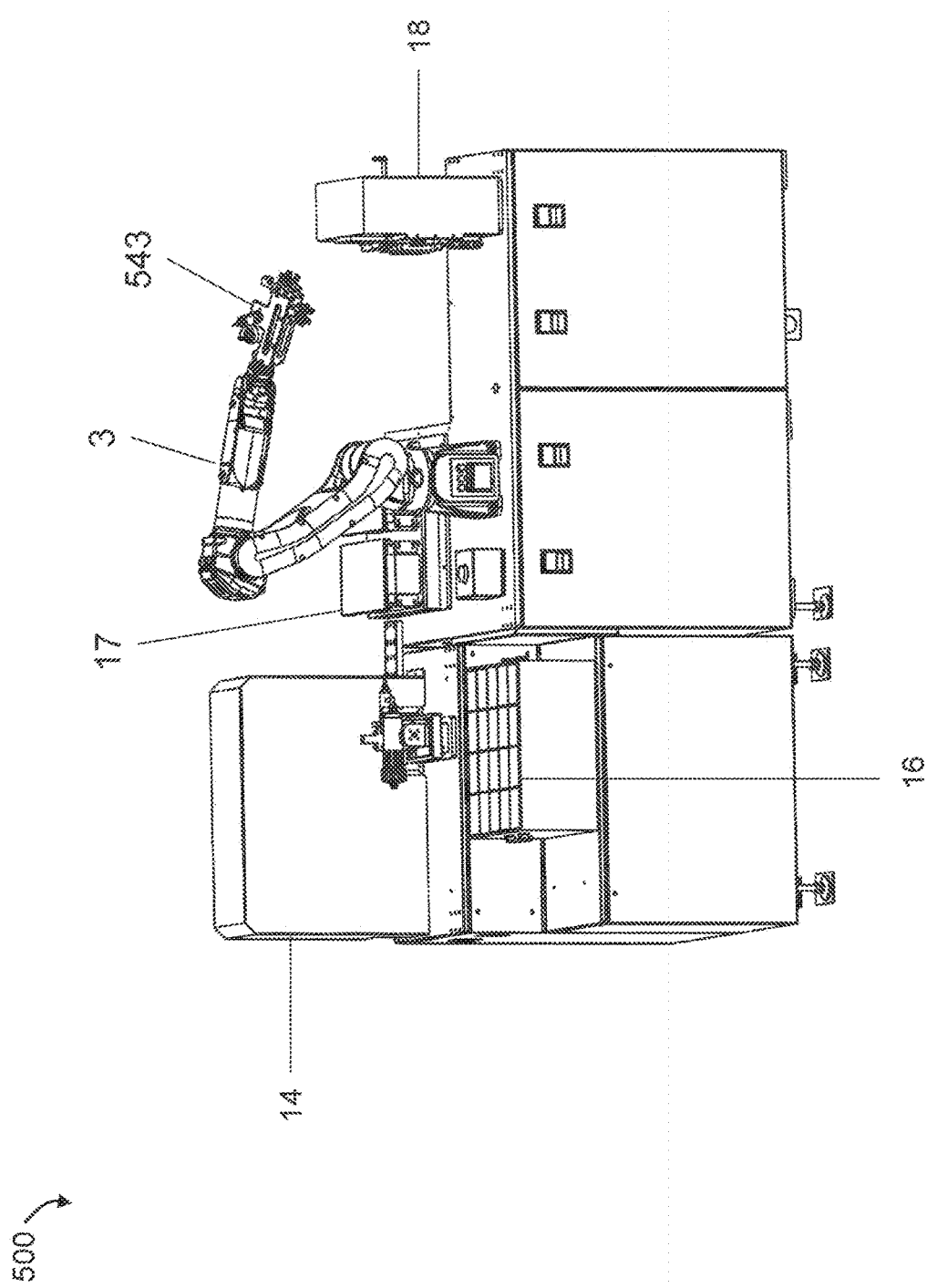
FIG. 5A illustrates a plan view of an exemplary packaging module, according to some embodiments of the disclosure.
Figure 5B:
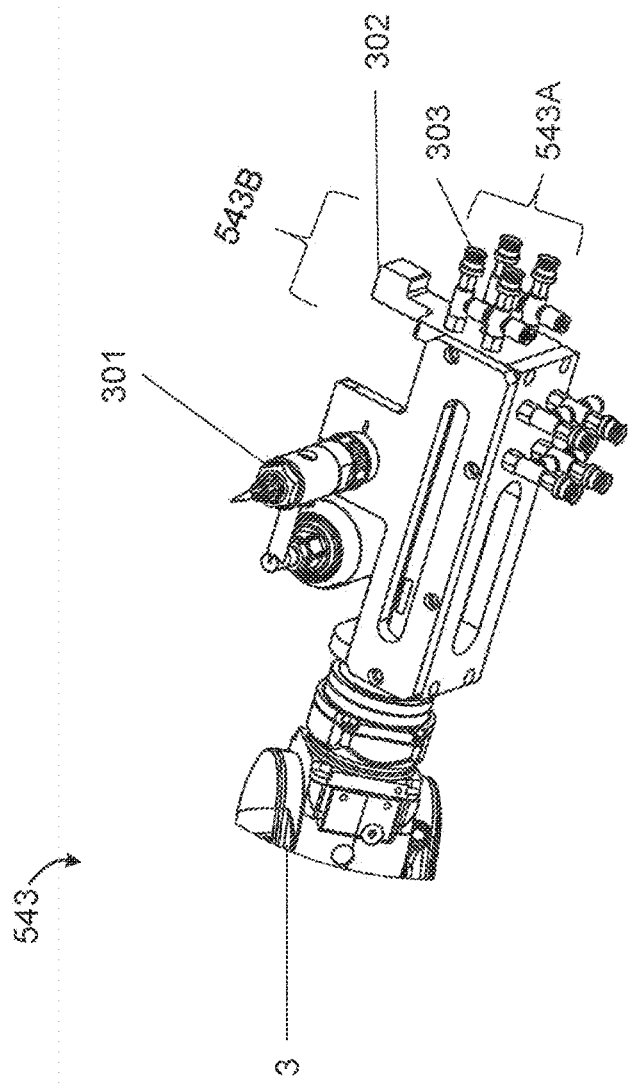
FIG. 5B illustrates a side-view of an exemplary packaging robot module, according to some embodiments of the disclosure.
Figure 5C:
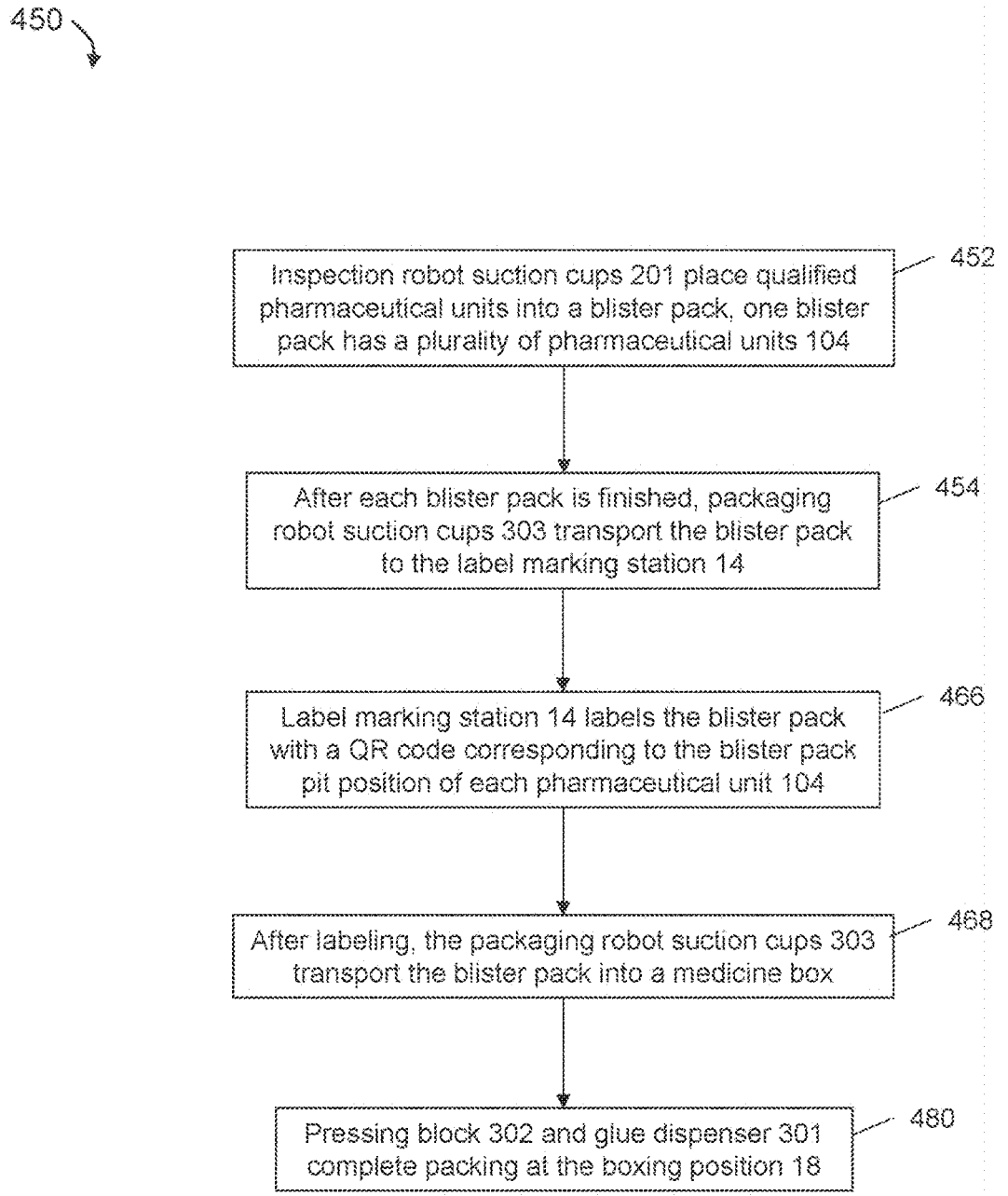
FIG. 5C illustrates a flowchart of an exemplary operation of a packaging process, according to some embodiments of the disclosure.

In some embodiments, the inspection robot suction cups 201 may place qualified pharmaceutical units 104 in pits of the aluminum strip, in step 452 of process 450 of FIG. 5C. Once all of the plurality of pits in a section of the aluminum strip are filled, the blister machine 15 can seal the aluminum strip. In some embodiments, the blister machine may separate the aluminum strip into multiple blister packs. The blister machine 15 may move the sealed blister pack to the blister pack position 420.

In some embodiments, sealing the aluminum strip can include using a cold aluminum sealing process, where an aluminum protection layer may be placed on top of the aluminum strip having the geometrical features. When the protection layer is placed on top of the geometrical features, edges of the protection layer may make contact with the aluminum strip. The aluminum strip and the protection layer may be united using processes such as crimping or sealing with an adhesive (e.g., pressure-sensitive adhesive).

FIG. 5A illustrates a plan view of an exemplary packaging module, according to some embodiments of the disclosure. The packaging module 500 may be for assembling and sealing a medicine box (e.g., cardboard medicine box). The packaging module 500 may also before for automatically transporting a medicine box using suction. In some embodiments, the packaging module 500 may be for automatically transporting a blister pack. In some embodiments, the packaging module 500 may be for labeling a blister pack, a medicine box, or both. The packaging module 500 include a packaging robot 3, a label marking station 14, a box storage 17, a boxing position 18, a stack position 16, and packaging robot module 543. In some embodiments, the packaging module 500 may include a blister machine 15, discussed above.

The packaging robot 3 can be a mechanical arm that includes multiple beams and one or more connecting joints. The packaging robot 3 can be capable of moving along multiple (e.g., six) degrees of freedom. In some embodiments, the connecting joint(s) may be located between the beams, and the packaging robot 3 may have two ends. A first end can attach to a tabletop-like surface (as shown in the figure), and a second end can be capable of having a tool attached to it. For example, the packaging robot module 543 may be attached to the second end of the packaging robot 3.

The packaging robot 3 may be configured to receive one or more control signals from a computer system (e.g., one or more computer systems 600 of a control module). The control signals may be used to control the movement of the packaging robot 3. In some embodiments, the control signals may be used to control the movement of the packaging robot module 543.

The label marking station 14 may be configured to add one or more labels to a blister pack, a medicine box, or both. In some embodiments, the label marking station 14 may include a laser that engraves or prints the label(s) on the blister pack and/or medicine box. In some embodiments, the laser marking station 14 can be a hybrid laser marking machine.

A label can be include or be linked to information such as the type of pharmaceutical unit 104, the date of manufacture, the production batch number associated with the corresponding continuous manufacturing process, the inspection characteristics of the pharmaceutical units (e.g., appearance such as color, weight, diameter, defects, etc.) the production batch conditions (e.g., production temperature, pressure, time, etc.), and the like. This information can be conveyed in the form a two-dimensional (e.g., barcode, QR code, alphanumeric characters) type label, for example. The label, such as QR code, can be a unique identifier of a pharmaceutical unit 104, making it traceable to manufacturing information, such as material feeding stage, printing stage, and inspection stage.

In some embodiments, the label marking station 14 may include a marking pit (not shown) configured to receive a blister pack or a medicine box. The packaging robot suction cups 303 (of the packaging robot 3) may automatically transport the blister pack or medicine box to the label marking station 14 by placing the blister pack or medicine box at the marking pit. The marking pit may be coupled to an actuator (e.g., a motor, a pneumatic, etc.). The actuator may automatically move the marking pit holding the blister pack or medicine box from a first position to a second position. The first position may be located where the packaging robot suction cups 303 can access the blister pack or medicine box. The second position may be located where the laser can access the blister pack or medicine box, such as under the laser. Once the blister pack or medicine box is under the laser (i.e., the second position), the laser may add the label, and then the marking pit may automatically move the blister pack or medicine box to the first position.

The box storage 17 may hold a medicine box before being assembled. In some embodiments, the box storage 17 may hold one or more flattened medicine boxes. A medicine box may be one that holds blister packs and protect them from environmental exposure. In some embodiments, a flattened medicine box may be arranged vertically along different y-positions within the box storage 17. In some embodiments, the medicine boxes in the box storage 17 may be a semi-finished medicine boxes.

The box storage 17 may include or may have attached to it a sensor and an actuator, such as a position sensing device (not shown). The sensor can be configured to ensure that a front surface of the front-most medicine box in the box storage 17 is at a pre-determined y-position. For example, when the packaging robot 3 removes the front-most (first) medicine box from the box storage 17, the front surface of the next (second) medicine box may be at a different y-position. The sensor can sense the change in y-position, and the actuator can move the second medicine box (or a stack of boxes including the second medicine box) to ensure that the front surface of the second medicine box is at the pre-determined y-position. In this manner, the packaging robot 3 may not need to adjust the y-position needed each time to pick up a flattened medicine box, thereby increasing the throughput of the packaging module 300.

The boxing position 18 can be for assembling a medicine box. In some embodiments, the boxing position 18 may be configured to hold the medicine box, while one or more blister packs are placed in the medicine box. In some embodiments, the boxing position 18 may also be configured to hold a medicine box and, at least in part, seal one or more ends of the medicine box. In some embodiments, the boxing position 18 may include one or more moveable pushing cylinders configured to fold one or more flaps of the medicine box for sealing. In some embodiments, the boxing position 18 may include three pushing cylinders. A first pushing cylinder can be configured to fold a first flap of the medicine box. A second pushing cylinder can be configured to fold a second flap, and a third pushing cylinder can be configured to fold a third flap. In some embodiments, the moveable pushing cylinders can fold a flap of a medicine box by pressing it.

In some embodiments, the boxing position 18 may include a plurality of surfaces configured to hold sides of the medicine box for assembly. The plurality of surfaces of the boxing position 18 may be arranged to create a cavity, wherein the cavity can be similar in shape and size to the medicine box once assembled. In some embodiments, a medicine box can be a cube or orthotope with four sides and two ends: a top end and a bottom end. Each end may include flaps to be folded and sealed. The four sides may be sides along the length of the medicine box. In some embodiments, the boxing position 18 can be configured to rotate the medicine box to allow the pushing cylinders and pressing block 302 to fold and seal both top and bottoms ends of the medicine box.

The stack position 16 may be configured to hold a stack of medicine boxes after being packaged and sealed. In some embodiments, the stack position 16 can be an acrylic box. In some embodiments, the stack position 16 can be a cube with its front side exposed. The stack position 16 may be coupled to a sensor and an actuator (e.g., a motor, a pneumatic, etc.). The sensor may configured to sense the height of the stack of medicine boxes. The actuator can be for adjusting the height of the stack of the medicine boxes in the stack position 16. The sensor and the actuator can be configured to ensure that the top surface of the top-most medicine box in the stack position 16 is at a pre-determined height. For example, when the packaging robot 3 adds a medicine box to the stack position 16, the top-most (first) medicine box in the stack position 16 may be at a higher z-height than a pre-determined z-height. The sensor can sense this change in height, and the actuator can adjust (e.g., lower) the height of the stack of medicine boxes in the stack position 16 to ensure that there is an empty space for the next medicine box to be placed in the stack of medicine boxes. In this manner, the packaging robot 3 may not need to adjust the z-height each time to place the medicine box in the stack of medicine boxes, thereby increasing the throughput of the packaging module 500.

In some embodiments, a packaged and sealed medicine box may be one that includes one or more blister packs. In some embodiments, a sealed medicine box may have all ends sealed. In some embodiments, one or more sensors (not shown) may be coupled to the stack position 16. These sensor(s) may be configured to determine the presence or absence of a packaged and sealed medicine box, in the stack position 16.

The packaging robot module 543 can be attached to the packaging robot 3. FIG. 5B illustrates a side-view of an exemplary packaging robot module, according to some embodiments of the disclosure.

The packaging robot module 543 can include packaging robot suction cups 303 for picking up and holding a blister pack or a medicine box, a pressing block 302 for pressing a flap of a medicine box, and a glue dispenser 301 for dispensing glue on a medicine box. In some embodiments, the packaging robot suction cups 303 can be located on a side 543A of packaging robot module 543, the pressing block 302 may be located on a second side 543B, and the glue dispenser 301 may be located on a third side, as shown in the figure.

The packaging robot suction cups 303 can be configured to create a plurality of negative pressure pathways that allow the packaging robot suction cups 303 to pick up a blister pack or a medicine box via suction. Although the figure shows four packaging robot suction cups 303, embodiments of the disclosure can include any number such as 1, 2, 5, 6, etc. In some embodiments, the number of packaging robot suction cups 303 can be based on the size and/or weigh of a blister pack, a medicine box, or both. Additionally or alternatively, the relative arrangement of the packaging robot suction cups 303 can be based on the shape of a blister pack, a medicine box, or both.

The pressing block 302 may be configured to press a flap of a medicine box. In some embodiments, the pressing block 302 may be a block of metal. In some embodiments, the flap that the pressing block 302 presses may be one that seals an end of the medicine box. For example, the pressing block 302 may be used to press the fourth flap of a medicine box to close the bottom end of the medicine box.

The glue dispenser 301 may be configured to dispense an adhesive, such as glue. In some embodiments, the glue dispenser 301 can be configured to dispense glue on a flap of a medicine box. For example, the glue dispenser 301 may dispense glue on a third flap of a medicine box. After the glue is dispensed, a fourth flap can be folded on top of the dispensed glue to seal the medicine box.

Exemplary Operation of a Packaging Module

The packaging module 500 can be configured to perform various operations, such as automatically transporting and labeling blister packs, automatically assembling medicine boxes, automatically transporting and labeling medicine boxes, and automatically filling and transporting a stack position. Each operation will be discussed in turn below.

Exemplary Transportation and Labeling of Blister Packs

After an aluminum strip with pharmaceutical units 104 has been sealed and separated into blister packs, a blister pack can be transported and labeled by a label marking station 14. In some embodiments, the packaging module 500 can automatically transport the blister pack using packaging robot suction cups 303 attached to a packaging robot module 543 of a packaging robot 3. FIG. 5C illustrates a flowchart of an exemplary operation of a packaging process, according to some embodiments of the disclosure.

After the blister machine 15 seals a blister pack (step 452), the packaging robot 3 may use the packaging robot suction cups 303 to automatically transport the blister pack in process 454, to the label marking station 14.

Figure 5D:
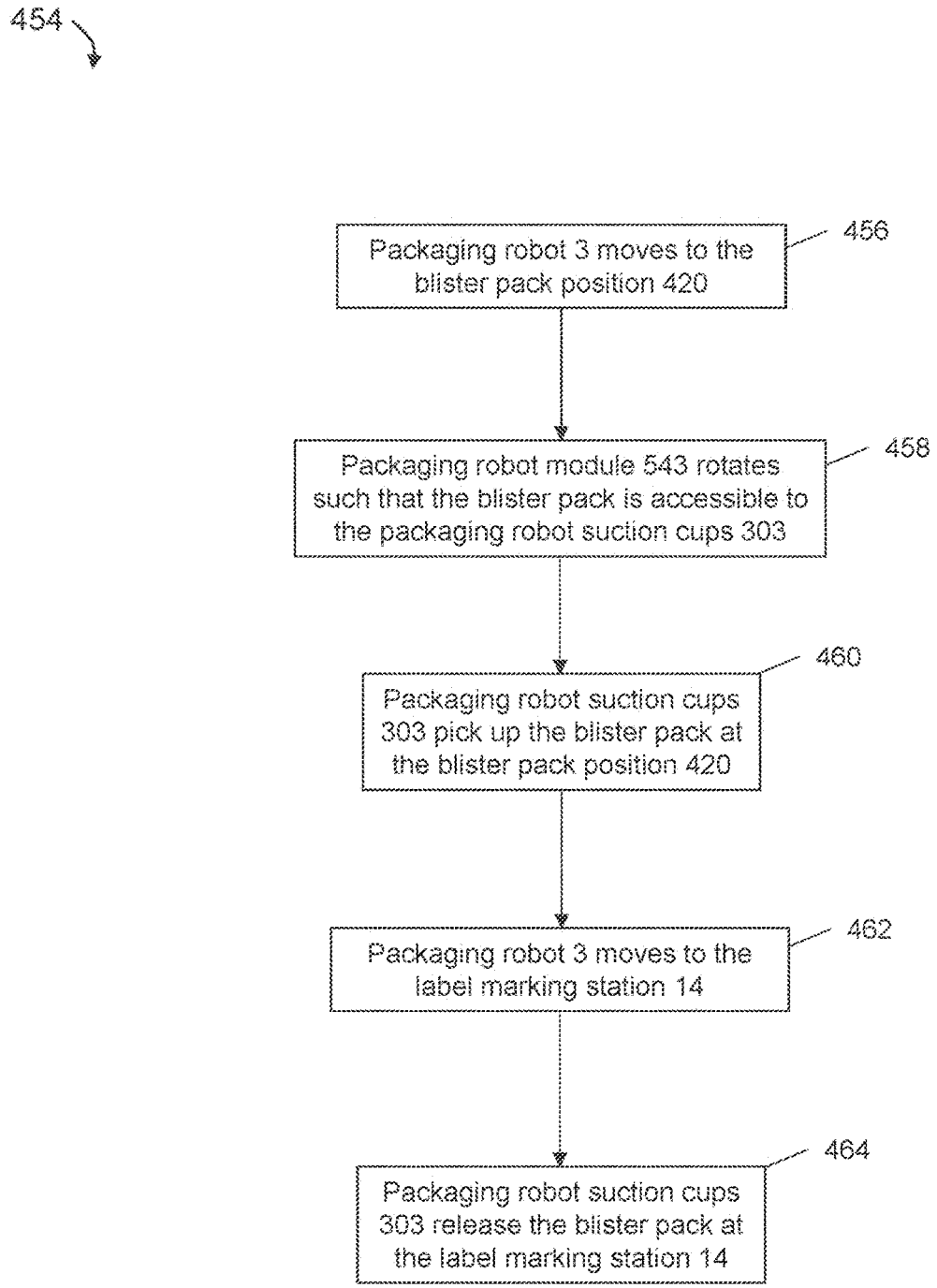
FIG. 5D illustrates a flowchart of an exemplary operation of automatically transporting a blister pack from the blister pack position to the label marking station, according to some embodiments of the disclosure.

Process 454 may begin with step 456, as shown in FIG. 5D. In step 456, the packaging robot 3 may move to the blister pack position 420. Moving the packaging robot 3 to the blister pack position 420 may include moving along the x-plane, y-plane, z-plane, or a combination thereof. In step 458, the packaging robot module 543 may rotate such that the blister pack is accessible to the packaging robot suction cups 303. In some embodiments, rotating the packaging robot module 543 for step 458 may be such that the packaging robot suction cups 303 are facing the blister pack.

In step 460, the packaging robot suction cups 303 may pick up the blister pack at the blister pack position 420. In some embodiments, the packaging robot suction cups 303 may create negative pressure pathways to create a suction at a plurality of locations of the blister pack.

In step 462, the packaging robot 3 may move the packaging robot module 543 to the label marking station 14. This step may include e.g., moving the packaging robot 3 along the x-plane, y-plane, z-plane, or a combination thereof. Since the packaging robot suction cups 303 may be holding a blister pack, the movement of the packaging robot module 543 may cause the blister pack to also move to the label marking station 14. In step 464, the packaging robot suction cups 303 may release suction of the blister pack, placing it at the label marking station 14. In some embodiments, the packaging robot suction cups 303 may place the blister pack at a marking pit of the label marking station 14.

Referring back to FIG. 5C, the label marking station 14 may add one or more labels to the blister pack (step 466). The label added may be, e.g., a barcode, a QR code, or alphanumeric characters.

Figure 5E:
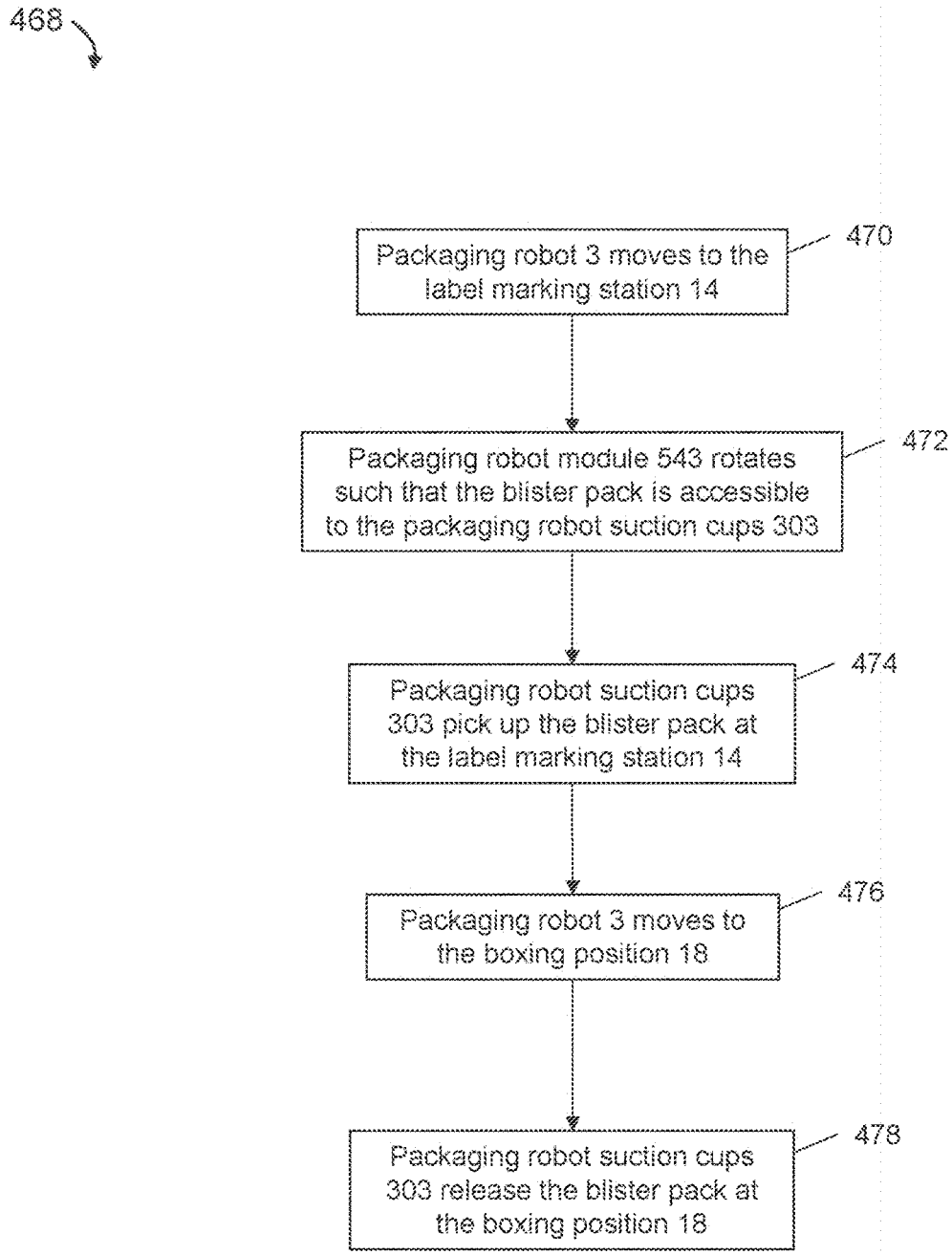
FIG. 5E illustrates a flowchart of an exemplary operation of automatically transporting a blister pack from the label marking station to the boxing station, according to some embodiments of the disclosure.

After labeling the blister pack, the packaging module 500 can automatically transport the blister pack from the label marking station 14 to the boxing position 18 where the blister pack can be placed in a medicine box (process 468). FIG. 5E illustrates a flowchart of an exemplary operation of automatically transporting a blister pack from the label marking station to the boxing station, according to some embodiments of the disclosure. In step 470 of process 468, the packaging robot 3 may move to the label marking station 14. Moving the packaging robot 3 to the label marking station 14 may include moving along the x-plane, y-plane, z-plane, or a combination thereof. In step 472, the packaging robot module 543 may rotate such that the blister pack is accessible to the packaging robot suction cups 303. In some embodiments, rotating the packaging robot module 543 may be such that the packaging robot suction cups 303 are facing the blister pack.

In step 474, the packaging robot suction cups 303 may pick up the blister pack at the label marking station 14. In some embodiments, the packaging robot suction cups 303 may create negative pressure pathways to create a suction at a plurality of locations of the blister pack to pick it up.

In step 476, the packaging robot 3 may move the packaging robot module 543 to the boxing position 18. This step may include e.g., moving the packaging robot 3 along the x-plane, y-plane, z-plane, or a combination thereof. Since the packaging robot suction cups 303 may be holding a blister pack, the movement of the packaging robot module 543 may cause the blister pack to also move to the boxing position 18.

In step 478, the packaging robot suction cups 303 may release suction of the blister pack, so that the blister pack is inserted into one end of a medicine box being held by the boxing position 18. In some embodiments, the blister pack can be inserted into the top end of the medicine box. The top end of the medicine box may be facing up when the medicine box is held by the cavity of the boxing position 18, for example. The packaging robot module 543 may angle the blister pack to be upright or close to upright so that it slides into the top end of the medicine box when released in step 478.

Exemplary Assembly of a Medicine Box

Figure 5F:
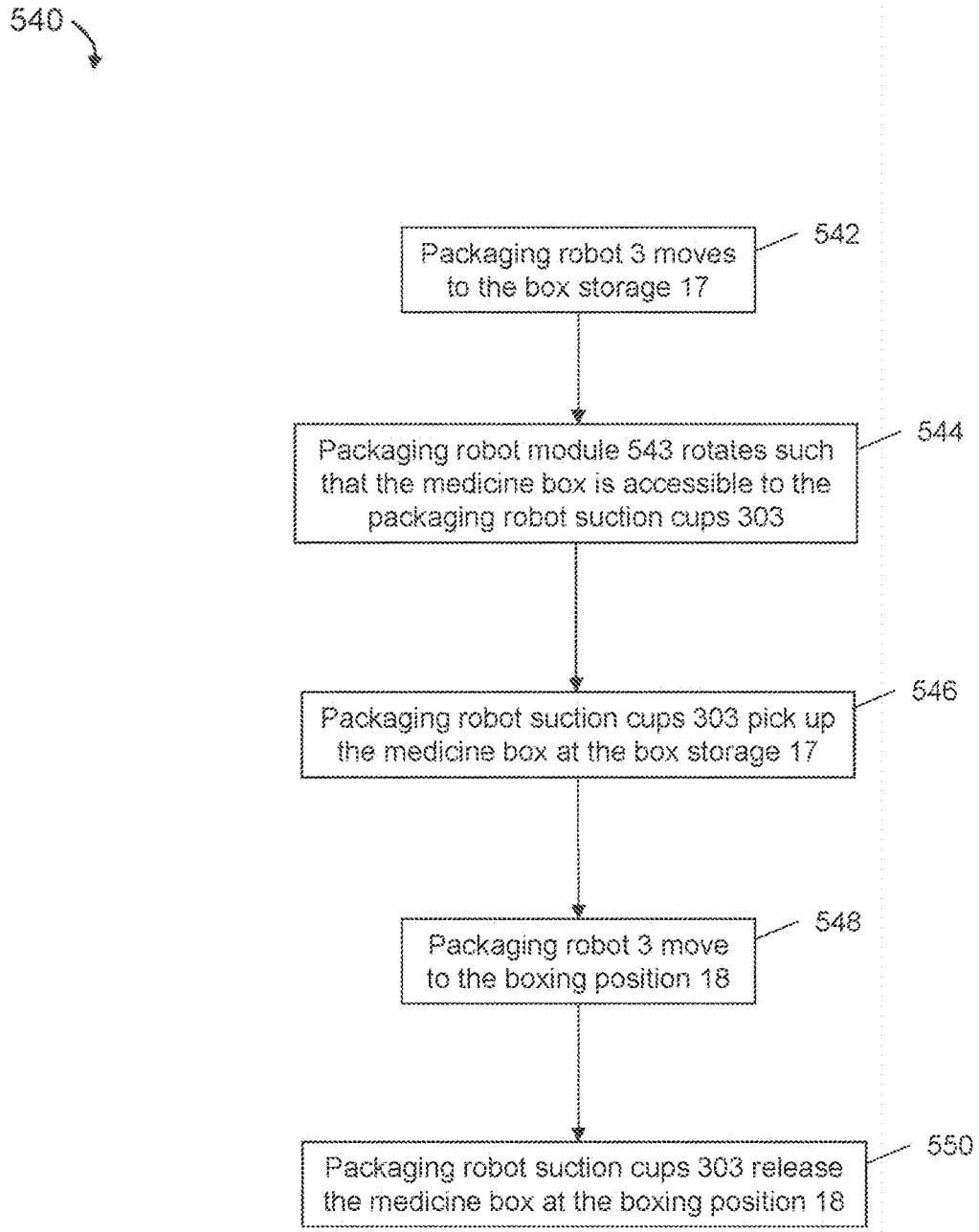
FIG. 5F illustrates a flowchart of an exemplary operation of a packaging module 500 automatically transporting a flattened medicine box from the box storage to the boxing position, according to some embodiments of the disclosure.

Another operation of the packaging module 500 may be to assemble a medicine box. In order to assemble a medicine box, the packaging module 500 may have to transport a flattened medicine box from the box storage 17 to the boxing position 18. FIG. 5F illustrates a flowchart of an exemplary operation of a packaging module 500 automatically transporting a flattened medicine box from the box storage 17 to the boxing position 18, according to some embodiments of the disclosure.

To transport the flattened medicine box, the packaging robot 3 may move to the box storage 17 (step 542 of process 540). In some embodiments, the packaging robot 3 may have to move the packaging robot 3 along the x-plane, y-plane, z-plane, or a combination thereof. The packaging robot module 543 may have to rotate such that the medicine box is accessible to the packaging robot suction cups 303 (step 544). The rotation of the packaging robot module 543 may be such that the packaging robot suction cups 303 are facing a certain side (e.g., front side) of the medicine box.

The packaging robot suction cups 303 may pick up the medicine box at the box storage 17 (step 546) via suction. The packaging robot 3 may move the packaging robot module 543, holding the medicine box, to the boxing position 18 by moving along the x-plane, y-plane, z-plane, or a combination thereof (step 548). The packaging robot suction cups 303 may release suction of the medicine box causing it to be placed at the boxing position 18 (step 550).

Figure 5G:
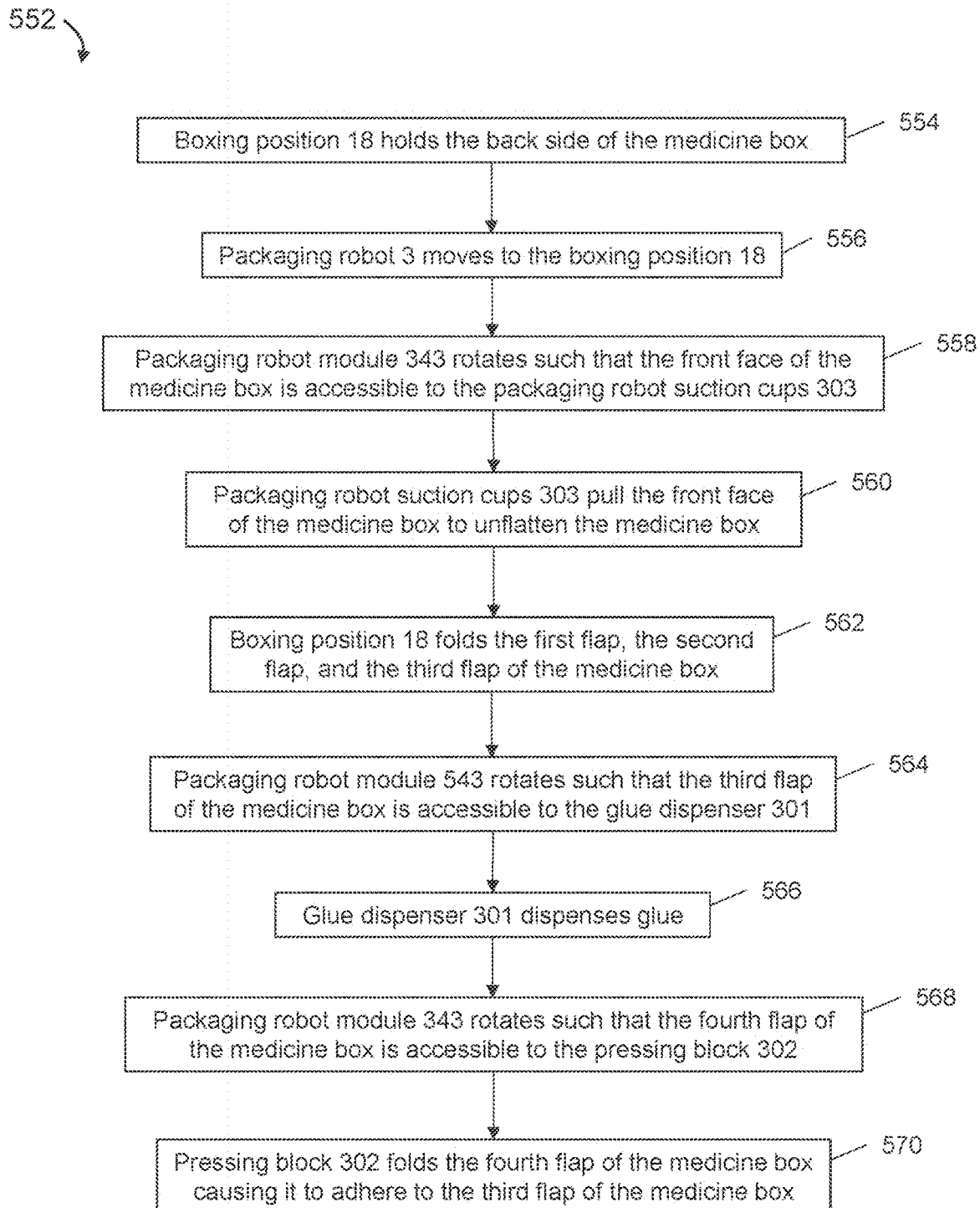
FIG. 5G illustrates a flowchart of an exemplary operation of unflattening a medicine box, according to some embodiments of the disclosure.

To assemble the medicine box, it may have to be unflattened. FIG. 5G illustrates a flowchart of an exemplary operation of unflattening a medicine box, according to some embodiments of the disclosure.

Before process 552 begins, the boxing position 18 may be holding an unflattened medicine box in a cavity of the boxing position 18, for example. In some embodiments, the boxing position 18 may be holding the back side of the medicine box (step 554), and the front side (e.g., along the length of the medicine box) may be facing outward from the boxing position 18. In step 556 and step 558, the packaging robot 3 may move to the boxing position 18 and rotate the packaging robot module 543 such that its packaging robot suction cups 303 are facing the front side of the medicine box.

In step 560, the packaging robot suction cups 303 may use suction to pull the front side of the medicine box, causing the medicine box to unflatten. After the medicine box has been unflattened, it may have be three-dimensional with flaps that have not been folded at the top end and the bottom end. In some embodiments, each end of a medicine box may have four flaps.

In step 562, the boxing position 18 may fold and seal flaps of the bottom end of the medicine box. A first pushing cylinder of the boxing position 18 may be used to press and fold the first flap. In some embodiments, when facing the front side of the medicine box, the first flap may be on the left side of the medicine box, and pressing the first flap may cause it to fold towards the right side of the medicine box. The boxing position 18 may fold a second flap by using a second pushing cylinder that presses the second flap. In some embodiments, when facing the front side of the medicine box, the second flap may be on the right side of the medicine box, and pressing the second flap may cause it to fold towards the left side of the medicine box. The boxing position 18 may also fold a third flap by using a third pushing cylinder that presses the third flap. In some embodiments, when facing the front side of the medicine box, the third flap may be at the top of the medicine box, and pressing the third flap may cause it to fold down. In some embodiments, after folding the first flap, the second flap, and the third flap, the third flap may lay on top of the first flap and the second flap.

In step 564, the packaging robot module 543 may rotate to utilize its glue dispenser 301. The rotation can be such that the third flap of the medicine box is accessible to the glue dispenser 301. In step 566, the glue dispenser 301 can dispense glue. In some embodiments, the glue may be dispensed on the third flap of the medicine box.

In step 568, the packaging robot module 543 may rotate to utilize its pressing block 302 such that the fourth flap of the medicine box is accessible to the pressing block 302. In some embodiments, at step 568, the fourth flap of the medicine box may be unfolded, and the pressing block 302 may be facing the fourth flap.

In step 570, the packaging robot module 543 and packaging robot 3 may move the pressing block 302 towards the fourth flap of the medicine box, causing it to fold towards the third flap of the medicine box. After the pressing block 302 folds the fourth flap of the medicine box, the fourth flap may lay on top of the third flap with a layer of glue in between the third flap and the fourth flap. In some embodiments, a third pushing cylinder of the boxing position 18 may press down on the fourth flap causing it to adhere to the third flap.

After the bottom end of the medicine box is sealed, the boxing position 18 may rotate the medicine box, causing the top end of the medicine box to be exposed. After the rotation, the top end of the medicine box may be open and may not be sealed. The packaging module 500 can place one or more blister packs in the medicine box in process 468, as discussed above.

After the blister pack(s) are placed in the medicine box, the packaging module 500 can seal the medicine box and complete packing using the pressing block 302 and the glue dispenser 301 (process 480 of FIG. 5C).

Figure 5H:
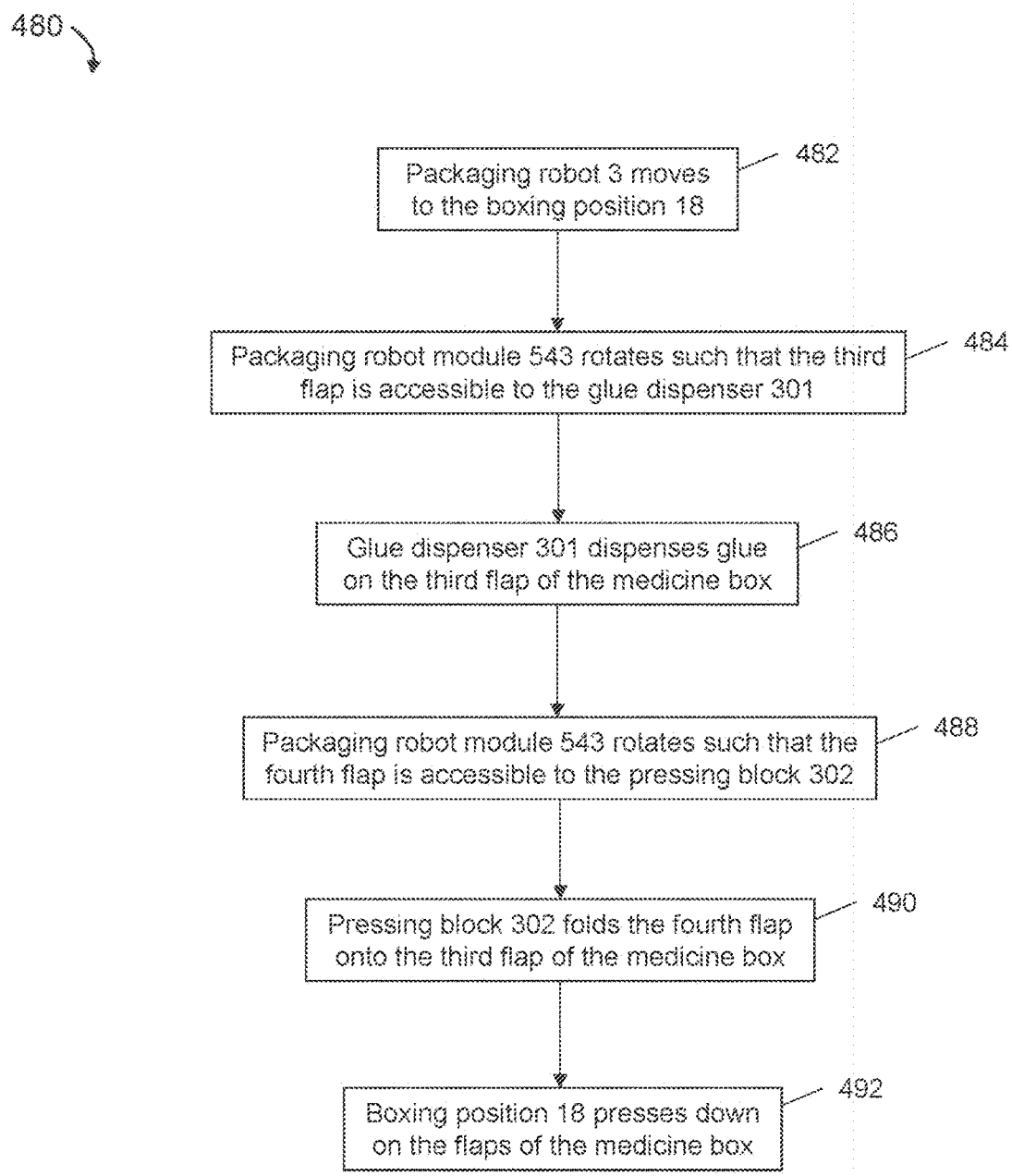
FIG. 5H illustrates a flowchart of an exemplary operation of sealing a medicine box, according to some embodiments of the disclosure.

FIG. 5H illustrates process 480 with moving the packaging robot module 543 to the boxing position 18 (step 482). The packaging robot module 543 may rotate such that the third flap is accessible to the glue dispenser 301 (step 484).

The glue dispenser 301 may dispense glue on the third flap of the medicine box (step 486). The packaging robot module 543 may rotate such that the fourth flap is accessible to the pressing block 302 (step 488). The pressing block 302 can press the fourth flap causing it to fold onto the third flap of the medicine box (step 490). A third pushing cylinder of the boxing position 18 can press down on the flaps of the medicine box, thereby sealing the medicine box (step 492).

Exemplary Transportation and Labeling of Medicine Box

Figure 5I:
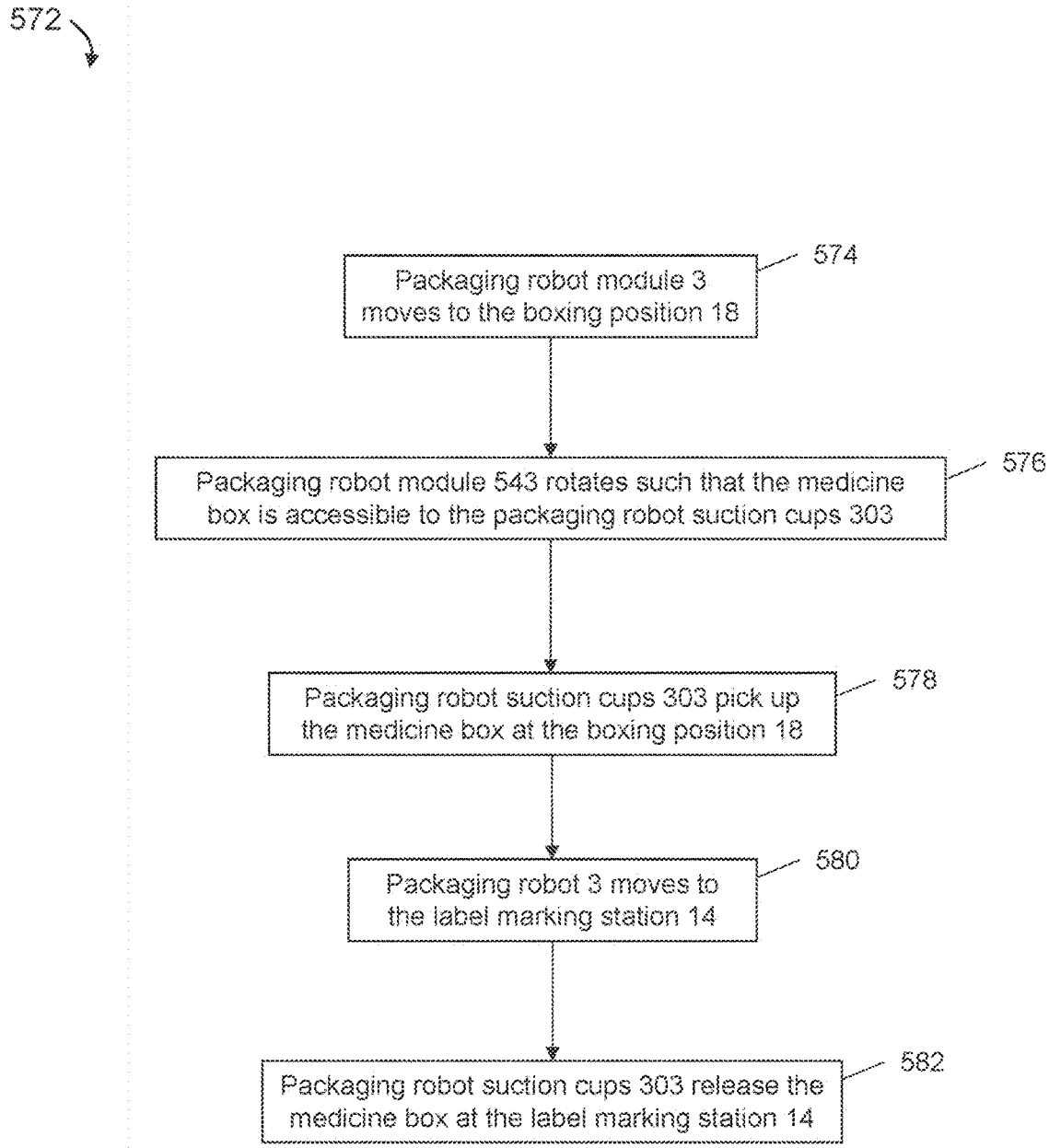
FIG. 5I illustrates a flowchart of an exemplary operation of automatically transporting a medicine box to the label marking station, according to some embodiments of the disclosure.

Another operation of the packaging module 500 may be automatically transporting the medicine box to the label marking station 14. FIG. 5I illustrates a flowchart of an exemplary operation of a packaging module 500 automatically transporting a medicine box to the label marking station 14, according to some embodiments of the disclosure.

The packaging robot 3 may move to the boxing position 18 (step 574 of process 572). In some embodiments, the packaging robot module 543 may have to move the packaging robot 3 along the x-plane, y-plane, z-plane, or a combination thereof. The packaging robot module 543 may have to rotate such that the medicine box is accessible to the packaging robot suction cups 303 (step 576). The rotation of the packaging robot module 543 may be such that the packaging robot suction cups 303 are facing a front side of the medicine box.

The packaging robot suction cups 303 may pick up the medicine box at the boxing position (step 578) via suction. The packaging robot 3 may move the packaging robot module 543, holding the medicine box, to the label marking station 14 by moving along the x-plane, y-plane, z-plane, or a combination thereof (step 580). The packaging robot suction cups 303 may release suction of the medicine box causing it to be placed at the label marking station 14 (step 582).

Once the medicine box is at the label marking station 14, the label marking station 14 can label the medicine box. In some embodiments, the label marking station 14 can use laser or ink to add (e.g., engrave, print, etc.) one or more labels to the medicine box.

Figure 5J:
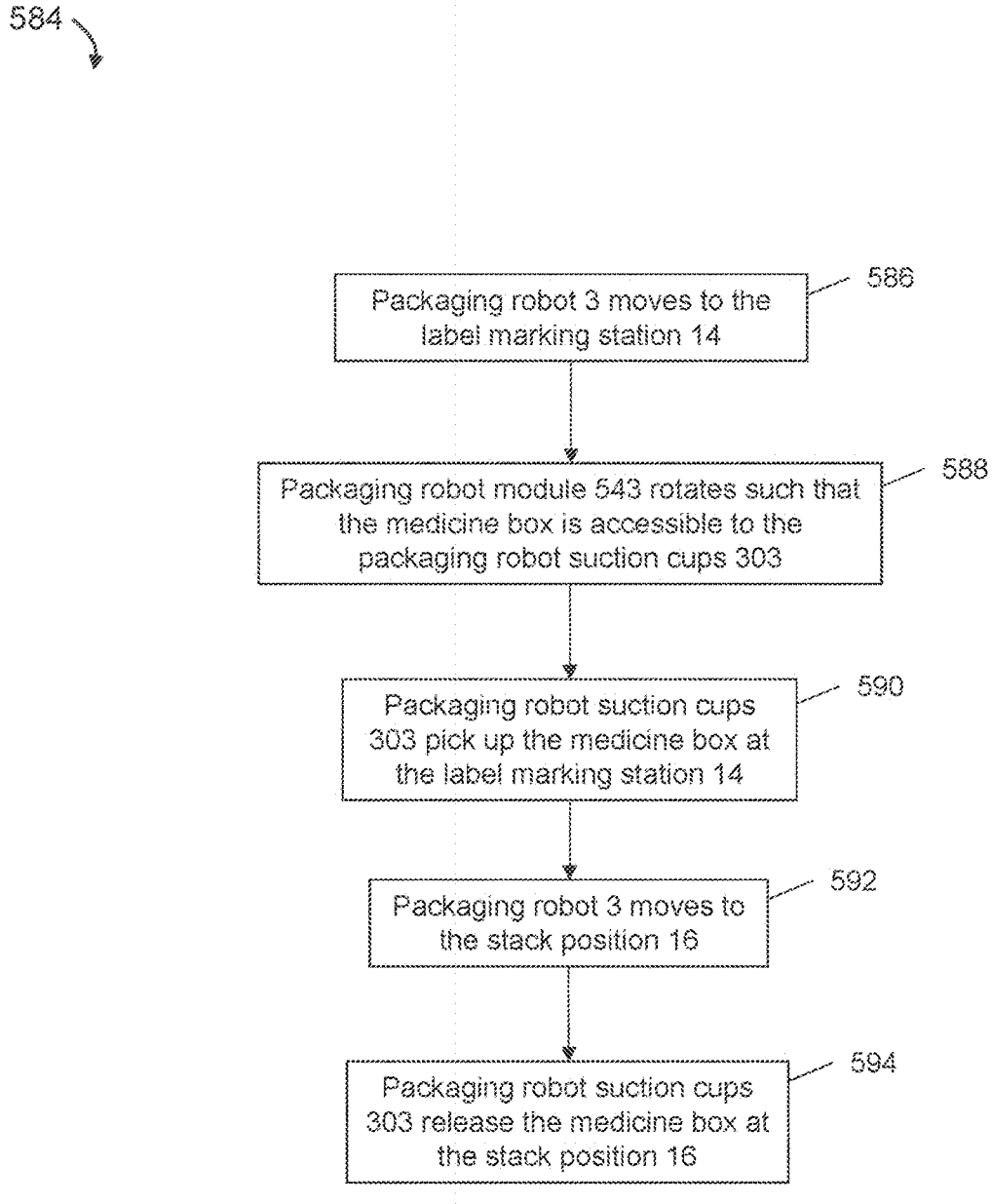
FIG. 5J illustrates a flowchart of an exemplary operation of automatically transporting a medicine box from the label marking station to the stack position, according to some embodiments of the disclosure.

After the medicine box is labeled, in process 584, the packaging module 500 may automatically transporting the medicine box from the label marking station 14 to the stack position 16. FIG. 5J illustrates a flowchart of process 584, which begins with step 586.

In step 586, the packaging robot 3 may move to the label marking station 14. The packaging robot module 543 may rotate such that its packaging robot suction cups 303 may have access (e.g., be facing towards) the medicine box at the label marking station 14 (step 588).

In step 590, the packaging robot module 543 and the packaging robot suction cups 303 may pick up the medicine box at the label marking station 14. In step 592, the packaging robot module 543 may move the medicine box to the stack position 16. At the stack position 16, the robot module 543 may place the medicine box there by releasing suction from the packaging robot suction cups 303 (step 594).

Exemplary Filling and Transportation of a Stack Position

In some embodiments, the stack position 16 may be configured to hold multiple medicine boxes. As discussed above, in step 578 of FIG. 5I, the packaging robot module 543 may place a medicine box at the stack position 16. The packaging robot module 543 may continue to place packaged and sealed medicine boxes in a stack of medicine boxes in the stack position 16 until the stack position 16 is filled. After each medicine box is placed into an empty slot in the stack position 16, the stack position 16 may make room for another empty slot until there are no more empty slots. Making room for another empty slot may include lowering the height of the stack of medicine boxes. Lowering the height of the stack of medicine boxes may ensure that the packaging robot 3 does not have to adjust the z-height when transporting each medicine box.

Once the stack position 16 is filled with medicine boxes, a stack position transport mechanism (not shown) can automatically transport the filled stack position 16 out of the unloading and packaging device 100. Then, the stack position transport mechanism can automatically transport an empty station position 16 to the unloading and packaging device 100.

Exemplary Control Module

The control module can be configured to control the unloading and packaging device 100, the loading/unloading module 200, the inspection module 300, the packaging module 500, a film deformation separation module (e.g., film deformation separation module 700 of FIG. 7A, discussed below), a smart material deformation separation module (smart material deformation separation module 800 of FIG. 8A, discussed below), or a combination thereof. In some embodiments, the control module may also be configured to control the multi-station printing stations 1000 of FIG. 1 and FIG. 9B. The control module can include one or more computer systems. In some embodiments, the control module can enable the unloading and packaging system to operate as a continuous and automated process of an entire additive manufacturing printing system.

FIG. 6 illustrates a block diagram of an exemplary control module, in accordance with some embodiments of the disclosure. Control module 600 may be a host computer connected to a network. Control module 600 can include a client computer or a server. As shown in FIG. 6, the control module 600 can include any suitable type of microprocessor-based device, such as a personal computer, workstation, embedded system, programming logic control (PLC), field programmable gate array (FPGA), server, or handheld computer system (i.e., a portable electronic device such as a phone, tablet, or the like). The control module 600 can include, for example, one or more processors 610, one or more input devices 620, one or more output devices 630, storage 640, software 650, and one or more communication devices 660. The input device(s) 620 and the output device(s) 630 can generally correspond to those described below and can be connectable or integrated with the control module 600.

The input device(s) 620 can include any suitable device that provides input, such as a touch screen, a keyboard or keypad, a mouse, a voice-recognition device, or the like. The output device(s) 630 can include any suitable device that provides output, such as a touch screen, a haptics device, a speaker, or the like.

Storage 640 can include any suitable device that provides storage, such as electrical, magnetic, or optical memory including random access memory (RAM), cache memory, a hard drive, or a removable storage disk.

The communication device(s) 660 can include any suitable device capable of transmitting and receiving signals over a network, such as a network interface chip or device. The components of the control module 600 can be connected in any suitable manner, such as via a physical bus or wirelessly.

Software 650, which can be stored in storage 640 and can be executed by processor 610, can include, for example, programming that embodies the functionality of the present disclosure (e.g., controls the operation of the modules and their components, discussed above). Software 650 can also be stored and/or transported within any non-transitory computer-readable storage medium for use by, or in connection with, an instruction execution software, apparatus, or device, such as those described above, that can fetch instructions associated with the software from the instruction execution system, apparatus, or device and can execute the instructions. In the context of this disclosure, a computer-readable storage medium can be any medium, such as storage 640, that can contain or store programming for use by, or in connection with, an instruction execution system, apparatus, or device.

Software 650 can also be propagated within any transport medium for use by, or in connection with, an instruction execution system, apparatus, or device. A non-limiting exemplary instruction execution system, apparatus, or device can fetch instructions associated with the software from the instruction execution system, apparatus, or device and can execute the instructions. In the context of this disclosure, a transport medium can include any medium that can communicate, propagate, or transport programming for use by, or in connection with, an instruction execution system, apparatus, or device. The transport readable medium can include, but is not limited to, an electronic, magnetic, optical, electromagnetic, or infrared wired or wireless propagation medium.

The control module 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

The control module 600 may implement any operating system suitable for operating on the network. Software 650 can be written in any suitable programming language, such as C, C++, Java, Python, or the like. In some embodiments, application software embodying the functionality of the present disclosure can be deployed in different configurations, such as in a client/server arrangement, or through a Web browser as a Wed-based application or Web service, for example.

Exemplary Operation of a Control Module

The control module can be configured to control the operation of devices. In some embodiments, the control module can control parallel and independent operations of each device. Independent operation may mean the operation of one may not affect the operation of another. Independent operation may be beneficial in instances such as, but not limited to, when high-throughput is desired. In some instances, each module or device may not have the same throughput. As such, when the modules or devices do not operate independently, the overall throughput of the loading and system may be limited by the module or device with the slowest throughput.

For example, the unloading and packaging system can include a first unloading and packaging device 100 and a second unloading and packaging device 100. The control module may send one or more first controls signals to the first unloading and packaging device 100 to control its operation. The control module may also send one or more second control signals to the second unloading and packaging device 100 to control its operation. In some embodiments, the control module may cause the first unloading and packaging device 100 to operate. At the same time, the control module may cause the second unloading and packaging device 100 to not operate (e.g., due to routine maintenance). In some embodiments, the control module may cause the first unloading and packaging device 100 to not operate and the second unloading and packaging device 100 to operate. In some embodiments, the control module may cause both the first unloading and packaging device 100 and the second unloading and packaging device 100 to operate.

The control module may also be configured to control the operation of the modules within a given unloading and packaging device 100. The control module can control parallel and independent operations of each module. For example, the control signal may send one or more first control signals to the packaging module 500 to control its operation on a first production batch. At the same time, the control module may send one or more second control signals to the loading/unloading module 200 to control its operation on a second production batch.

The control module may also be configured to control the continuous and automatic transportation within a module. In some embodiments, the control module may be configured to control the continuous and automatic transfer between modules.

The control module may also be configured to control a remote computer or server that stores and/or links information to the pharmaceutical units 104. Exemplary information can include, but is not limited to, characterization information, production batch information, 3D printing process information, and the like.

In some embodiments, the control module can be configured to record information about the continuous manufacturing process. Information may include, but is not limited to, control signals, movements, activities, and status of a device, a robot, a module, a component, a machine, a film, a pharmaceutical unit, or any combination thereof. In some embodiments, the recorded information can be linked to the corresponding pharmaceutical unit(s), as discussed above.

Exemplary Film Deformation Separation Module

In some embodiments, the unloading and packaging system may include a film deformation separation module 700. The film deformation separation module 700 may be located proximate to the loading/unloading module 200 and the inspection module 300, for example.

Figure 7A:
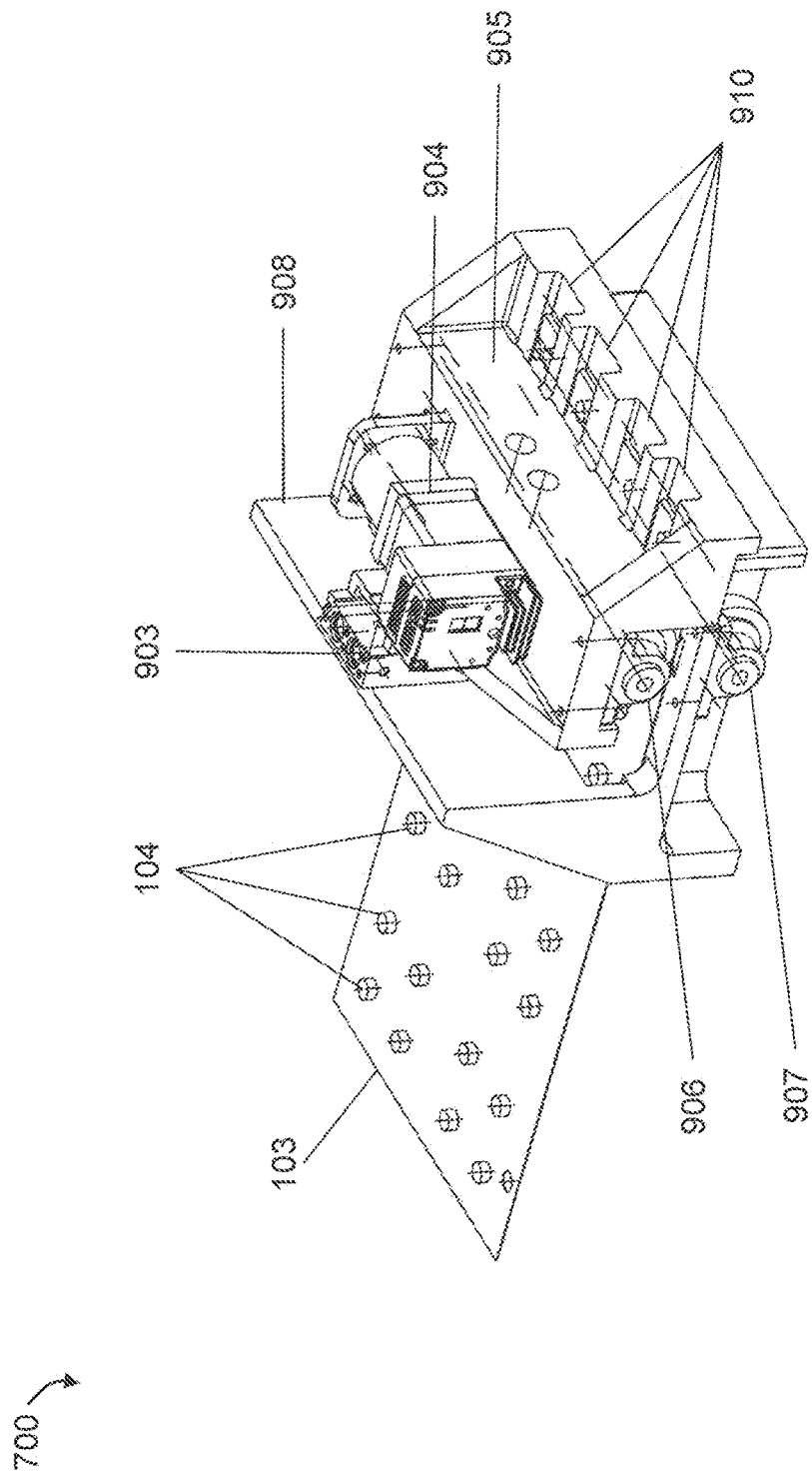
FIGS. 7A-7B illustrate plan and cross-sectional views, respectively, of an exemplary film deformation separation module, according to some embodiments of the disclosure.
Figure 7B:
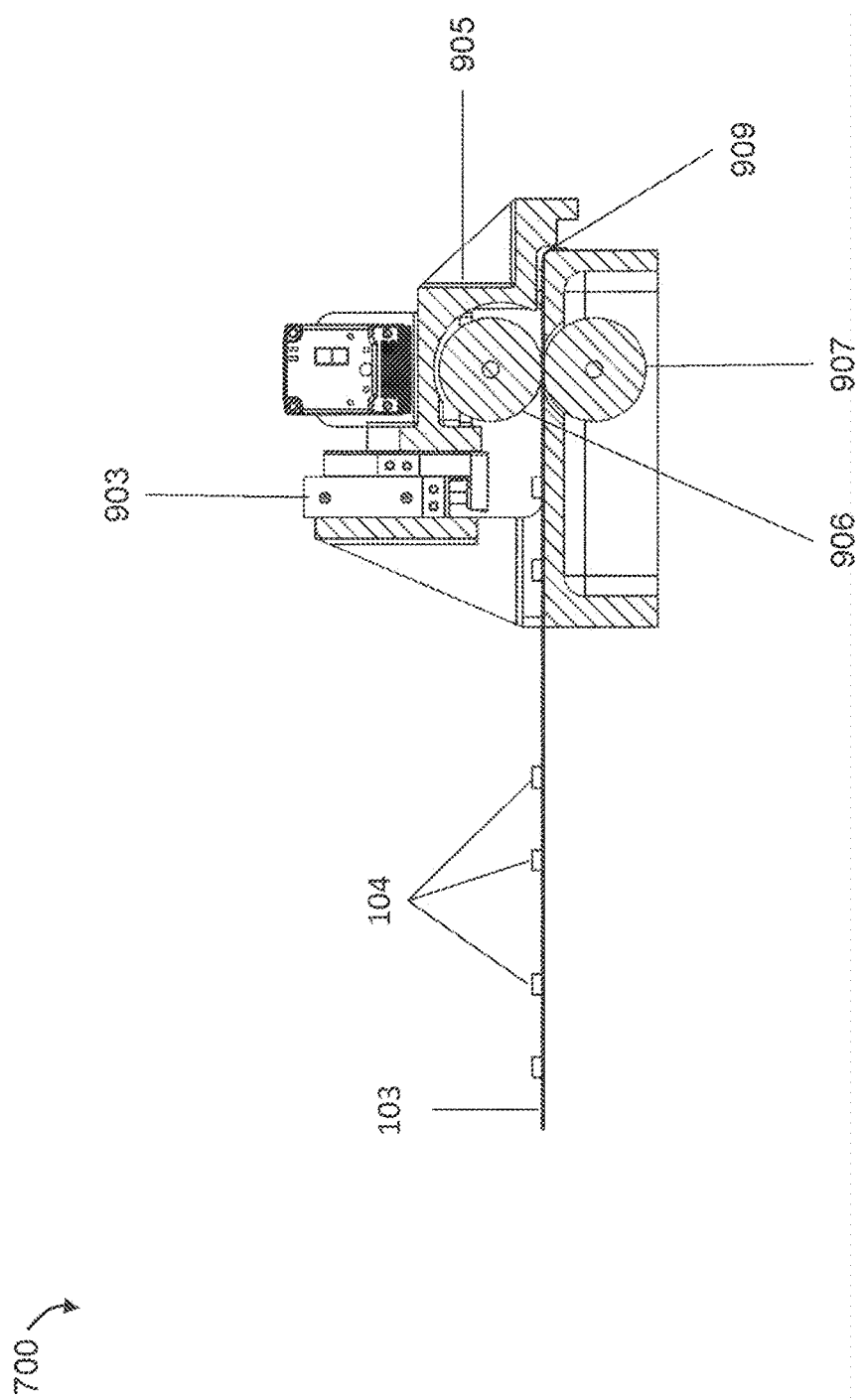

FIGS. 7A-7B illustrate plan and cross-sectional views, respectively, of an exemplary film deformation separation module 700, according to some embodiments of the disclosure. The film deformation separation module 700 may be for separating the pharmaceutical units 104 from the post-printing film 103. In some embodiments, the film deformation separation module 700 may separate the pharmaceutical units 104 from the post-printing film by deforming the post-printing film 103. The film deformation separation module 700 may include drive friction wheels 906 and driven friction wheels 907, one or more pneumatic actuators 903, an electric actuator 904 (e.g., a motor), a support frame 908, an unloading plate 905, and a guide slot 909.

In some embodiments, the electric actuator 904 can be used to rotate the drive friction wheels 906. The drive friction wheels 906 can coordinate with the driven friction wheels 907 to move the post-printing film 103 along the x-plane. In some embodiments, the drive friction wheels 906 and the driven friction wheels 907 may cause the post-printing film 103 to move along the x-plane towards the guide slot 909. In some embodiments, the drive friction wheels 906 and the driven friction wheels 907 can contact and surround the post-printing film 103, such as shown in FIG. 7B. The drive friction wheels 906 and the driven friction wheels 907 can rotate, one in the clockwise direction and another in the counter clockwise direction, for example, as portions of the post-printing film 103 move between them.

The pneumatic actuator(s) 903 can be used to move the support frame 908 in the z-direction (e.g., up or down). The downward movement of the support frame 908 can be used to press down on the post-printing film 103.

The unloading plate 905 and the guide slot 909 can be configured to create non-flat contours by bending and deforming the post-printing film 103. As described in more detail below, the bending and deforming caused by the loading plate 905 and the guide slot 909 cause the pharmaceutical units 104 to separate from the post-printing film 103. In some embodiments, the unloading plate 905 may include a plurality of slots 910 configured to receive the pharmaceutical units 104 after being separated. In some embodiments, the guide slot 909 can be configured to receive the post-printing film 103 after being separated.

Exemplary Operation of a Film Deformation Separation Module

In instances where the unloading and packaging device 100 includes a film deformation separation module 700, the loading/unloading module 200 may automatically transport the post-printing film 103 from the buffer station 8 to the film deformation separation module 700. Automatically transporting the post-printing film 103 from the buffer station 8 to the film deformation separation module 700 may be similar to step 254 (of FIG. 3E) with the movement of the loading/unloading robot 1 and the loading/unloading robot suction cup module 5 being to the film deformation separation module 700, instead of the unloading position 10.

Figure 7C:
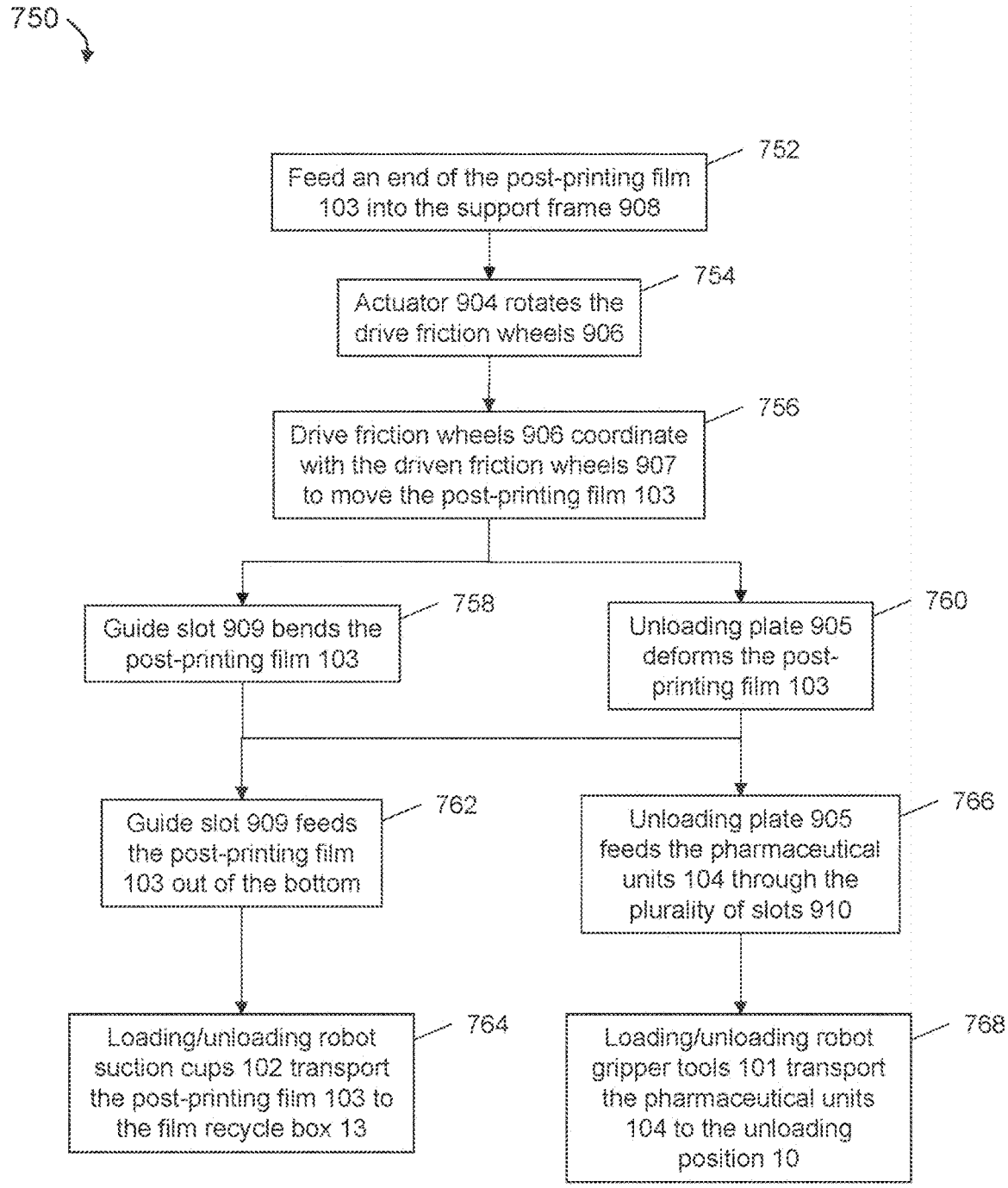
FIG. 7C illustrates a flowchart of an exemplary operation of a film deformation separation module, according to some embodiments.

FIG. 7C illustrates a flowchart of an exemplary operation of a film deformation separation module, according to some embodiments. Process 750 may begin with step 752, where an end of the post-printing film 103 may be fed into the support frame 908.

In step 754, the electric actuator 904 can rotate the drive friction wheels 906. The drive friction wheels 906 can coordinate with the driven friction wheels 907 to move the post-printing film 103 (step 756). In some embodiments, the drive friction wheel 906 may rotate clockwise, while the driven friction wheel(s) 907 may rotate counterclockwise. This rotation may cause the end of the post-printing film 103 fed into the support frame 908 to move along the x-plane towards the guide slot 909. The end of the post-printing film 103 that was fed into the support frame 908 may encounter the guide slot 909, which may bend the post-printing film 103 (step 758).

At the same time, in step 760, the unloading plate 905 may deform the post-printing film 103 by applying a light pressure to certain locations of the post-printing film 103. The locations where the light pressure is applied may be outside of the locations where the pharmaceutical units 104 are located on the post-printing film 103. During steps 758 and 760, the drive friction wheels 906 and the driven friction wheels 907 may continue to move the post-printing film 103 along the x-plane. Steps 758 and 760 may lead to the pharmaceutical units 104 separating from the post-printing film 103.

After being separated, in some embodiments, the post-printing film 103 may be fed out of the bottom of the film deformation separation module 700 (step 762). After being separated, in some embodiments, the post-printing film 103 may be automatically transported to a film recycle box 13 (step 764). In some embodiments, the film recycle box 13 may be located at the bottom of the film deformation separation module 700 and may catch the post-printing film 103 as it is fed out of the film deformation separation module 700.

After being separated, in some embodiments, the pharmaceutical units 104 may be fed through plurality of slots 910 (step 766). Step 760 and step 764 may occur at the same time.

In some embodiments, the loading/unloading robot gripper tools 101 of the loading/unloading module 200 can be used to automatically transport the pharmaceutical units 104 to the unloading position 10 (step 768).

Exemplary Smart Material Deformation Separation Module

In some embodiments, the unloading and packaging system may include a smart material deformation separation module 800. The smart material deformation separation module 800 may be located proximate to the loading/unloading module 200 and the inspection module 300, for example.

Figure 8A:
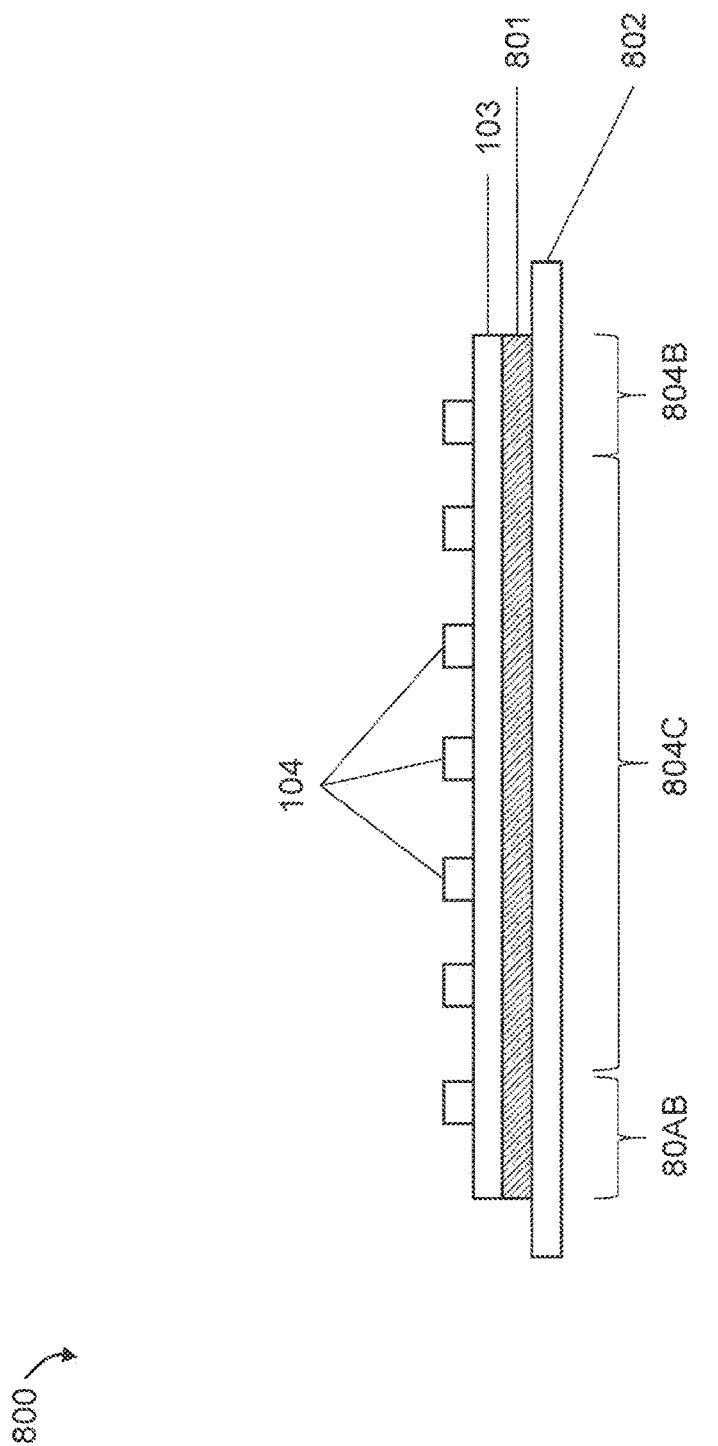
FIG. 8A illustrates a cross-section view of an exemplary smart material deformation separation module, according to some embodiments of the disclosure.

FIG. 8A illustrates a cross-section view of an exemplary smart material deformation separation module, according to some embodiments of the disclosure. The smart material deformation separation module 800 may be for separating the pharmaceutical units 104 from the post-printing film 103 by deforming a smart material 801 coupled to the post-printing film 103. The smart material deformation separation module 800 may include a smart material 801, circuitry (not shown), and a pallet 802.

The smart material 801 may be a material capable of being deformed. In some embodiments, the smart material 801 may be a material capable of being dynamically deformed. For example, the smart material 801 may be a piezoelectric material capable of change its shape (e.g., being stretched) in response to one or more signals (e.g., a current signal) received from the circuitry.

The smart material 801 may have at least two ends: a left end 804A and a right end 804B, as shown in the figure. The smart material 801 may also have a region between the ends, region 804C. In some embodiments, the deformation may include smart material 801 stretching along the x-plane (e.g., the length of the smart material 801 in the x-plane can increase). In some embodiments, the deformation may include smart material 801 bending at its left end 804A and its right end 804B (e.g., the z-positions of the left end 804A and the right end 804B may be different from the z-position of the region 804C). The deformation of the smart material 801 may cause the post-printing film 103 to deform, as discussed in more detail below.

In some embodiments, the pallet 802 may be any medium that supports the smart material 801.

Exemplary Operation of a Smart Material Deformation Separation Module

In instances where the unloading and packaging device 100 includes a smart material deformation separation module 800, the loading/unloading module 200 may automatically transport the post-printing film 103 from the buffer station 8 to the smart material deformation separation module 800. Automatically transporting the post-printing film 103 from the buffer station 8 to the smart material deformation separation module 800 may be similar to step 254 (of FIG. 3E) with the movement of the loading/unloading robot 1 and the loading/unloading robot suction cup module 5 being to the smart material deformation separation module 800, instead of the unloading position 10.

Figure 8B:
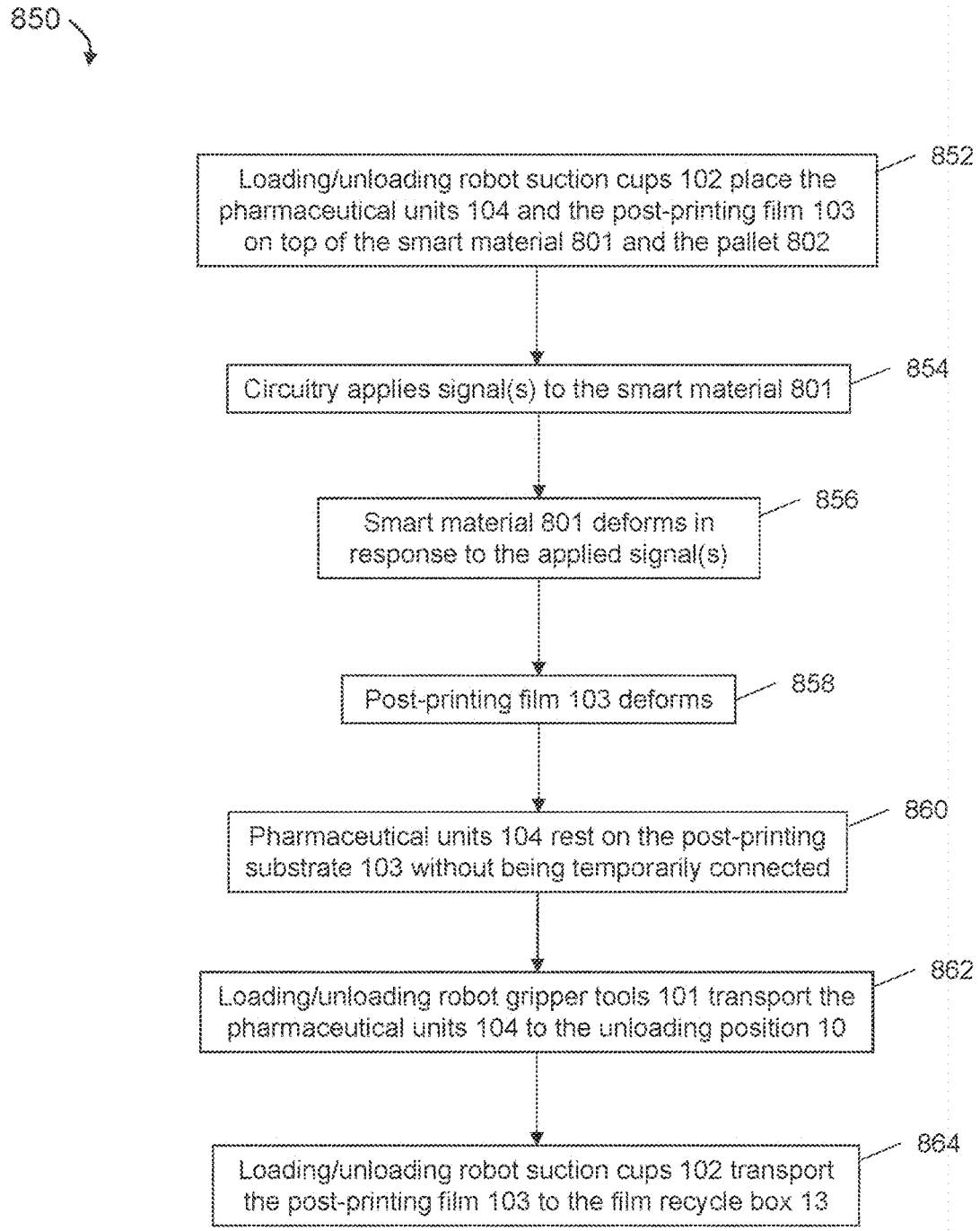
FIG. 8B illustrates a flowchart of an exemplary operation of a smart material deformation separation module, according to some embodiments of the disclosure.

FIG. 8B illustrates a flowchart of an exemplary operation of a smart material deformation separation module, according to some embodiments of the disclosure. Process 850 may begin with step 852, where the post-printing film 103 with pharmaceutical units 104 temporarily connected to it may be placed on top of the smart material 801 and the pallet 802. In some embodiments, the post-printing film 103 may be temporarily connected to the smart material 801 such that the post-printing film 103 follows the movement of the smart material 801. One non-limiting exemplary method for temporarily connecting the post-printing film 103 to the smart material 801 can be to add a paste or sticky-like substance between the post-printing film 103 and the smart material 801. Another non-limiting exemplary method for temporarily connecting the post-printing film 103 to the smart material 801 can be to use suction.

The signal(s) may be applied to the smart material 801 (step 854). In some embodiments, the smart material 801 may be a material that deforms in response to the applied signal(s) (step 856). In some embodiments, the deformation may include the smart material 801 stretching along the x-plane. Stretching along the x-plane may cause the distance between the left end 804A and the right end 804B to increase, for example.

In some embodiments, the deformation may include the smart material 801 bending at its ends 804A and 804B.

Bending at its ends 804A and 804B may cause the ends 804A and 804B to have a different z-height than the region 804C.

In step 858, deformation of the smart material 801 may cause the post-printing film 103 to correspondingly deform. This deformation of the post-printing film 103 may cause the pharmaceutical units 104 to separate from the post-printing film by "popping off." That is, the deformation may cause the pharmaceutical units 104 to temporarily move in the z-plane due to a stretch or bending force along the x-plane, y-plane, and/or z-plane. In some embodiments, the pharmaceutical units 104 popping off may be caused by a mismatch in deformation between the pharmaceutical units 104 (i.e., no deformation) and the post-printing film 103 (i.e., at least some deformation). In some embodiments, after the pharmaceutical units 104 are popped off, the pharmaceutical units 104 may move back to the post-printing film 103 and may rest on top of it without being temporarily connected to it (step 860).

In some embodiments, the loading/unloading robot gripper tools 101 can be used to automatically transport the pharmaceutical units 104 to the unloading position 10 (step 862).

After the pharmaceutical units 104 have been transported to the unloading position 10, the separated post-printing film 103 may remain on (e.g., be resting on top of) the smart material 801 and the pallet 802. In step 864, the post-printing film 103 may be automatically transported to the film recycle box 13.

Exemplary Additive Manufacturing System

FIG. 9A illustrates a view of an exemplary additive manufacturing system 900, according to some embodiments of the disclosure. The additive manufacturing system 900 may comprise a material supply module 1002 for transporting a set of printing material(s) to a flow distribution module 1004. The flow distribution module 1004 may comprise a flow distribution plate having branched channels (not depicted) configured to divide a single flow of the printing materials (e.g., supplied by the material supply module 1002) into a plurality of flows.

In some embodiments, the flow distribution module 1004 can divide a single flow into two flows, which can be divided into four flows. The four flows can be divided into eight flows, and the eight flows can be divided into 16 flows. In some embodiments, the 16 flows can be divided into 32 flows, etc. In some embodiments, the flow distribution module 1004 can divide a single flow directly into two flows, three flows, five flows, . . . or any number of flows. In some embodiments, the flow distribution module 1004 can divide flow into three flows, which can be divided into nine flows, which can be divided into 27 flows, etc., for example.

In some embodiments, the plurality of flows can be dispensed by a plurality of nozzles (not shown) to print pharmaceutical units (e.g., tablets, caplets, printlets, etc.) on a film 103. The film 103 may be located on top of a printing platform 1010.

The additive manufacturing system 900 may include one or more additive manufacturing controllers for controlling the plurality of nozzles to dispense the plurality of flows based on a plurality of nozzle-specific parameters.

Figure 9B:
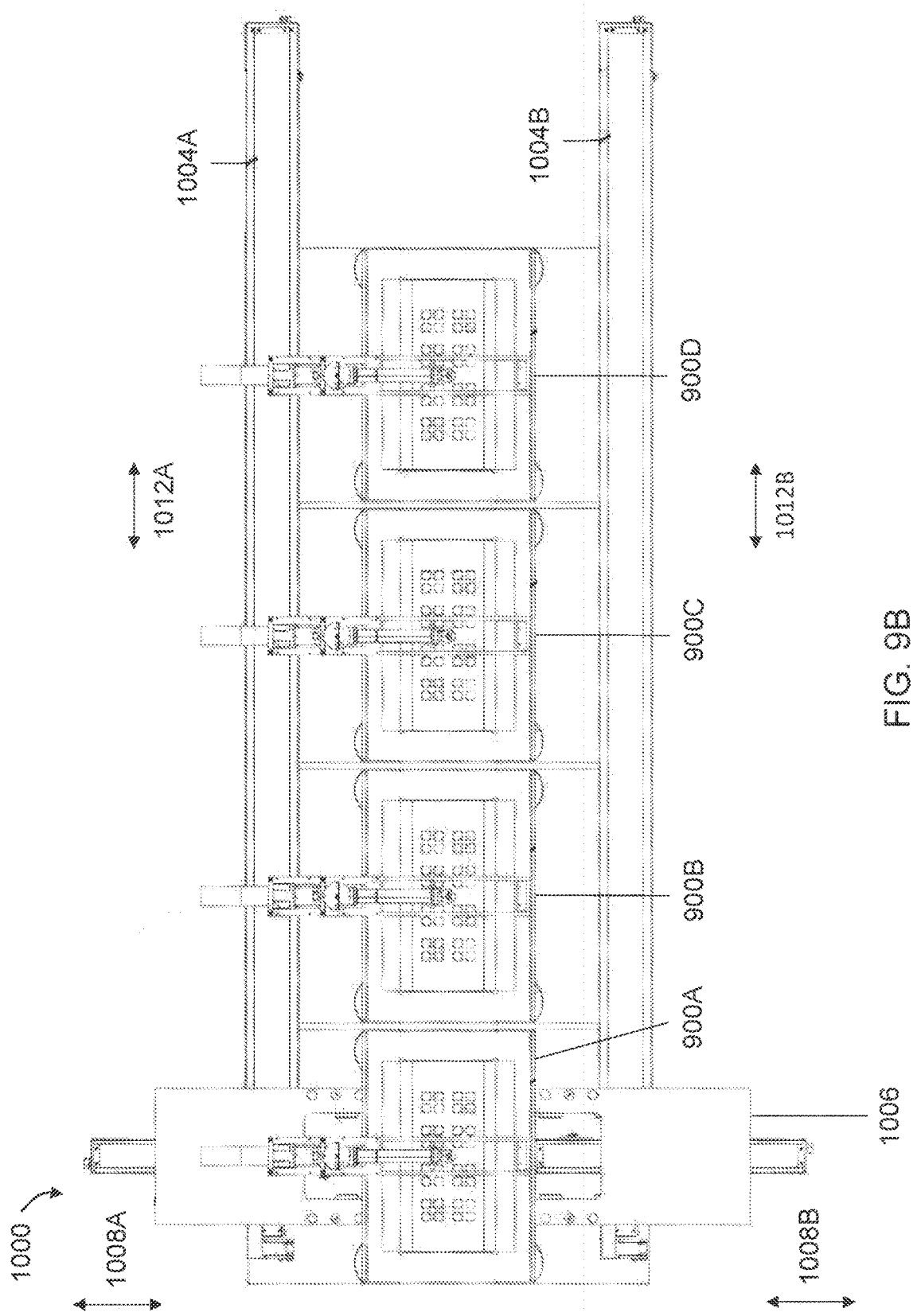
FIG. 9B illustrates a top view of an exemplary layout of a multi-station 3D printing station for additive manufacturing of pharmaceutical units, according to some embodiments of the disclosure.

FIG. 9B illustrates a top view of an exemplary layout of a multi-station 3D printing station for additive manufacturing of pharmaceutical units, according to some embodiments of the disclosure. The multi-station printing system 1000 may include a plurality of printing stations 900A, 900B, 900C, and 900D. The plurality of printing stations 900 may be arranged in a linear fashion, as shown in the figure.

In the figure of FIG. 10B, each of the printing stations 900 comprises a set of nozzles (e.g., 32 nozzles), which can be configured to dispense multiple flows of printing materials on a film 103 to print a production batch of pharmaceutical units 104 (e.g., a batch of tablets).

In some embodiments, each of the printing stations 900 can be configured to move the film 103 along a x-axis, a y-axis, a z-axis, or a combination thereof. In some embodiments, the additive manufacturing controllers of the printing stations 900 are different from each other, which can be one way for the printing stations 900 to be controlled independently (e.g., via the control module including one or more additive manufacturing controllers).

The multi-station printing system 1000 comprises a film transport mechanism 1006. The film transport mechanism 1006 can be configured to travel along the channels 1004A and 1004B. The film transport mechanism 1006 can be configured to operate with the printing stations 900 to move a post-printing film 103 off one printing station (e.g., printing station 900A) onto one of the two ends of the film transport mechanism (as shown by arrows 1008A and 1008B), transport the film 103 along either channel (as shown by arrows 1012A and 1012B), and move the film 103 onto another printing station 900. In some embodiments, the operations of the printing stations 900 and the film transport mechanism can be coordinated to maximize the manufacturing rate and minimize the idle time of the printing stations 900.

The multiple printing stations 900 in the multi-station printing system 1000 can be arranged in other layouts. In some embodiments, the multiple printing stations 900 can be arranged around a circle or a square. In some embodiments, the printing station transport mechanism can comprise one or more channels 1004 that are of circular shape or square shape such that it can transport a post-printing film 103 from one printing station 900 to another. In some embodiments, the film transport mechanism comprises one or more grippers and/or robots for picking up a post-printing film 103 from one printing station (e.g., printing station 900A) and moving the post-printing film 103 to another printing station (e.g., printing station 900B).

Exemplary Operation of an Additive Manufacturing System

Referring back to FIG. 3E, the additive manufacturing system operates by having a printing station 300 receive a new film from the film stack 7 (step 256). The printing station 900 prints the pharmaceutical units 104 on the new film (step 274). The new film having printed pharmaceutical units 104 deposited on it can be referred to as a post-printing film 103. The post-printing film 103 may be located at an end position after printing (step 276). In some embodiments, the film transport mechanism may transport the post-printing film 103 from the end position to the buffer position so that process 250 can proceed with step 252, discussed above.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. A continuous manufacturing system for unloading and packaging pharmaceutical units from an additive manufacturing system, the system comprising:
   a loading/unloading module for receiving the pharmaceutical units from the additive manufacturing system, wherein the pharmaceutical units are deposited on a post-printing film when received from the additive manufacturing system;
   an inspection module for inspecting the pharmaceutical units; and
   a control module for controlling the loading/unloading module and the inspection module, the controlling causing the loading/unloading module and the inspection module to separate the pharmaceutical units from the post-printing film,
   wherein the loading/unloading module comprises:
      a loading/unloading robot gripper tool module capable of being attached to or detached from a loading/unloading robot, using an automatic tool changer, wherein the loading/unloading robot gripper tool module comprises loading/unloading robot gripper tools for gripping the pharmaceutical units.

2. The system of claim 1, wherein the loading/unloading module comprises:
   a loading/unloading robot suction cup module capable of being attached to or detached from a loading/unloading robot, using an automatic tool changer,
   wherein the loading/unloading robot suction cup module comprises loading/unloading robot suction cups for picking up the post-printing film using suction.

3. The system of claim 1, wherein the loading/unloading module comprises:
   a film stack for holding one or more new films;
   a sensor for sensing a height of the one or more new films in the film stack; and
   a linear actuator for adjusting the height of the one or more new films in the film stack.

4. The system of claim 1, wherein the loading/unloading module comprises:
   a buffer station for receiving and storing the pharmaceutical units deposited on the post-printing film.

5. The system of claim 1, wherein the inspection module comprises:
   an inspection robot module attached to an inspection robot,
   wherein the inspection robot module comprises one or more of:
      inspection robot suction cups for holding a set of the pharmaceutical units using suction,
      inspection robot gripper tools for gripping the post-printing film, and
      an inspection robot camera tool for capturing one or more images of a set of the pharmaceutical units.

6. The system of claim 1, wherein the inspection module comprises:
   an unloading position for receiving the pharmaceutical units deposited on the post-printing film, wherein the unloading position comprises a plurality of geometrical features, wherein the pharmaceutical units are configured to be located in the geometrical features.

7. The system of claim 1, wherein the inspection module comprises:
   a weighing station including one or more weight scales for weighing a set of the pharmaceutical units,
   wherein the one or more weight scales include one or more pits for holding the set of the pharmaceutical units.

8. The system of claim 7, wherein a spacing between adjacent inspection robot suction cups of the inspection module is equal to a spacing between adjacent pits of the one or more weight scales.

9. The system of claim 1, wherein the inspection module comprises:
   a tablet box for holding disqualified pharmaceutical units, or
   a film recycle box for holding the post-printing film after being separated from the pharmaceutical units.

10. The system of claim 1, further comprising:
    a packaging module for labeling, packaging, or both,
    wherein the packaging module comprises a blister machine for packaging qualified pharmaceutical units into a blister pack.

11. The system of claim 10, wherein the packaging module comprises a blister pack position for receiving the blister pack after the qualified pharmaceutical units are sealed into the blister pack.

12. The system of claim 10, wherein the packaging module comprises a packaging robot module attached to a packaging robot.

13. The system of claim 12, wherein the packaging robot module comprises one or more of:
    packaging robot suction cups for holding a blister pack, a medicine box, or both using suction,
    a pressing block for pressing a flap of the medicine box, and
    a glue dispenser for dispensing glue on the medicine box.

14. The system of claim 10, wherein the packaging module comprises a label marking station for labeling a blister pack, a medicine box, or both.

15. The system of claim 10, wherein the packaging module comprises a boxing position for assembling a medicine box, wherein the boxing position is for holding the medicine box while one or more blister packs are placed in the medicine box.

16. The system of claim 10, wherein the packaging module comprises a stack position for holding a medicine box after being sealed.

17. The system of claim 10, wherein the packaging module comprises a box storage for holding a medicine box before being assembled.

18. The system of claim 1, wherein the control module is configured to control operation of the loading/unloading module, the inspection module, a packaging module, or a combination thereof.

* * * * *